(12) United States Patent
Kuroki

(10) Patent No.: US 7,808,527 B2
(45) Date of Patent: Oct. 5, 2010

(54) IMAGE PICKUP APPARATUS AND METHOD, IMAGE PROCESSING APPARATUS AND METHOD, IMAGE DISPLAY SYSTEM, RECORDING MEDIUM AND PROGRAM

(75) Inventor: Yoshihiko Kuroki, Kanagawa (JP)

(73) Assignee: Sony Corporation, Tokyo (JP)

( * ) Notice: Subject to any disclaimer, the term of this patent is extended or adjusted under 35 U.S.C. 154(b) by 871 days.

(21) Appl. No.: 10/978,102

(22) Filed: Oct. 29, 2004

(65) Prior Publication Data

US 2005/0093982 A1 May 5, 2005

(30) Foreign Application Priority Data

Oct. 31, 2003 (JP) ............................. 2003-372972

(51) Int. Cl.
- H04N 5/225 (2006.01)
- H04N 5/235 (2006.01)
- H04N 9/07 (2006.01)

(52) U.S. Cl. .............................. 348/207.99; 348/211.11; 348/337

(58) Field of Classification Search .............. 348/218.1, 348/262, 353, 343, 222.1, 337, 234, 238, 348/269, 267, 265, 207.99, 297, 211.1, 220.1, 348/471; 352/44; 359/629

See application file for complete search history.

(56) References Cited

U.S. PATENT DOCUMENTS

| | | | | |
|---|---|---|---|---|
| 4,652,909 A * | 3/1987 | Glenn | ........................ | 348/262 |
| 4,652,928 A * | 3/1987 | Endo et al. | ............... | 348/219.1 |
| 6,523,956 B2 * | 2/2003 | Oshima | ...................... | 352/166 |
| 6,661,579 B2 * | 12/2003 | Araki et al. | .................. | 359/629 |
| 6,882,366 B1 * | 4/2005 | Kijima et al. | ............... | 348/294 |
| 6,930,724 B1 * | 8/2005 | Tengeiji et al. | .............. | 348/367 |
| 7,015,954 B1 * | 3/2006 | Foote et al. | ............... | 348/218.1 |
| 7,061,476 B2 * | 6/2006 | Fujiwara et al. | ............... | 345/2.2 |
| 7,292,271 B2 * | 11/2007 | Okano et al. | ............. | 348/218.1 |
| 7,330,181 B2 | 2/2008 | Kuroki et al. | | |
| 2001/0019363 A1 * | 9/2001 | Katta et al. | ............. | 348/333.01 |
| 2003/0160886 A1 * | 8/2003 | Misawa et al. | ............... | 348/347 |
| 2004/0086190 A1 * | 5/2004 | Kondo | ........................ | 382/239 |
| 2005/0093773 A1 * | 5/2005 | Kuroki et al. | .................. | 345/30 |
| 2005/0093982 A1 * | 5/2005 | Kuroki | .................. | 348/207.99 |
| 2008/0150931 A1 | 6/2008 | Kuroki et al. | | |

FOREIGN PATENT DOCUMENTS

| | | |
|---|---|---|
| JP | 04-068876 A | 3/1992 |
| JP | 05-268579 A | 10/1993 |

(Continued)

Primary Examiner—David L Ometz
Assistant Examiner—Ahmed A Berhan
(74) Attorney, Agent, or Firm—Wolf, Greenfield & Sacks, P.C.

(57) ABSTRACT

An image pickup apparatus and method is disclosed by which moving pictures of a high frame rate can be displayed. The image pickup apparatus for picking up moving pictures, includes: a distribution section for distributing light incoming through an optical lens to n directions; n image pickup elements for converting the light distributed by the distribution section into signals at time intervals of 1/m second to pick up images; and a control section for controlling timings at which the light is to be converted into the signals by the image pickup elements; the control section controlling the n image pickup elements to convert the light into the signals at timings successively displaced by 1/m×n second to pick up images.

5 Claims, 40 Drawing Sheets

FOREIGN PATENT DOCUMENTS

| | | |
|---|---|---|
| JP | 06-324320 A | 11/1994 |
| JP | 08-307753 A | 11/1996 |
| JP | 10-124024 A | 5/1998 |
| JP | 10-191191 A | 7/1998 |
| JP | 2000-041223 A | 2/2000 |
| JP | 2000-338941 A | 12/2000 |
| JP | 2002-040584 A | 2/2002 |

* cited by examiner

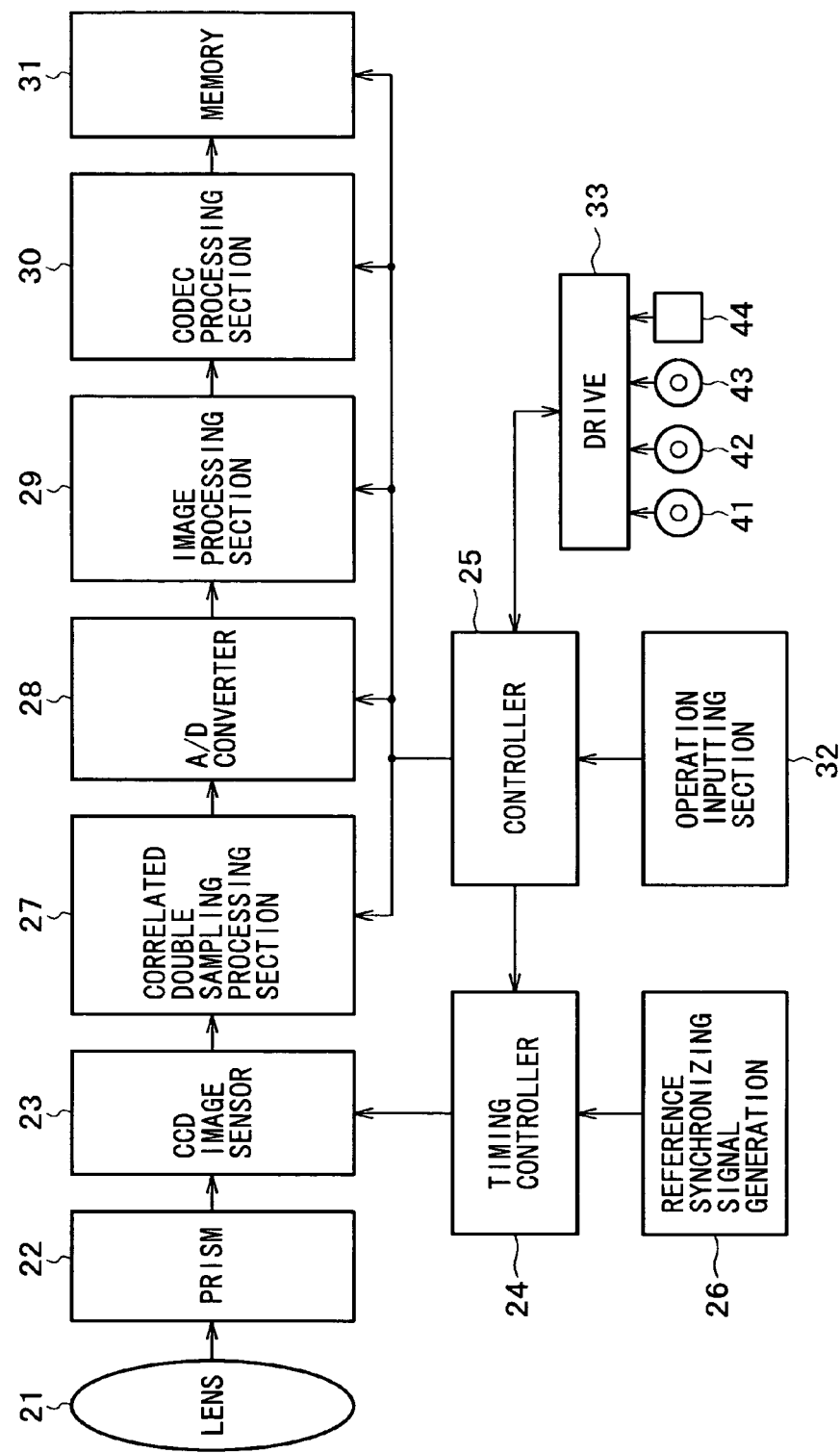
F I G. 1

F I G. 1 9
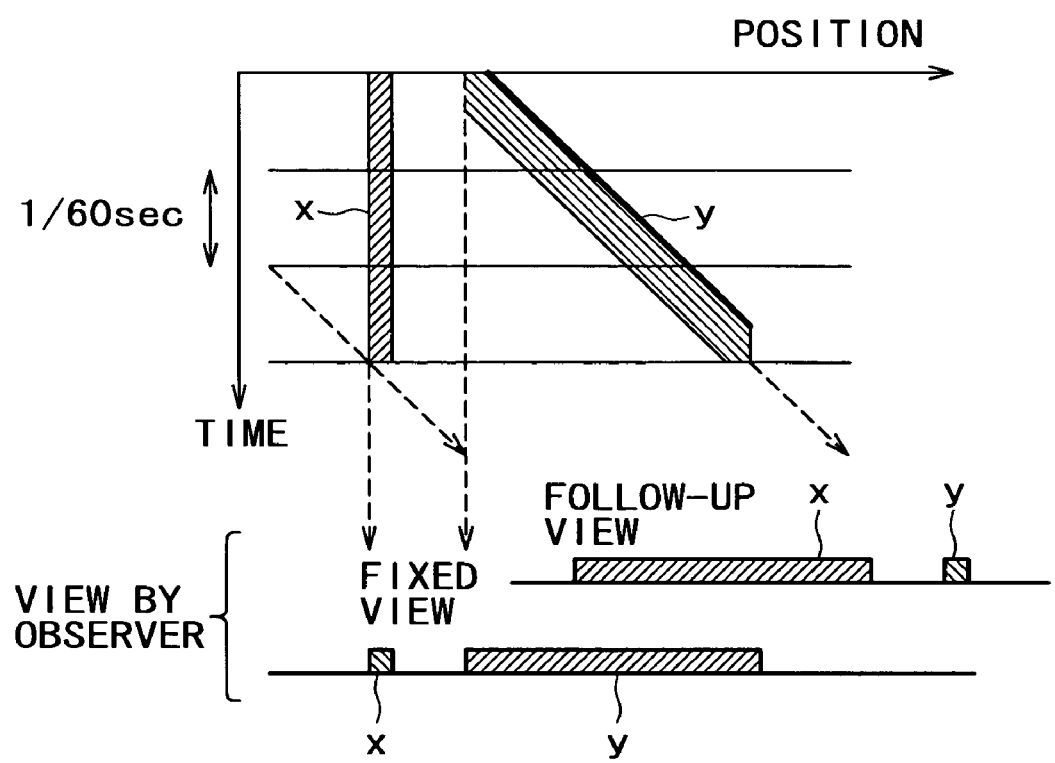

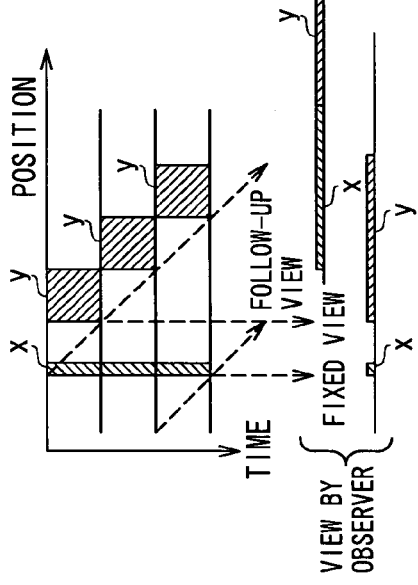
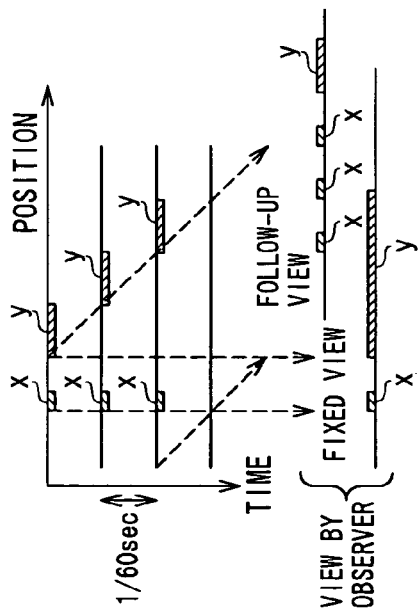
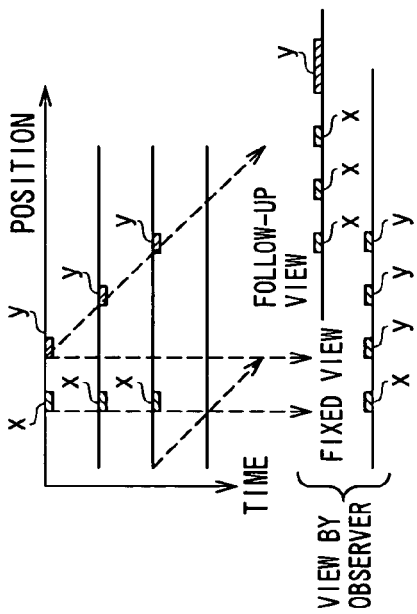

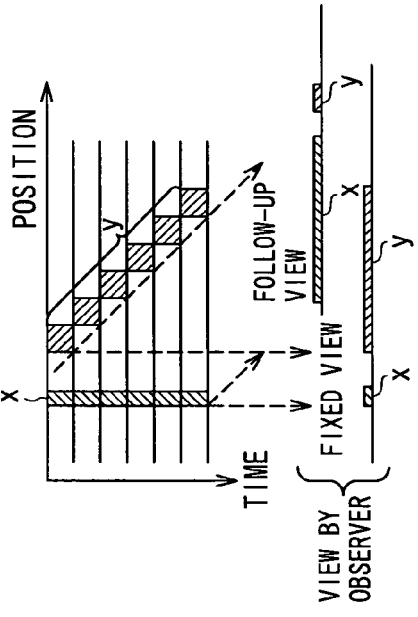
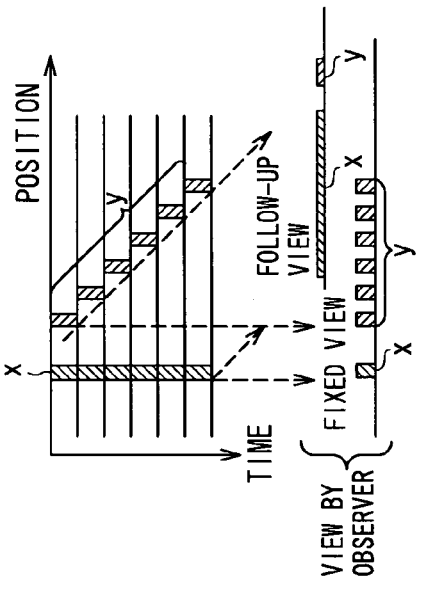
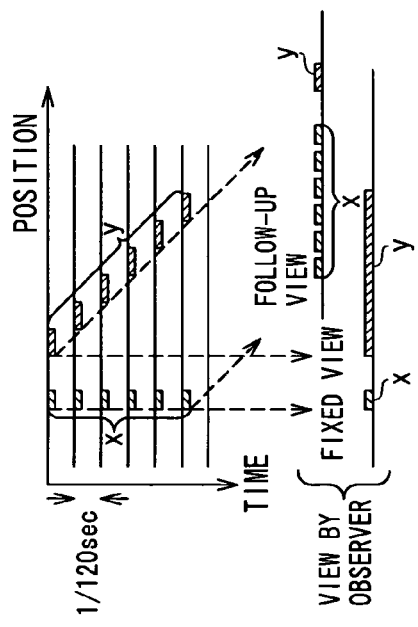
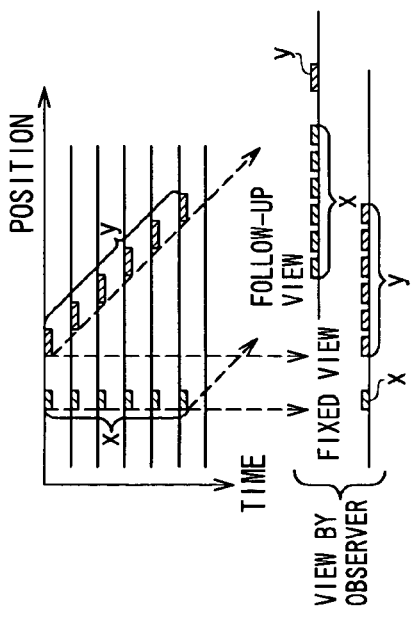

IMAGE PICKUP APPARATUS AND METHOD, IMAGE PROCESSING APPARATUS AND METHOD, IMAGE DISPLAY SYSTEM, RECORDING MEDIUM AND PROGRAM

BACKGROUND OF THE INVENTION

This invention relates to an image pickup apparatus and method, an image processing apparatus and method, an image display system, a recording medium and a program, and more particularly to an image pickup apparatus and method, an image processing apparatus and method, an image display system, a recording medium and a program by which moving pictures can be displayed so as to exhibit a smooth movement of an object.

It is demanded to improve the signal processing technique and the driving technique for an image display element to improve the picture quality of a displayed image.

Generally, in order to improve the picture quality, the resolution of an image should be raised so as to make the texture of the display image finer. The amount of information of an image is represented in a unit called pixel which represents a dot which forms the image, and the number of pixels is represented by the numbers of dots in horizontal and vertical directions of the image like, for example, 800×600 or 1,024× 768. As the number of pixels (dots) increases, the texture of the image becomes finer and the amount of information which composes the image increases.

A system which makes it possible to display an image with a high resolution is known and disclosed, for example, in Japanese Patent Laid-Open No. Hei 10-124024. According to the system, for example, two first and second display units are used, and in a normal single mode, an image is displayed on the first display unit whereas, in a multi mode, for example, the left half of an image is displayed on the first display unit while the right half is displayed on the second display unit. Consequently, in the multi mode, an image can be displayed with a doubled resolution compared with a system which uses only one display unit.

If the resolution is raised to display an image, since the amount of information which forms the image increases, the amount of data to be transferred to the first or second display unit increases, and consequently, it is demanded to increase the data transfer rate. Therefore, the system is configured such that the amount of data per one dot of the first and second display units is reduced and the disappearing data are converted by signal processing so that image data can be transferred without increasing the data transfer rate.

Further, the picture quality particularly of moving pictures can be improved by raising the frame rate which is a value representative of the number of times by which the screen is updated for one second.

For example, where a projector is used to project and display moving pictures to and on a screen, the projector scans a frame image line by line in a horizontal direction to display the frame image. Then, after all lines of the image of the frame are scanned, scanning of image data of a next frame is started, and moving pictures can be displayed thereby.

On the other hand, when moving picture data to be displayed are picked up, in order to compensate for an invalid portion of a light receiving section of a CCD camera or the like, a pixel shifting technique of displacing the image forming position of the CCD image sensor successively by 1/n the magnitude of one pixel of the CCD image sensor upon image pickup is sometimes used. The technique just described is disclosed, for example, in "An Introduction to the CCD Camera Technique", Corona, 1997, pp. 109-111. This technique is used in a camera which picks up images at the same point of time using multiple plate image pickup elements or another camera wherein a single image pickup element or an optical system is oscillated to pick up images at different points of time.

As described hereinabove, the picture quality particular of moving pictures can be improved by raising the frame rate. However, in order to perform a display process in accordance with a high frame rate, a high processing speed is required for a drive circuit for driving the display element, and besides a high speed of reaction is required for a light amount modulation element for determining the intensity of the image. This is technically difficult and gives rise to an increase of the cost.

Further where two display units are used to display an image with a doubled resolution with respect to a system which uses a single display unit, although a technique for decreasing the amount of data per one dot of display so that the data transfer rate may not become high is already used, this technique does not increase the frame rate of moving pictures to be displayed. Accordingly, also in the system wherein two display units are used so that an image can be displayed with a high resolution, in order to display moving pictures which indicate a smooth movement of an object, it is necessary to raise the processing speed of the drive circuit for driving the display element and raise the speed of reaction of the light amount modulation element.

Further, conventional display apparatus use various frame rates, and usually, the NTSC system and the HD system use a frame rate of 60 Hz; the PAL system uses another frame rate of 50 Hz; and the cinema uses a further frame rate of 24 Hz. The frame rates mentioned exhibit a signification degradation of the moving picture quality such as a blur or a jerkiness. Besides, if it is tried to pick up images with higher frame rates as a countermeasure for the problem, the amount of information which can be recorded on the real time basis has been limited to such levels as those specified above from a limitation to the driving speed of image pickup elements such as a CCD image sensor or from a restriction in data transfer to a recording medium. Although a special high speed image pickup apparatus which uses a CMOS sensor has become available recently, the image pickup apparatus is expensive, and under present conditions, only a method can be taken to store image information obtained from the image pickup apparatus into a memory. Thus, the special high speed image pickup apparatus is disadvantageous in image pickup in that the recording time is short (for example, several tens seconds) and much time is required for transfer of data read out from the memory.

SUMMARY OF THE INVENTION

It is an object of the present invention to provide an image pickup apparatus and method, an image processing apparatus and method, an image display system, a recording medium and a program by which a conventional image pickup element such as a CCD image sensor can be used to pick up images of a high frame rate and the picked up high frame rate images can be displayed so as to exhibit a smooth movement of an object.

In order to attain the object described above, according to an aspect of the present invention, there is provided an image pickup apparatus for picking up moving pictures, including a distribution section for distributing light incoming through an optical lens to n directions, n image pickup elements for converting the light distributed by the distribution section into signals at time intervals of 1/m second to pick up images, and a control section for controlling timings at which the light is to be converted into the signals by the image pickup elements, the control section controlling the n image pickup elements to convert the light into the signals at timings successively displaced by 1/m×n second to pick up images.

According to another aspect of the present invention, there is provided an image pickup method for an image pickup apparatus for picking up moving pictures using n image pickup elements, including a distribution step of distributing light incoming through an optical lens to n directions, a timing signal generation step of generating a timing signal to be used to control timings at which the n image pickup elements are to pick up images, and an image pickup step of picking up the light distributed by the process at the distribution step to pick up images by means of the n image pickup elements based on the timing signal generated by the process at the timing signal generation step, the image pickup elements being capable of converting the light into signals at time intervals of 1/m second to pick up images, the timing signal generated by the process at the timing signal generation step being used to control the n image pickup elements so as to convert the light into signals to pick up images at timings successively displaced by 1/m×n second.

According to a further aspect of the present invention, there is provided a program for causing a computer to execute a process of picking up moving pictures using n image pickup elements, including a distribution step of distributing light incoming through an optical lens to n directions, a timing signal generation step of generating a timing signal to be used to control timings at which the n image pickup elements are to pick up images, and an image pickup step of picking up the light distributed by the process at the distribution step to pick up images by means of the n image pickup elements based on the timing signal generated by the process at the timing signal generation step, the image pickup elements being capable of converting the light into signals at time intervals of 1/m second to pick up images, the timing signal generated by the process at the timing signal generation step being used to control the n image pickup elements so as to convert the light into signals to pick up images at timings successively displaced by 1/m×n second.

In the image pickup apparatus and method and the program, light incoming through the optical lens is distributed to n directions, and the timings at which the n image pickup elements are to pick up images are controlled. Then, images are picked up by the n image pickup elements. The image pickup elements can convert the light into signals at time intervals of 1/m second to pick up images, and the n image pickup elements convert the light into signals to pick up images at timings successively displaced by 1/m×n second.

With the image pickup apparatus and method and the program, moving pictures can be picked up. Particularly, moving pictures of a frame rate higher than that at which a single image pickup picks up images can be picked up.

According to a still further aspect of the present invention, there is provided an image processing apparatus for processing image signals to be displayed by n image display apparatus or one image display apparatus having n display processing sections, including a storage section for storing the image signals having a first frame rate of m Hz, an output control section for controlling outputting of the image signals stored in the storage section, and a display control section for controlling display of images corresponding to the image signals whose outputting is controlled by the output control section, the output control section controlling outputting of the image signals of the first frame rate so that the image signals are successively outputted for each one frame from the storage section to the n image display apparatus or the n display processing sections, the display control section controlling the display of the images corresponding to the image signals so that the image signals successively outputted to the n image display apparatus or the n display processing sections by the output control section are successively drawn dot-sequentially or line-sequentially in phases successively displaced by 1/m×n of a scanning time period of one frame so that the images are displayed on the image display apparatus at a second frame rate equal to n times the first frame rate.

According to a yet further aspect of the present invention, there is provided an image processing method for an image processing apparatus for processing image signals to be displayed by n image display apparatus or one image display apparatus having n display processing sections, including an output control step of controlling outputting of the image signals having a first frame rate of m Hz, and a display control step of controlling display of images corresponding to the image signals whose outputting is controlled by the process at the output control step, the output control step controlling outputting of the image signals of the first frame rate so that the image signals are successively outputted for each one frame to the n image display apparatus or the n display processing sections, the display control step controlling the display of the images corresponding to the image signals so that the image signals successively outputted to the n image display apparatus or the n display processing sections by the process at the output control step are successively drawn dot-sequentially or line-sequentially in phases successively displaced by 1/m×n of a scanning time period of one frame so that the images are displayed on the image display apparatus at a second frame rate equal to n times the first frame rate.

According to a yet further aspect of the present invention, there is provided a program for causing a computer to execute processing of image signals to be displayed by n image display apparatus or one image display apparatus having n display processing sections, including an output control step of controlling outputting of the image signals having a first frame rate of m Hz, and a display control step of controlling display of images corresponding to the image signals whose outputting is controlled by the process at the output control step, the output control step controlling outputting of the image signals of the first frame rate so that the image signals are successively outputted for each one frame to the n image display apparatus or the n display processing sections, the display control step controlling the display of the images corresponding to the image signals so that the image signals successively outputted to the n image display apparatus or the n display processing sections by the process at the output control step are successively drawn dot-sequentially or line-sequentially in phases successively displaced by 1/m×n of a scanning time period of one frame so that the images are displayed on the image display apparatus at a second frame rate equal to n times the first frame rate.

In the image processing apparatus and method and the program, image signals having a first frame rate of m Hz are outputted, and display of images corresponding to the outputted image signals is controlled. In particular, outputting of the image signals of the first frame rate are controlled so that the image signals are successively outputted for each one frame to the n image display apparatus or the n display processing sections. The display of the images corresponding to the image signals is controlled so that the image signals successively outputted to the n image display apparatus or the n display processing sections are successively drawn dot-sequentially or line-sequentially in phases successively displaced by 1/m×n of a scanning time period of one frame so that the images are displayed on the image display apparatus at a second frame rate equal to n times the first frame rate.

With the image processing apparatus and method and the program, moving pictures can be picked up. Particularly, moving pictures of a frame rate higher than that at which a single image pickup picks up images can be picked up.

According to an additional aspect of the present invention, there is provided an image display system, including an image processing apparatus for processing image signals, and an image display apparatus for displaying images corresponding to the image signals processed by the image processing apparatus, the image processing apparatus including a storage section for storing the image signals having a first frame rate of m Hz, an output control section for controlling outputting of the image signals stored in the storage section, and a display control section for controlling display of images corresponding to the image signals whose outputting is controlled by the output control section, the image display apparatus including at least n image display processing sections for drawing the images dot-sequentially or line-sequentially and a display section for displaying the images drawn by the image display processing sections, the output control section controlling outputting of the image signals of the first frame rate so that the image signals are successively outputted for each one frame from the storage section to the n image display processing sections, the display control section controlling the display of the images corresponding to the image signals so that the image signals successively outputted to the n image display processing sections by the output control section are successively drawn dot-sequentially or line-sequentially in phases successively displaced by 1/m×n of a scanning time period of one frame so that the images are displayed on the image display apparatus at a second frame rate equal to n times the first frame rate.

In the image display system, the image processing apparatus stores image signals having a first frame rate of m Hz, outputs the stored image signals, and controls display of images corresponding to the outputted image signals. The image display apparatus draws the images dot-sequentially or line-sequentially and displays the drawn images. The image display is performed by the at least n image display processing sections. The image signals of the first frame rate are outputted so that the image signals are successively outputted for each one frame from the storage section to the n image display processing sections. Then, the display of the images corresponding to the image signals is controlled so that the image signals successively outputted are successively drawn dot-sequentially or line-sequentially in phases successively displaced by 1/m×n of a scanning time period of one frame so that the images are displayed on the image display apparatus at a second frame rate equal to n times the first frame rate.

With the image display systems, moving pictures can be displayed. Particularly, moving pictures of a high frame rate can be displayed.

According to another additional aspect of the present invention, there is provided an image display system, including an image processing apparatus for processing image signals, and an image display apparatus for displaying images corresponding to the image signals processed by the image processing apparatus, the image processing apparatus including a storage section for storing the image signals having a first frame rate of m Hz, an output control section for controlling outputting of the image signals stored in the storage section, and a display control section for controlling display of images corresponding to the image signals whose outputting is controlled by the output control section, the image display apparatus including at least n image display processing sections for drawing the images dot-sequentially or line-sequentially, the output control section controlling outputting of the image signals of the first frame rate so that the image signals are successively outputted for each one frame from the storage section to the n image display processing sections, the display control section controlling the display of the images corresponding to the image signals so that the image signals successively outputted to the n image display processing sections by the output control section are successively drawn dot-sequentially or line-sequentially in phases successively displaced by 1/m×n of a scanning time period of one frame so that the images are displayed on the image display apparatus at a second frame rate equal to n times the first frame rate.

In the image display system, the image processing apparatus stores image signals having a first frame rate of m Hz, outputs the stored image signals and controls display of images corresponding to the outputted image signals. The image display apparatus draws the images dot-sequentially or line-sequentially by means of the at least n image display processing sections and outputs the image signals of the first frame rate so that the image signals are successively outputted for each one frame from the storage section to the n image display processing sections. Further, the display of the images corresponding to the image signals is controlled so that the image signals successively outputted are successively drawn dot-sequentially or line-sequentially in phases successively displaced by 1/m×n of a scanning time period of one frame so that the images are displayed on the image display apparatus at a second frame rate equal to n times the first frame rate.

With the image display system, moving pictures can be displayed. Particularly, moving pictures of a high frame rate can be displayed.

According to a further additional aspect of the present invention, there is provided an image pickup apparatus for picking up moving pictures, including an image pickup section for converting light incoming through an optical lens into a signal to pick up an image, and a control section for controlling the timing at which the light is to be converted into the signal by the image pickup section and controlling the image pickup section so that the light receiving position at which the image pickup section receives the light is successively displaced by 1/n the pixel pitch of the image pickup section in a direction perpendicular to the path of the light.

According to a still further additional aspect of the present invention, there is provided an image pickup method for an image pickup apparatus for picking up moving pictures, including a timing signal generation step of generating a timing signal for controlling the light receiving position at which light incoming through an optical lens is to be received is successively displaced by 1/n the pixel pitch in a direction perpendicular to the path of the light and controlling the timing at which the light is to be converted into a signal, and an image pickup step of picking up an image based on the timing signal generated by the process at the timing signal generation step.

According to a yet further additional aspect of the present invention, there is provided a program for causing a computer to execute a process of picking up moving pictures, including a timing signal generation step of generating a timing signal for controlling the light receiving position at which light incoming through an optical lens is to be received is successively displaced by 1/n the pixel pitch in a direction perpendicular to the path of the light and controlling the timing at which the light is to be converted into a signal, and an image pickup step of picking up an image based on the timing signal generated by the process at the timing signal generation step.

In the image pickup apparatus and method and the program, light incoming through the optical lens is converted into a signal to pick up an image, and the timing at which the light is to be converted into a signal is controlled. Further, the light receiving position at which the light is to be received is successively displaced by 1/n the pixel pitch of the image pickup section in a direction perpendicular to the path of the light.

With the image pickup apparatus and method and the program, moving pictures can be picked up. Particularly, moving pictures of a high frame rate can be picked up using a pixel shifting technique of an image pickup element.

According to a yet further additional aspect of the present invention, there is provided an image pickup apparatus for picking up moving pictures, including a distribution section for distributing light incoming through an optical lens to n directions, a first image pickup section for converting the light distributed by the distribution section into a signal having information of a plurality of colors to pick up images, a second, image pickup section for converting the light distributed by the distribution section into a signal having luminance information to pick up an image, and an image information production section for combining the signals converted by the first image pickup section and having the color information and the signal converted by the second image pickup section and having the luminance information to produce image information.

According to a yet further additional aspect of the present invention, there is provided an image pickup method for an image pickup apparatus for picking up moving pictures, including a distribution step of distributing light incoming through an optical lens to n directions, an image pickup step of converting the light distributed by the process at the distribution step into a signal having information of a plurality of colors to pick up images and converting the light distributed by the process at the distribution step into a signal having luminance information to pick up an image, and an image processing step of combining the signals and having the color information and the signal having the luminance information to produce image information and both converted by the process at the image pickup step.

According to a yet further additional aspect of the present invention, there is provided a program for causing a computer to execute a process of picking up moving pictures, including a distribution step of distributing light incoming through an optical lens to n directions, an image pickup step of converting the light distributed by the process at the distribution step into a signal having information of a plurality of colors to pick up images and converting the light distributed by the process at the distribution step into a signal having luminance information to pick up an image, and an image processing step of combining the signals and having the color information and the signal having the luminance information to produce image information and both converted by the process at the image pickup step.

In the image pickup apparatus and method and the program, light incoming through the optical lens is distributed to n directions, and the distributed light is converted into a signal having information of a plurality of colors to pick up images. Further, the distributed light is converted also into a signal having luminance information to pick up an image. The converted signal having the color information and the converted signal having the luminance information are combined to produce image information.

With the image pickup apparatus and method and the program, moving pictures can be displayed. Particularly, moving pictures of a high frame rate and a high picture quality can be picked up by acquiring and combining luminance information and color information.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a block diagram showing a configuration of an image pickup apparatus to which the present invention is applied;

FIG. 19 is a diagrammatic view illustrating sights to an observer in a follow-up view and a fixed view;

FIGS. 20A to 20D are diagrammatic views illustrating different sights to an observer in different image pickup conditions, display conditions and observation conditions;

FIGS. 22A to 22D are diagrammatic views illustrating different sighs to an observer in different image pickup conditions, display conditions and observation conditions at a high frame rate;

DETAILED DESCRIPTION OF THE PREFERRED EMBODIMENTS

Figure 2:
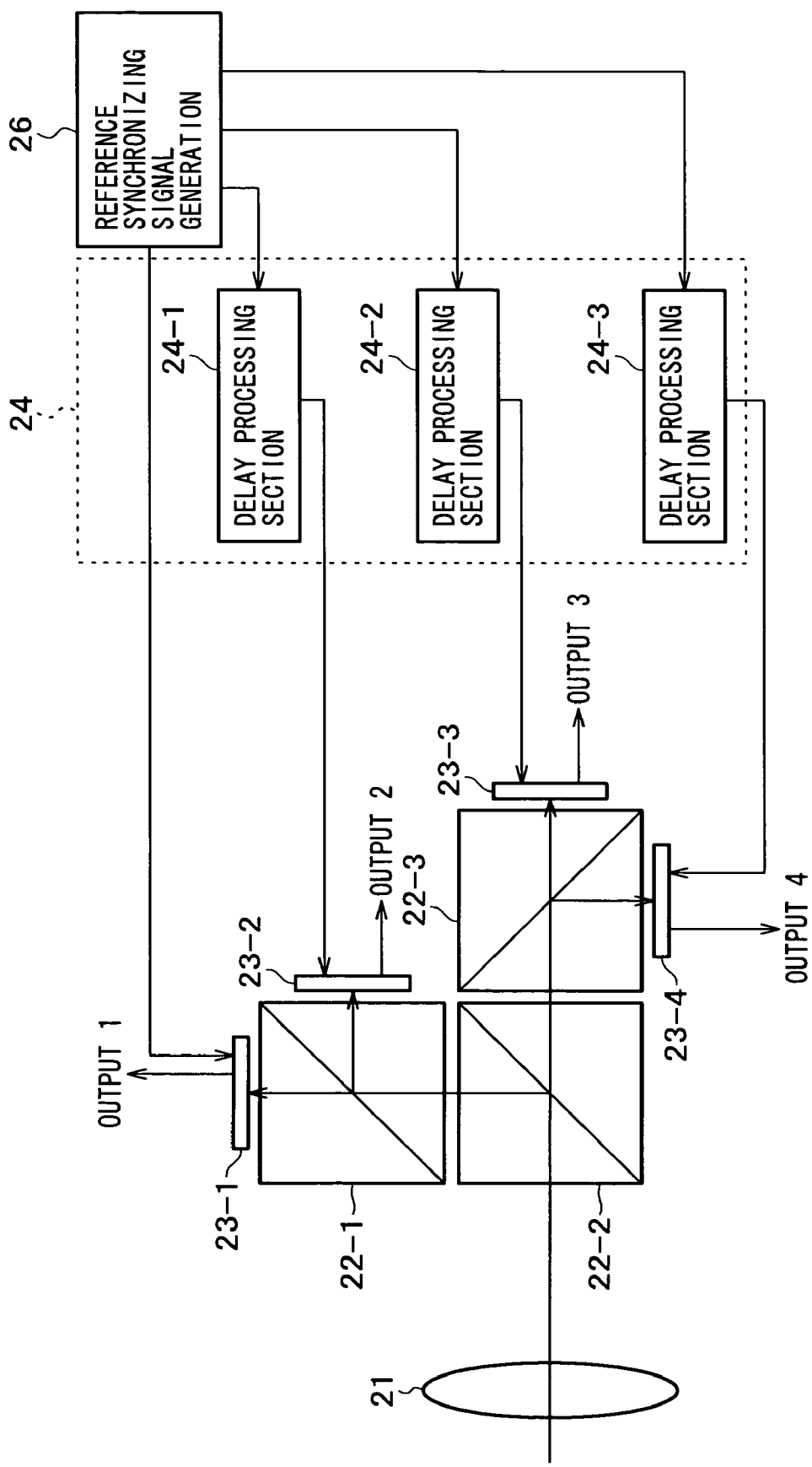
FIG. 2 is a schematic diagrammatic view showing a configuration of a prism and a CCD image sensor shown in FIG. 1.

Before a preferred embodiment of the present invention is described in detail, a corresponding relationship between several features set forth in the accompanying claims and particular elements of the preferred embodiments hereinafter described is described. The description, however, is merely for the confirmation that the particular elements which support the invention as set forth in the claims are disclosed in the description of the embodiment of the present invention. Accordingly, even if some particular element which is set forth in description of the embodiments is not set forth as one of the features in the following description, this does not signify that the particular element does not correspond to the feature. On the contrary, even if some particular element is set forth as an element corresponding to one of the features, this does not signify that the element does not correspond to any other feature than the element.

Further, the following description does not signify that the prevent invention corresponding to particular elements described in the embodiments of the present invention is all described in the claims. In other words, the following description does not deny the presence of an invention which corresponds to a particular element described in the description of the embodiment of the present invention but is not set forth in the claims, that is, the description does not deny the presence of an invention which may be filed for patent in a divisional patent application or may be additionally included into the present patent application as a result of later amendment to the claims.

According to the present invention, an image pickup apparatus can be provided. The image pickup apparatus includes a distribution section (for example, a prism 22 of FIG. 1) for distributing light incoming through an optical lens to n directions, n image pickup elements (for example, image pickup elements 23-1 to 23-4 of FIG. 2) for converting the light distributed by the distribution section into signals at time intervals of 1/m second to pick up images, and a control section (for example, a timing controller 24 of FIG. 1) for controlling timings at which the light is to be converted into the signals by the image pickup elements, the control section controlling the n image pickup elements to convert the light into the signals at timings successively displaced by 1/m×n second to pick up images.

The number of the image pickup elements may be four, and the four image pickup elements may convert the light into the signals successively displaced by an interval of time of 1/60 second to pick up images.

The number of the image pickup elements may be two, and the two image pickup elements may convert the light into the signals successively displaced by an interval of time of 1/120 second to pick up images.

The number of the image pickup elements may be five, and the five image pickup elements may convert the light into the signals successively displaced by an interval of time of 1/50 second to pick up images.

Further, according to the present invention, an image pickup method for an image pickup apparatus can be provided. The image pickup method includes a distribution step (for example, a process at step S1 of FIG. 8) of distributing light incoming through an optical lens to n directions, a timing signal generation step (for example, a process at step S2 of FIG. 8) of generating a timing signal to be used to control timings at which n image pickup elements are to pick up images, and an image pickup step (for example, a process at step S3 of FIG. 8) of picking up the light distributed by the process at the distribution step to pick up images by means of the n image pickup elements based on the timing signal generated by the process at the timing signal generation step, the image pickup elements being capable of converting the light into signals at time intervals of 1/m second to pick up images, the timing signal generated by the process at the timing signal generation step being used to control the n image pickup elements so as to convert the light into signals to pick up images at timings successively displaced by 1/m×n second.

Further, according to the present invention, a program can be provided. The program includes a distribution step (for example, a process at step S1 of FIG. 8) of distributing light incoming through an optical lens to n directions, a timing signal generation step (for example, a process at step S2 of FIG. 8) of generating a timing signal to be used to control timings at which the n image pickup elements are to pick up images, and an image pickup step (for example, a process at step S3 of FIG. 8) of picking up the light distributed by the process at the distribution step to pick up images by means of the n image pickup elements based on the timing signal generated by the process at the timing signal generation step. The image pickup elements can convert the light into signals at time intervals of 1/m second to pick up images. The timing signal generated by the process at the timing signal generation step is used to control the n image pickup elements so as to convert the light into signals to pick up images at timings successively displaced by 1/m×n second.

Further, according to the present invention, an image processing apparatus can be provided. The image processing apparatus is an image processing apparatus (for example, an image signal processing apparatus 51 of FIG. 9 or an image signal processing apparatus 101 of FIG. 26) which processes an image signal to be displayed by an image display apparatus (for example, an image display apparatus 52 of FIG. 9 or 26) and processes image signals to be displayed by n image display apparatus (for example, an image display apparatus 52 of FIG. 9 or 26) or one image display apparatus having n display processing sections (for example, scanning control sections 81-1 to 81-n of FIG. 26). The image processing apparatus includes a storage section (for example, a memory 61 of FIG. 9 or 26) for storing the image signals having a first frame rate of m Hz, an output control section (for example, a controller 62 of FIG. 9 or a controller 111 of FIG. 26) for controlling outputting of the image signals stored in the storage section, and a display control section (for example, a display control section 66 of FIG. 9 or 26) for controlling display of images corresponding to the image signals whose outputting is controlled by the output control section, the output control section controlling outputting of the image signals of the first frame rate so that the image signals are successively outputted for each one frame from the storage section to the n image display apparatus or the n display processing sections, the display control section controlling the display of the images corresponding to the image signals so that the image signals successively outputted to the n image display apparatus or the n display processing sections by the output control section are successively drawn dot-sequentially or line-sequentially in phases successively displaced by 1/m×n of a scanning time period of one frame so that the images are displayed on the image display apparatus at a second frame rate (for example, m×n Hz) equal to n times the first frame rate.

The image processing apparatus may further include a combination section (for example, a signal processing section 112 of FIG. 26) for combining the image signals stored in the storage section.

The first frame rate may be 60 Hz, and the number of the image display apparatus or the display processing sections may be at least four.

The first frame rate may be 120 Hz, and the number of the image display apparatus or the display processing sections may be at least two.

The first frame rate may be 50 Hz, and the number of the image display apparatus or the display processing sections may be at least five.

According to the present invention, an image processing method can be provided. The image processing method is an image processing method for an image processing apparatus (for example, an image signal processing apparatus 51 of FIG. 9 or an image signal processing apparatus 101 of FIG. 26) which processes an image signal to be displayed by an image display apparatus (for example, an image display apparatus 52 of FIG. 9 or 26) and processes image signals to be displayed by n image display apparatus (for example, an image display apparatus 52 of FIG. 9 or 26) or one image display apparatus having n display processing sections (for example, scanning control sections 81-1 to 81-n of FIG. 26). The image processing method includes an output control step (for example, a process at step S21 of FIG. 25) of controlling outputting of the image signals having a first frame rate of m Hz, and a display control step (for example, a process at step S23 of FIG. 25) of controlling display of images corresponding to the image signals whose outputting is controlled by the process at the output control step. The output control step controls outputting of the image signals of the first frame rate so that the image signals are successively outputted for each one frame to the n image display apparatus or the n display processing sections. The display control step controls the display of the images corresponding to the image signals so that the image signals successively outputted to the n image display apparatus or the n display processing sections by the process at the output control step are successively drawn dot-sequentially or line-sequentially in phases successively displaced by 1/m×n of a scanning time period of one frame so that the images are displayed on the image display apparatus at a second frame rate (for example, m×n Hz) equal to n times the first frame rate.

According to the present invention, a program can be provided. The program is a program for causing a computer to execute processing of image signals to be displayed by n image display apparatus (for example, image display apparatus 52 of FIG. 9 or 26) or one image display apparatus having n display processing sections (for example, image display apparatus 52 of FIG. 26) and is an image processing method for an image processing apparatus (for example, an image signal processing apparatus 51 of FIG. 9 or an image signal processing apparatus 101 of FIG. 26) which processes an image signal to be displayed by an image display apparatus (for example, an image display apparatus 52 of FIG. 9 or 26). The image processing method includes an output control step (for example, a process at step S21 of FIG. 25) of controlling outputting of the image signals having a first frame rate of m Hz, and a display control step (for example, a process at step S23 of FIG. 25) of controlling display of images corresponding to the image signals whose outputting is controlled by the process at the output control step. The output control step controls outputting of the image signals of the first frame rate so that the image signals are successively outputted for each one frame to the n image display apparatus or the n display processing sections. The display control step controls the display of the images corresponding to the image signals so that the image signals successively outputted to the n image display apparatus or the n display processing sections by the process at the output control step are successively drawn dot-sequentially or line-sequentially in phases successively displaced by 1/m×n of a scanning time period of one frame so that the images are displayed on the image display apparatus at a second frame rate (for example, m×n Hz) equal to n times the first frame rate.

Further, according to the present invention, an image display system can be provided. The image display system includes an image processing apparatus (for example, an image signal processing apparatus 51 of FIG. 9 or an image signal processing apparatus 101 of FIG. 26) for processing image signals, and an image display apparatus (for example, an image display apparatus 52 or a scanning control section 81-1 of FIG. 9 or 26) for displaying images corresponding to the image signals processed by the image processing apparatus. The image processing apparatus includes a storage section (for example, a memory 61 of FIG. 9 or 26) for storing the image signals having a first frame rate (for example, m Hz) of m Hz, an output control section (for example, a controller 62 of FIG. 9 or a controller 111 of FIG. 26) for controlling outputting of the image signals stored in the storage section, and a display control section (for example, a display control section 66 of FIG. 9 or 26) for controlling display of images corresponding to the image signals whose outputting is controlled by the output control section. The image display apparatus includes at least n image display processing sections (for example, scanning control sections 81-1 to 81-*n* of FIG. 9 or 26) for drawing the images dot-sequentially or line-sequentially and a display section (for example, a display section 82 of FIG. 9 or 26) for displaying the images drawn by the image display processing sections. The output control section controls outputting of the image signals of the first frame rate so that the image signals are successively outputted for each one frame from the storage section to the n image display processing sections. The display control section controls the display of the images corresponding to the image signals so that the image signals successively outputted to the n image display processing sections by the output control section are successively drawn dot-sequentially or line-sequentially in phases successively displaced by 1/m×n of a scanning time period of one frame so that the images are displayed on the image display apparatus at a second frame rate (for example, m×n Hz) equal to n times the first frame rate.

Further, according to the present invention, an image display system can be provided. The image display system includes an image processing apparatus (for example, an image signal processing apparatus 51 of FIG. 9 or an image signal processing apparatus 101 of FIG. 26) for processing image signals, and an image display apparatus (for example, an image display apparatus 52 or a scanning control section 81-1 of FIG. 9 or 26) for displaying images corresponding to the image signals processed by the image processing apparatus. The image processing apparatus includes a storage section (for example, a memory 61 of FIG. 9 or 26) for storing the image signals having a first frame rate (for example, m Hz) of m Hz, an output control section (for example, a controller 62 of FIG. 9 or a controller 111 of FIG. 26) for controlling outputting of the image signals stored in the storage section, and a display control section (for example, a display control section 66 of FIG. 9 or 26) for controlling display of images corresponding to the image signals whose outputting is controlled by the output control section. The image display apparatus includes at least n image display processing sections (for example, display control sections 81-1 to 81-*n* of FIG. 9 or 26) for drawing the images dot-sequentially or line-sequentially. The output control section controls outputting of the image signals of the first frame rate so that the image signals are successively outputted for each one frame from the storage section to the n image display processing sections. The display control section controls the display of the images corresponding to the image signals so that the image signals successively outputted to the n image display processing sections by the output control section are successively drawn dot-sequentially or line-sequentially in phases successively displaced by 1/m×n of a scanning time period of one frame so that the images are displayed on the image display apparatus at a second frame rate (for example, m×n Hz) equal to n times the first frame rate.

The image display apparatus may be formed from a projector for displaying the images by projection.

According to the present invention, an image pickup apparatus can be provided. The image pickup apparatus includes an image pickup section (for example, a CCD image sensor 181 of FIG. 33) for converting light incoming through an optical lens into a signal to pick up an image, and a control section (for example, a timing controller 183 of FIG. 33) for controlling the timing at which the light is to be converted into the signal by the image pickup section and controlling the image pickup section so that the light receiving position at which the image pickup section receives the light is successively displaced by 1/n the pixel pitch of the image pickup section in a direction perpendicular to the path of the light.

The image pickup apparatus may further include a pixel interpolation section (for example, an image processing section 182 of FIG. 33) for performing a pixel interpolation process in a spatial direction for a picture formed from the image picked up by the image pickup section.

According to the present invention, an image pickup method can be provided. The image pickup method is an image pickup method for an image pickup apparatus for picking up moving pictures and includes a timing signal generation step (for example, a process at step S81 of FIG. 37) of generating a timing signal for controlling the light receiving position at which light incoming through an optical lens is to be received is successively displaced by 1/n the pixel pitch in a direction perpendicular to the path of the light and controlling the timing at which the light is to be converted into a signal, and an image pickup step (for example, a process at step S82 of FIG. 37) of picking up an image based on the timing signal generated by the process at the timing signal generation step.

According to the present invention, a program can be provided. The program is a program for causing a computer to execute a process of picking up moving pictures and includes a timing signal generation step for example, a process at step S81 of FIG. 37) of generating a timing signal for controlling the light receiving position at which light incoming through an optical lens is to be received is successively displaced by 1/n the pixel pitch in a direction perpendicular to the path of the light and controlling the timing at which the light is to be converted into a signal, and an image pickup step (for example, a process at step S82 of FIG. 37) of picking up an image based on the timing signal generated by the process at the timing signal generation step.

According to the present invention, an image pickup apparatus can be provided. The image pickup apparatus includes a distribution section (for example, a prism 211 of FIG. 38) for distributing light incoming through an optical lens to n directions, a first image pickup section (for example, any of image pickup elements 212-1 to 212-4 of FIG. 39) for converting the light distributed by the distribution section into a signal having information of a plurality of colors to pick up images, a second image pickup section (for example, any of the image pickup elements 212-1 to 212-4 of FIG. 39) for converting the light distributed by the distribution section into a signal having luminance information to pick up an image, and an image information production section (for example, an image processing section 213 of FIG. 38) for combining the signals converted by the first image pickup section and having the color information and the signal converted by the second image pickup section and having the luminance information to produce image information.

A sampling frequency of the color information converted by the first image pickup section may be lower than a sampling frequency of the luminance information converted by the second image pickup section.

According to the present invention, an image pickup method can be provided. The image pickup method is an image pickup method for an image pickup apparatus for picking up moving pictures and includes a distribution step (for example, a process at step S101 of FIG. 42) of distributing light incoming through an optical lens to n directions, an image pickup step (for example, a process at step S102 of FIG. 42) of converting the light distributed by the process at the distribution step into a signal having information of a plurality of colors to pick up images and converting the light distributed by the process at the distribution step into a signal having luminance information to pick up an image, and an image processing step (for example, a process at step S103 of FIG. 42) of combining the signals and having the color information and the signal having the luminance information to produce image information and both converted by the process at the image pickup step.

According to the present invention, a program can be provided. The program is a program for causing a computer to execute a process of picking up moving pictures and comprises a distribution step (for example, a process at step S101 of FIG. 42) of distributing light incoming through an optical lens to n directions, an image pickup step (for example, a process at step S102 of FIG. 42) of converting the light distributed by the process at the distribution step into a signal having information of a plurality of colors to pick up images and converting the light distributed by the process at the distribution step into a signal having luminance information to pick up an image, and an image processing step (for example, a process at step S103 of FIG. 42) of combining the signals and having the color information and the signal having the luminance information to produce image information and both converted by the process at the image pickup step.

In the following, preferred embodiments of the present invention are described with reference to the accompanying drawings.

Referring first to FIG. 1, there is shown an image pickup apparatus 1 to which the present invention is applied. The image pickup apparatus 1 includes a lens 21, a prism 22, a CCD (Charge Coupled Device) image sensor 23, a timing controller 24, a controller 25, and a reference synchronizing signal generation section 26. The image pickup apparatus 1 further includes a correlated double sampling processing section 27, an A/D (analog to digital) converter 28, an image processing section 29, a codec (compression/decompression) processing section 30, a memory 31, an operation inputting section 32, and a drive 33.

The prism 22 is formed from prism beam splitters which has a reflection factor of 1/n with respect to light incoming through the lens 21 where n is the number of image pickup elements included in the CCD image sensor 23. The prism 22 splits the light incoming through the lens 21 into n lights and supplies the n lights to the n image pickup elements of the CCD image sensor 23.

A CCD is a (photoelectrically converting) semiconductor element for converting light information into an electric signal, and the CCD image sensor 23 includes n image pickup elements each of which includes a plurality of arrayed light receiving elements (pixels) for converting light into electricity such that a variation of light is converted into an electric signal independently for each pixel. It is to be noted that, while the CCD image sensor 23 includes n image pickup elements, each of the image pickup elements is formed from a CCD image sensor not of the double plate type but of the common single plate type. In the image pickup elements of the single plate type, a color filter of the Bayer array wherein color filters of, for example, the primary colors of R, G and B are arranged in a mosaic fashion is formed for each light receiving element. The color filters of the image pickup elements of the CCD image sensor 23 may have an array different from the Bayer array.

The image pickup elements of the CCD image sensor 23 acquire image information at timings different from one another under the control of the timing controller 24. The timing controller 24 successively delays a reference synchronizing signal supplied thereto from the reference synchronizing signal generation section 26 by a predetermined interval of time to produce trigger signals. The trigger signals are individually supplied to the image pickup elements of the CCD image sensor 23 under the control of the controller 25.

The controller 25 controls the timing controller 24, correlated double sampling processing section 27, A/D converter 28, image processing section 29, codec processing section 30 and memory 31 based on an operation input of a user inputted through the operation inputting section 32. The reference synchronizing signal generation section 26 generates a reference synchronizing signal for allowing the timing controller 24 to control the image pickup elements of the CCD image sensor 23 and supplies the reference synchronizing signal to the timing controller 24.

The correlated double sampling processing section 27 performs subtraction between signals obtained by sampling output pixel signals of the CCD image sensor 23 within an image signal period. The correlated double sampling processing section 27 signals obtained by sampling the output pixel signals within a reference period to remove reset noise which is a principal component of noise included in the output signals of the CCD image sensor 23. The A/D converter 28 converts analog signals after such noise removal supplied thereto into digital signals.

The image processing section 29 is a block including a signal processing processor and an image RAM. The signal processor performs an image process programmed in advance or an image process constructed as an arithmetic operation process by hardware for image data stored in the image RAM.

The codec processing section 30 executes a process in accordance with a compression or decompression algorithm of digital image data. The memory 31 is formed, for example, from a semiconductor memory, a magnetic disk, a magneto-optical disk, an optical disk or the like, and stores data supplied thereto or outputs stored data under the control of the controller 25. It is to be noted that the memory 31 may be removably loaded into the image pickup apparatus 1.

The operation inputting section 32 typically includes a jog dial, keys, levers, buttons including a button for issuing an instruction to display a moving picture, a touch panel and so forth, and receives and supplies an operation input by the user to the controller 25. The drive 33 is connected to the controller 25 as occasion demands. A magnetic disk 41, an optical disk 42, a magneto-optical disk 43, a semiconductor memory 44 or the like is suitably loaded into the drive 33 such that a computer program read from the thus loaded medium is executed by the controller 25 as occasion demands.

Now, operation of the image pickup apparatus 1 is described.

Light inputted through the lens 21 is split by the prism 22 and introduced into the CCD image sensor 23, on which the split lights are converted into electric signals by photoelectric conversion by the n light receiving elements at timings controlled by the timing controller 24. The electric signals are supplied to the correlated double sampling processing section 27. The correlated double sampling processing section 27 performs subtraction between signals obtained by sampling the output pixel signals of the CCD image sensor 23 for an image signal period and signals obtained by sampling the output pixel signals for a reference period to remove noise from the pixel signals. Then, the resulting pixel signals are supplied to the A/D converter 28. The A/D converter 28 converts the analog signals after the noise removal supplied thereto into digital signals and temporarily stores the digital signal into the image RAM of the image processing section 29.

The image processing section 29 receives supply of the stream data of the pixels at a fixed rate and temporarily stores the pixel stream data into the image RAM. The signal processing processor executes various image processes such as, for example, white balance adjustment, a demosaic process, a matrix process, gamma correction and YC conversion for the temporarily stored image data.

The codec processing section 30 performs encoding of a predetermined system for the image data supplied thereto from the image processing section 29 and supplies the encoded image data to the memory 31 so as to be stored into the memory 31.

Now, the prism 22 and image acquisition timings of the four image pickup elements of the CCD image sensor 23 are described with reference to FIGS. 2 and 3. Here, it is assumed that the number n of image pickup pixels included in the CCD image sensor 23 is 4 and the prism 22 is formed from beam splitters which exhibit a reflection factor of ¼ with respect to light incoming through the lens 21 and splits the light incoming through the lens 21 into four lights. The four split lights are individually supplied to the four image pickup elements of the CCD image sensor 23.

The prism 22 includes three prism beam splitters 22-1 to 22-3 each of which allows 50 percent of incoming light thereto to pass therethrough straightforwardly and reflects the remaining 50 percent of the incoming light perpendicularly from the path of the incoming light.

The light incoming through the lens 21 is split into two lights by the prism beam splitter 22-2, and the two lights are supplied to the prism beam splitter 22-1 and the prism beam splitter 22-3. The light incoming to the prism beam splitter 22-1 is further divided into two lights, which are individually supplied to the first image pickup element 23-1 and the second image pickup element 23-2 of the CCD image sensor 23. Meanwhile, the light incoming to the prism beam splitter 22-3 is further divided into two lights, which are individually supplied to the third image pickup element 23-3 and the fourth image pickup element 23-4 of the CCD image sensor 23. The lengths of the light paths of the incoming lights supplied to the first to fourth image pickup elements 23-1 to 23-4 from the lens 21 are all equal to each other.

Each of the first to fourth image pickup elements 23-1 to 23-4 receives supply of a driving signal which indicates a timing for image acquisition (timing at which photoelectric conversion is to be performed) from the timing controller 24.

The timing controller 24 includes three delay processing sections 24-1 to 24-3. The delay processing sections 24-1 to 24-3 delay a reference synchronizing signal supplied thereto from the reference synchronizing signal generation section 26 individually by predetermined time widths.

Figure 3:
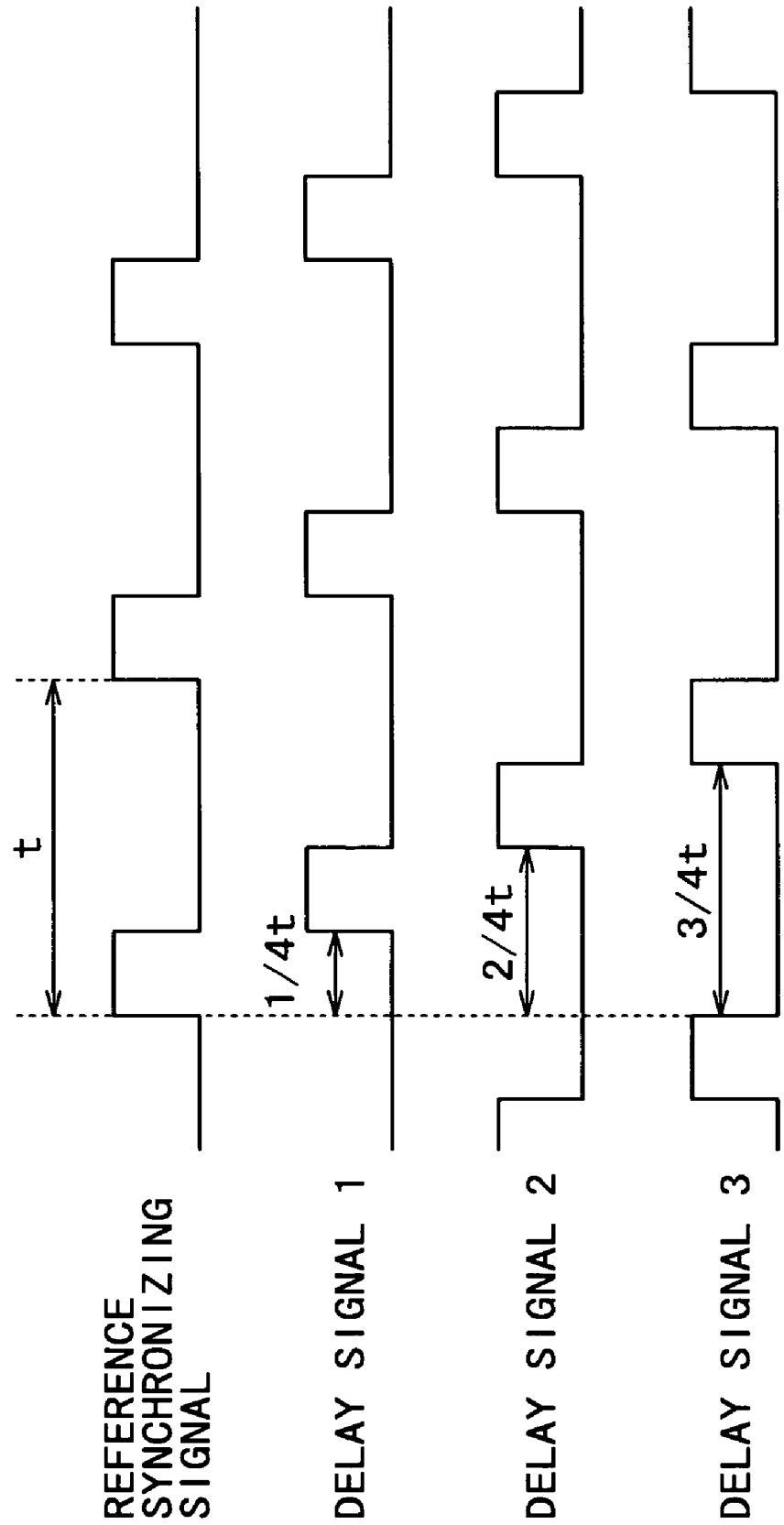
FIG. 3 is a waveform diagram illustrating a reference synchronizing signal and delay signals.

In particular, referring to FIG. 3, the timing controller 24 supplies a reference synchronizing signal of 1/t Hz supplied thereto from the reference synchronizing signal generation section 26, and supplies a delay signal 1 of 1/t Hz delayed by (¼)t from the reference synchronizing signal to the CCD image sensor 23. The timing controller 24 further supplies a delay signal 2 of 1/t Hz delayed by (2/4)t from the reference synchronizing signal and a delay signal 3 of 1/t Hz delayed by (¾)t from the reference synchronizing signal to the CCD image sensor 23.

The reference synchronizing signal is supplied to the first image pickup element 23-1; the delay signal 1 is supplied to the second image pickup element 23-2; the delay signal 2 is supplied to the third image pickup element 23-3; and the delay signal 3 is supplied to the fourth image pickup element 23-4.

For example, where the limits to the driving speed of the image pickup elements of the CCD image sensor 23 are 60 Hz, if the frequency of the reference synchronizing signal is 60 Hz (in other words, t=1/60 second) and the delay signal 1 is delayed by 1/15 second from the reference synchronizing signal whereas the delay signal 2 is delayed by 2/15 second from the reference signal and the delay signal 3 is delayed by 3/15 second from the reference signal, the frame rate of images picked up by the first to fourth image pickup elements 23-1 to 23-4 is 60×4=240 Hz. Further, if the shutter speeds of the first to fourth image pickup elements 23-1 to 23-4 are individually set to 1/15 second, then more accurate moving pictures can be obtained.

Similarly, also where the number n of image pickup elements included in the CCD image sensor 23 is different than 4, the prism 22 is formed from prism beam splitters whose reflection factor is 1/n with respect to light incoming through the lens 21 and splits the incoming light through the lens 21 into n lights to be supplied to the n image pickup elements of the CCD image sensor 23. Then, where the frequency of the reference synchronizing signal is m Hz, the timing controller 24 produces n−1 delay signals which are successively delayed by 1/n×m second and supplies the reference synchronizing signal and the n−1 delay signals to the n image pickup elements of the CCD image sensor 23. Consequently, images of a high frame rate of m×n Hz can be acquired.

For example, where the number n of the image pickup elements is 5 and the frequency of the reference synchronizing signal is 50 Hz, images of a high frame rate of 250 Hz are acquired by the five image pickup elements of the CCD image sensor 23.

By the configuration described above, images of a frame rate higher than the limit to the driving speed of the individual image pickup elements of the CCD image sensor 23 can be acquired.

The acquired image data are processed by the correlated double sampling processing section 27, A/D converter 28, image processing section 29 and codec processing section 30 and stored into the memory 31. Although the image data acquired at this time may be processed and stored as moving picture data of a high frame rate of m×n Hz, they may otherwise be processed and stored individually as n series of moving picture data of m Hz whose phases are successively displaced by 1/n. Where n series of moving picture data of m Hz having phases successively displaced by 1/n are processed and stored individually, n moving picture data files are produced in the memory 31 and outputted individually.

Figure 4:
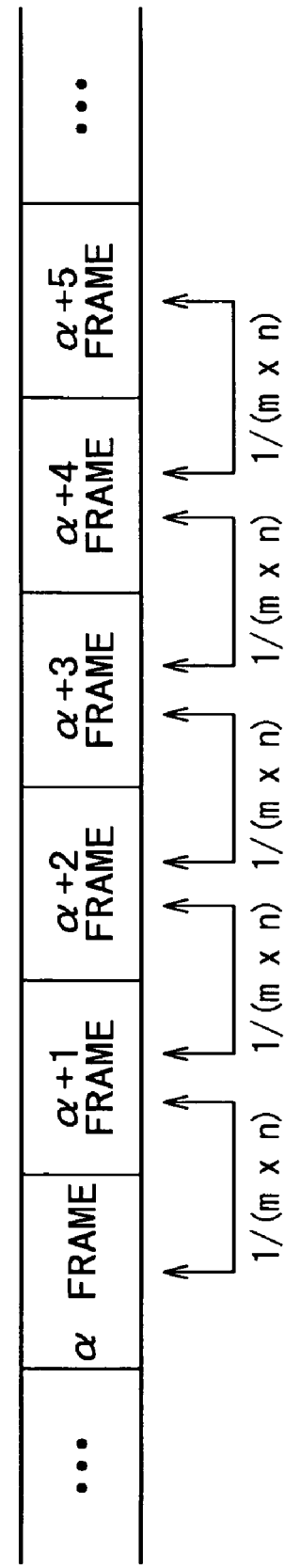
FIG. 4 is a diagrammatic view illustrating picked up frame image data.

Storage of acquired image data as moving picture data of a high frame rate of m×n Hz into the memory 31 is described with reference to FIG. 4. Here, n=4 as described hereinabove with reference to FIGS. 2 and 3, and an example wherein image data are acquired by the image pickup elements 23-1 to 23-4 of the CCD image sensor 23 is described. However, whatever value n has other than 4, moving picture data of the high frame rate of m×n Hz are successively stored into the memory 31 as seen in FIG. 4. Therefore, description of another example wherein n has a value other than 4 is omitted herein.

For example, where an α frame which is an αth frame is acquired by the first image pickup element 23-1 of the CCD image sensor 23, the α+1 frame is acquired by the image pickup element 23-2 after a delay of 1/m×n second from the α frame. The α+2 frame is acquired by the image pickup element 23-3 after a delay of 1/m×n second from the α+1 frame, and the α+3 frame is acquired by the image pickup element 23-4 after a delay of 1/m×n second from the α+2 frame. The α+4 frame is acquired by the image pickup element 23-1 after a delay of 1/m×n second from the α+3 frame, and the α+5 frame is acquired by the image pickup element 23-1 after a delay of 1/m×n second from the α+4 frame.

Where the acquired image data are stored as moving picture data of the high frame rate of m×n Hz into the memory 31, since image-processed frames are successively stored into the memory 31, the difference in time between adjacent ones of stored frames is 1/m×n.

Figure 5:
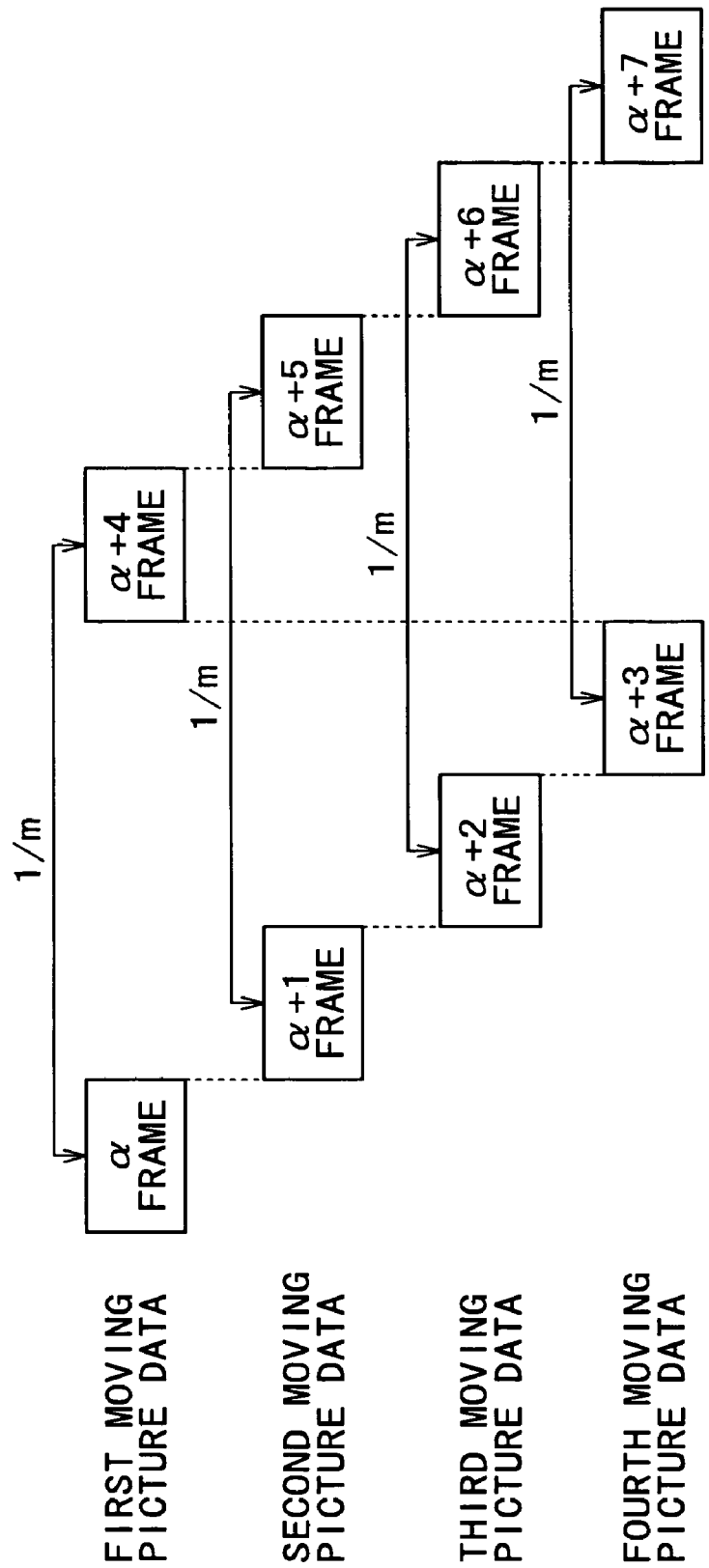
FIG. 5 is a diagrammatic view illustrating frame image data picked up where n=4.

Storage of acquired image data as n series of moving picture data of m Hz whose phases are successively displaced by 1/n into the memory 31 is described with reference to FIGS. 5 and 6. FIG. 5 illustrates an example wherein n=4 while FIG. 6 illustrates another example wherein n=5.

Where n=4, as seen in FIG. 5, first moving picture data stored into the memory 31 are moving picture data of the frame rate m of the α frame, α+4 frame; second moving picture data are moving picture data of the frame rate m of the α+1 frame, α+5 frame; third moving picture data are moving picture data of the frame rate m of the α+2 frame, α+6 frame; and fourth moving picture data are moving picture data of the frame rate m of the α+3 frame, α+7 frame. It is to be noted that, while, in FIG. 5, the frames are shown separately from one another so as to clearly indicate the relationship in acquisition time between frames, naturally the frame image data stored as the first to fourth moving picture data may be stored continuously or successively.

Figure 6:
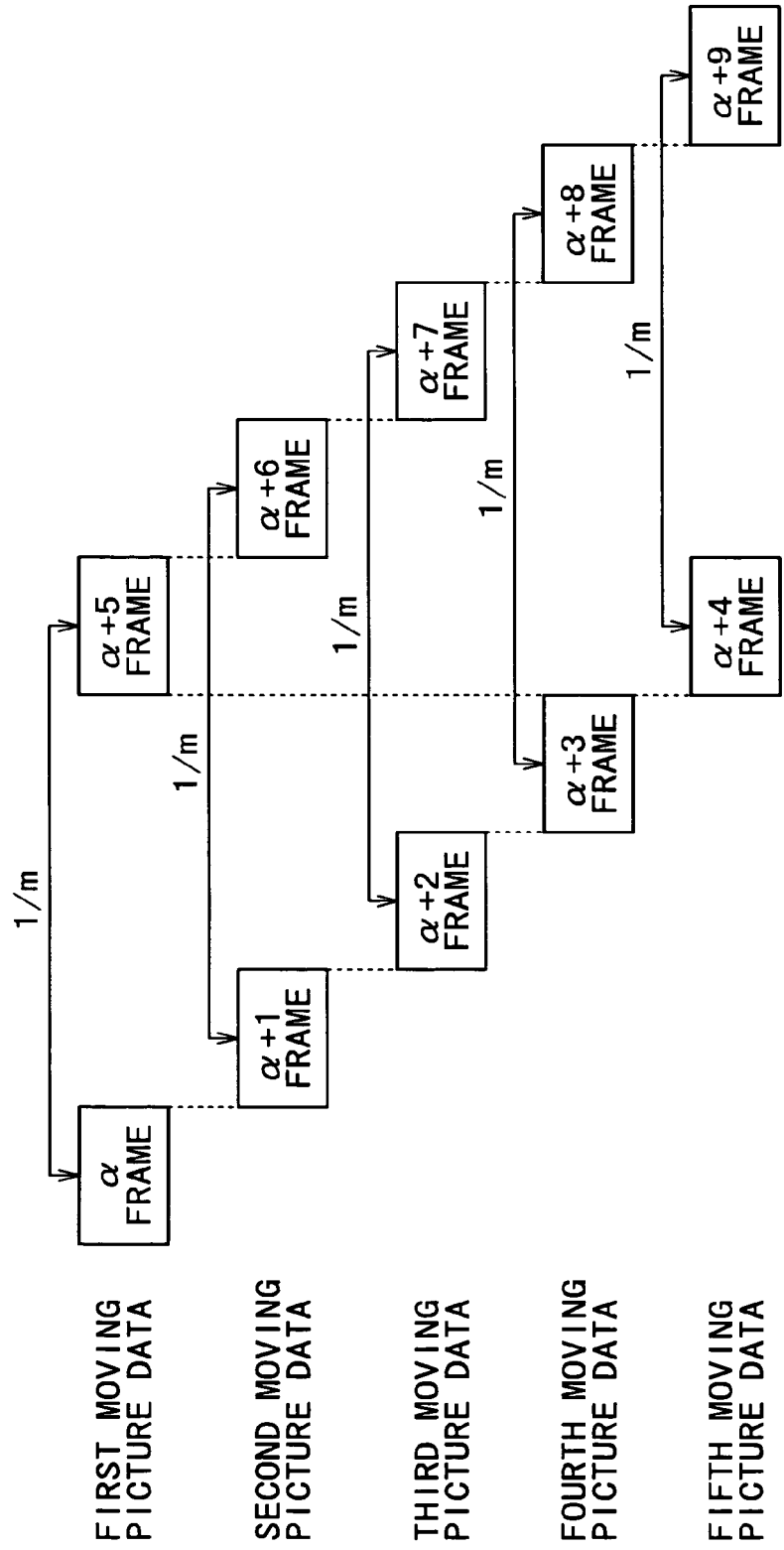
FIG. 6 is a diagrammatic view illustrating frame image data picked up where n=5.

For example, where n=4 and image data are acquired by the first to fourth image pickup elements 23-1 to 23-4 of the CCD image sensor 23 as described hereinabove with reference to FIGS. 2 and 3, preferably the image data acquired by the individual image pickup elements are processed independently of each other and stored as first to fourth moving picture data into the memory 31.

Where n=5, as seen in FIG. 6, first moving picture data stored into the memory 31 are moving picture data of the frame rate m of the α frame, α+5 frame, second moving picture data are moving picture data of the frame rate m of the α+1 frame, α+6 frame; third moving picture data are moving picture data of the frame rate m of the α+2 frame, α+7 frame; fourth moving picture data are moving picture data of the frame rate m of the α+3 frame, α+8 frame; and fifth moving picture data are moving picture data of the frame rate m of the α+4 frame, α+9 frame. It is to be noted that, while, also in FIG. 6, the frames are shown separately from one another so as to clearly indicate the relationship in acquisition time between frames, naturally the frame image data stored as the first to fourth moving picture data may be stored continuously or successively.

It is to be noted that, even where n has a value different then 4 or 5 such as, for example, 2, 3 or 6, acquired image data can be individually processed and stored as n series of moving picture data of m Hz whose phases are successively displaced by 1/n into the memory 31. Further, the memory 31 may be configured in such a manner as, for example, to receive supply of n series of moving picture data of m Hz whose phases are successively displaced by 1/n and store the n series of moving picture data collectively as a number of series of moving picture data equal to, for example, n/2 or n/3.

Figure 7:
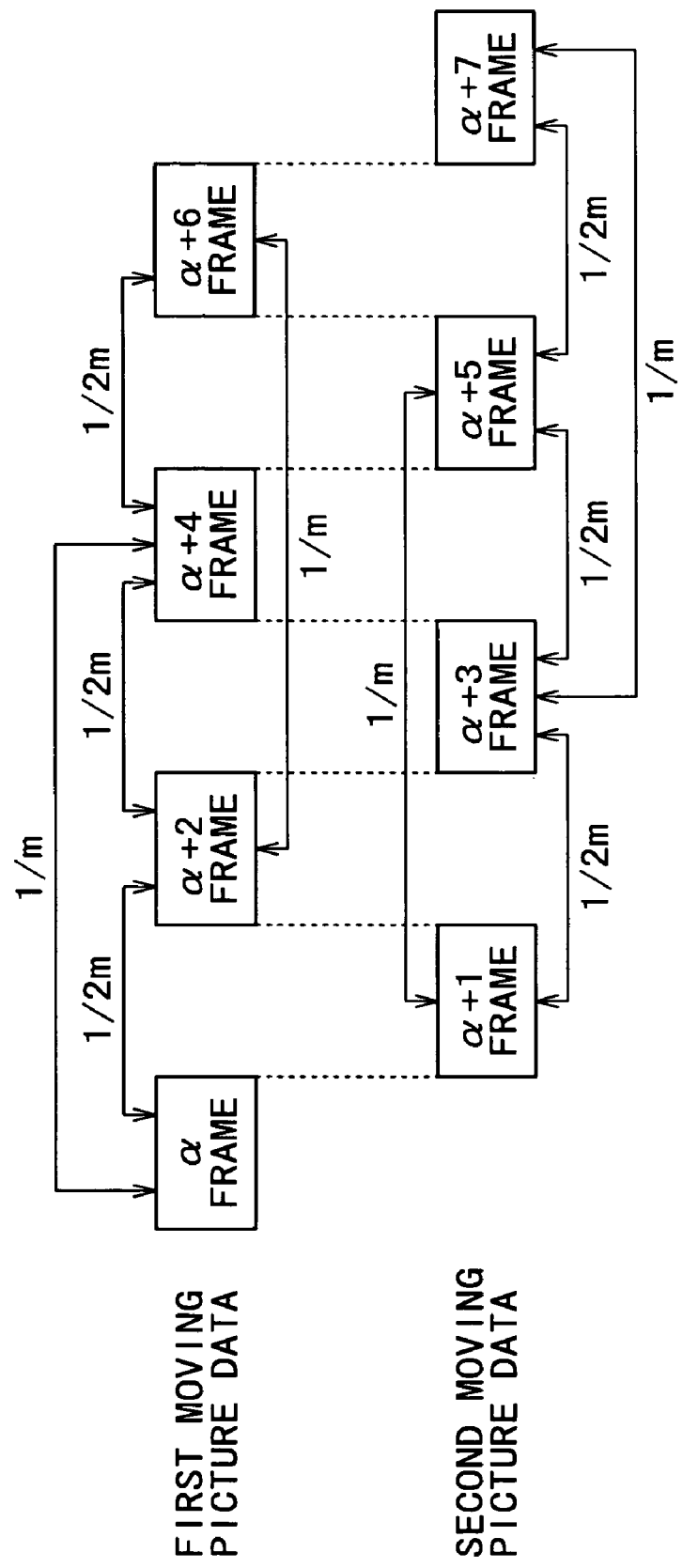
FIG. 7 is a diagrammatic view illustrating storage of four series of moving picture data as two series of moving picture data.

For example, where such four series of moving picture data as described hereinabove with reference to FIG. 5 are supplied to the memory 31, the four series of moving picture data can be stored as two series of moving picture data into the memory 31 as seen in FIG. 7. In this instance, as seen in FIG. 7, first moving picture data stored into the memory 31 are moving picture data of the α frame, α+2 frame, α+4 frame, and second moving picture data are moving picture data of the α+1 frame, α+3 frame, α+5 frame. In short, the first moving picture data and the second moving picture data have a frame rate of 2 m.

Figure 8:
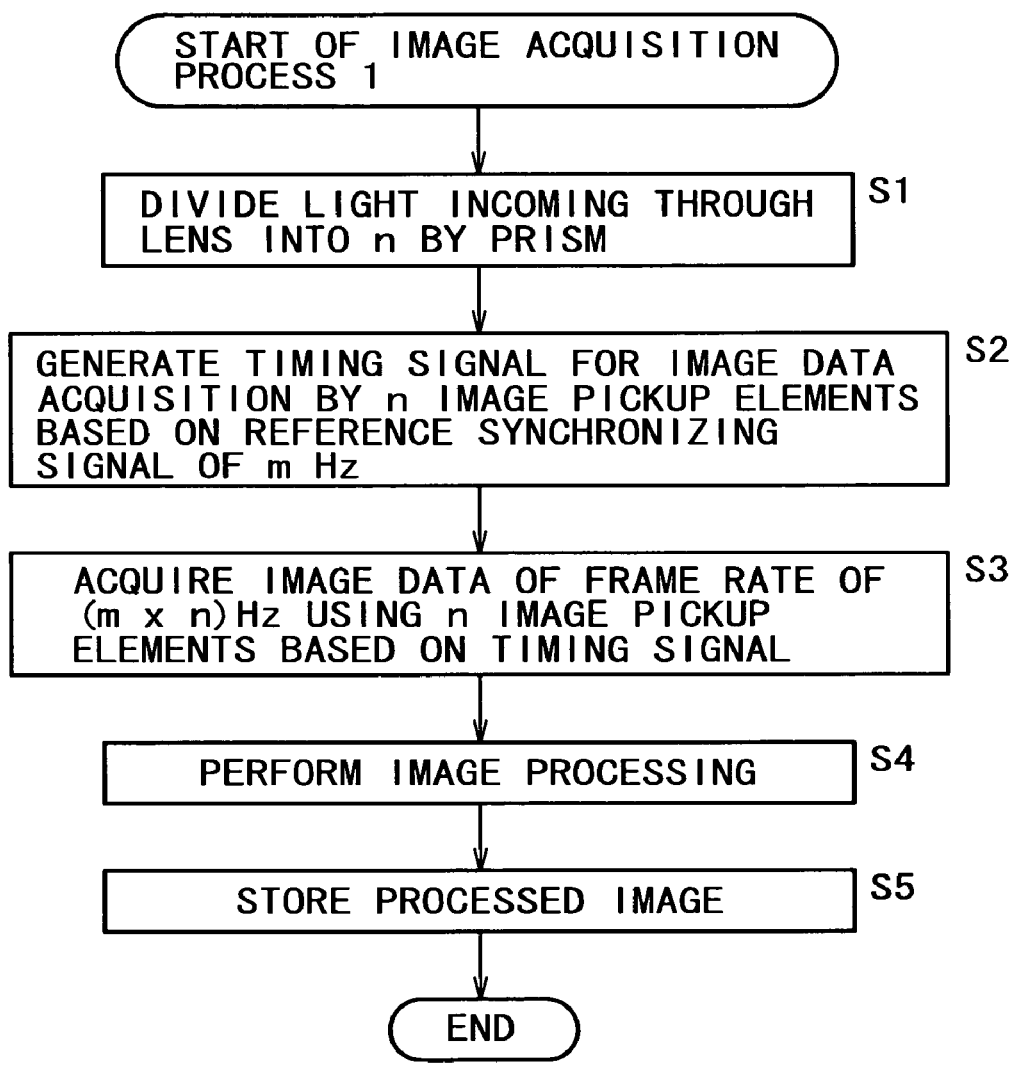
FIG. 8 is a flow chart illustrating an image acquisition process 1.

Now, an image acquisition process 1 is described with reference to a flow chart of FIG. 8.

At step S1, the prism 22 splits light incoming through the lens 21 into n lights (in the example described hereinabove with reference to FIG. 2, into four lights) and supplies the n lights individually to the n image pickup elements (in the example described hereinabove with reference to FIG. 2, the image pickup elements 23-1 to 23-4) of the CCD image sensor 23.

At step S2, the timing controller 24 generates timing signals for image data acquisition by the n image pickup elements based on the reference synchronizing signal of m Hz supplied thereto from the reference synchronizing signal generation section 26, that is, n−1 delay signals successively delayed by 1/m×n second. The timing controller 24 supplies the reference synchronizing signal and the n−1 delay signals to the n image pickup elements of the CCD image sensor 23.

At step S3, the CCD image sensor 23 acquires image data of the frame rate of m×n Hz using the n image pickup elements thereof based on the timing signals supplied thereto from the timing controller 24.

At step S4, the correlated double sampling processing section 27, A/D converter 28, image processing section 29 and codec processing section 30 perform image processing for the image data of the frame rate of m×n Hz acquired by the CCD image sensor 23.

At step S5, the memory 31 receives supply of and stores the processed image, and then the processing is ended.

Through the process described above, image data of the frame rate of m×n Hz are acquired using the n image pickup elements and stored. The image data of the frame rate of m×n Hz may be stored as n moving picture data of m Hz having phases successively displaced by 1/n into the memory 31.

Now, a display method of image data of the frame rate of m×n Hz acquired in such a manner as described above is described.

Figure 9:
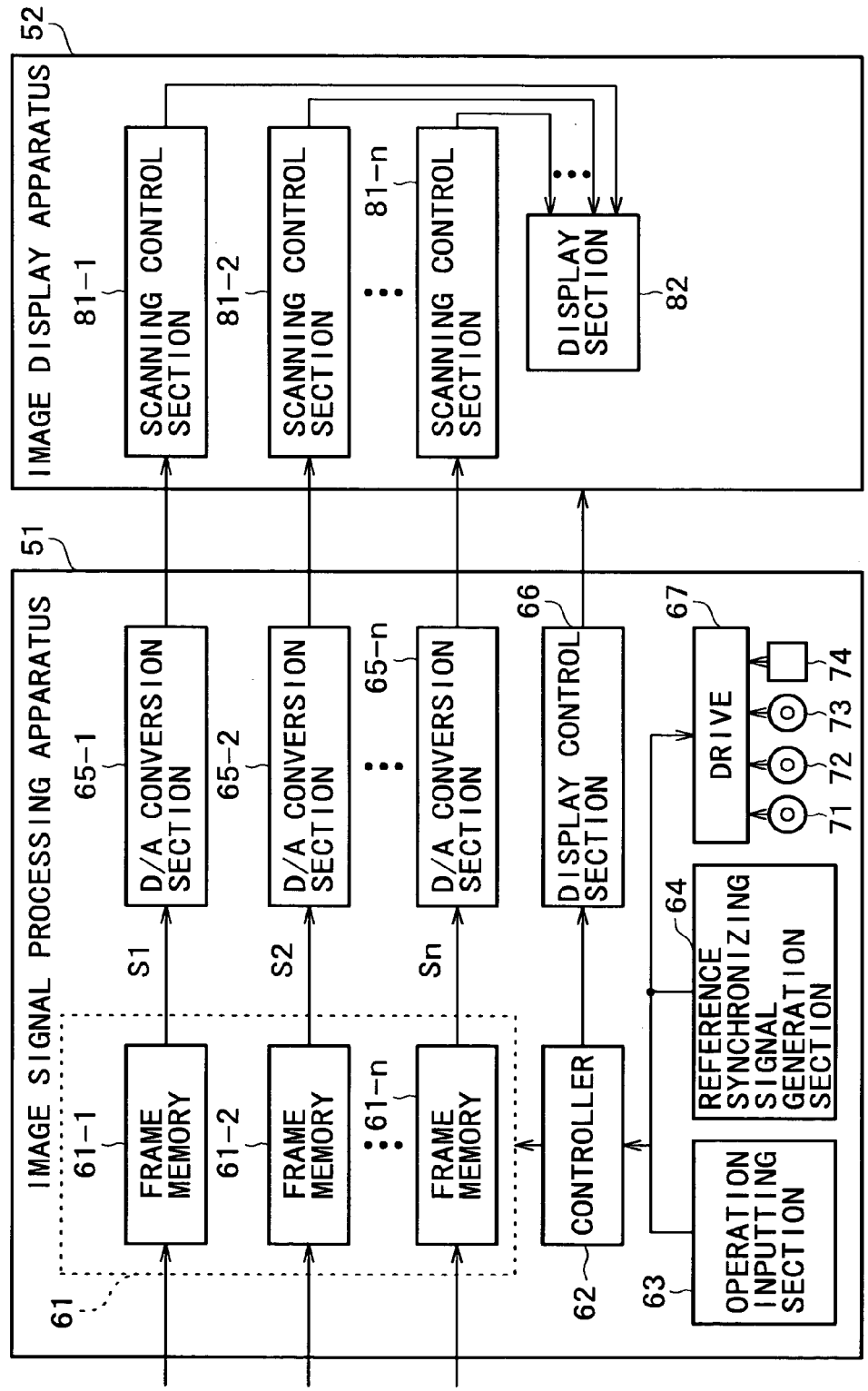
FIG. 9 is a block diagram showing a configuration of an image signal processing apparatus and an image display apparatus to which the present invention is applied.

FIG. 9 shows a configuration of an image signal processing apparatus 51 and an image display apparatus 52 to which the present invention is applied.

To the image signal processing apparatus 51, n series of moving picture data of m Hz having phases successively displaced by 1/n which form image data of the frame rate of m×n Hz are supplied individually. The n series of moving picture data are individually supplied to and stored into frame memories 61-1 to 61-n of a memory 61.

A controller 62 controls outputting of image signals from the frame memories 61-1 to 61-n based on a reference synchronizing signal of m Hz supplied thereto from a reference synchronizing signal generation section 64. The controller 62 supplies information regarding the outputting of the image signals from the frame memories 61-1 to 61-n to a display control section 66 in accordance with an operation input of the user inputted from an operation inputting section 63. The operation inputting section 63 typically includes a jog dial, keys, levers, buttons including a button for issuing an instruction to display a moving picture, a touch panel and so forth, and receives and supplies an operation input by the user to the controller 62. The reference synchronizing signal generation section 64 generates a synchronizing signal to be used as a reference for control of the plural frame memories 61-1 to 61-n of the memory 61 and supplies the synchronizing signal to the controller 62.

The frame memories 61-1 to 61-n of the memory 61 output digital image signals S1 to Sn supplied thereto to D/A conversion sections 65-1 to 65-n, based on information supplied thereto from the controller 62.

The D/A conversion sections 65-1 to 65-n convert digital image signals S1 to Sn supplied thereto from the frame memories 61-1 to 61-n into analog image signals and supplies the analog image signals to scanning control sections 81-1 to **81-*n* of the image display apparatus 52. The display control section 66 controls the display of moving pictures by the image display apparatus 52 based on information supplied thereto from the controller 62 so that the image display apparatus 52** displays frame images of the frame rate of m×n Hz.

A drive 67 is connected to the controller 62 as occasion demands. A magnetic disk 71, an optical disk 72, a magneto-optical disk 73, a semiconductor memory 74 or the like is suitably loaded into the drive 67 such that a computer program read from the thus loaded medium is executed by the controller 62 as occasion demands.

Timings of image data read out from the frame memories 61-1 to **61-*n* under the control of the controller 62 are described with reference to FIGS. 10 to 13**.

Figure 10:
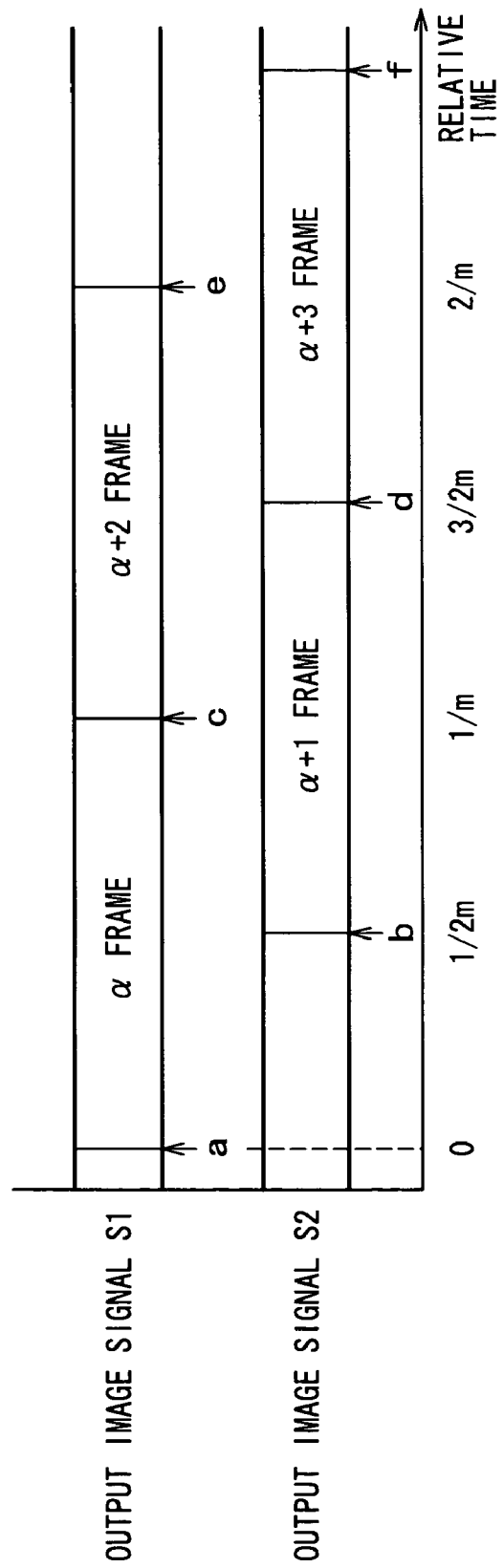
FIG. 10 is a diagrammatic view illustrating output image signals where n=2.

First, timings of image data read out from the frame memories 61-1 to **61-*n* where n=2 are described with reference to FIG. 10**.

The controller 62 controls the frame memories 61-1 and 61-2 so that the α frame of the frame rate m is supplied as an output image signal S1 from the frame memory 61-1 to a D/A conversion section 65-1, and the α+1 frame of the frame rate m is supplied as an output image signal S2 from the frame memory 61-2 to a D/A conversion section 65-2 at a supply start timing b delayed by $\frac{1}{2}$m from the supply start timing a of the α frame.

The time required to supply the α frame to the D/A conversion section 65-1 is 1/m, and the supply end timing c is later by $\frac{1}{2}$ m than the supply start timing b of the α+1 frame to the D/A conversion section 65-2. Then, from the timing c, the α+2 frame is supplied from the frame memory 61-1 to the D/A conversion section 65-1 in a time period 1/m. Thus, the supply end timing e of the α+2 frame is 2/m. Further, the time required to supply the α+1 frame to the D/A conversion section 65-2 is 1/m, and the supply end timing d is later by $\frac{1}{2}$ m than the supply end timing c of the α+2 frame to the D/A conversion section 65-2. Then, from the timing d, the α+3 frame is supplied from the frame memory 61-2 to the D/A conversion section 65-2 in a time period 1/m. Thus, the supply end timing f of the α+3 frame is $\frac{5}{2}$ m.

Figure 11:
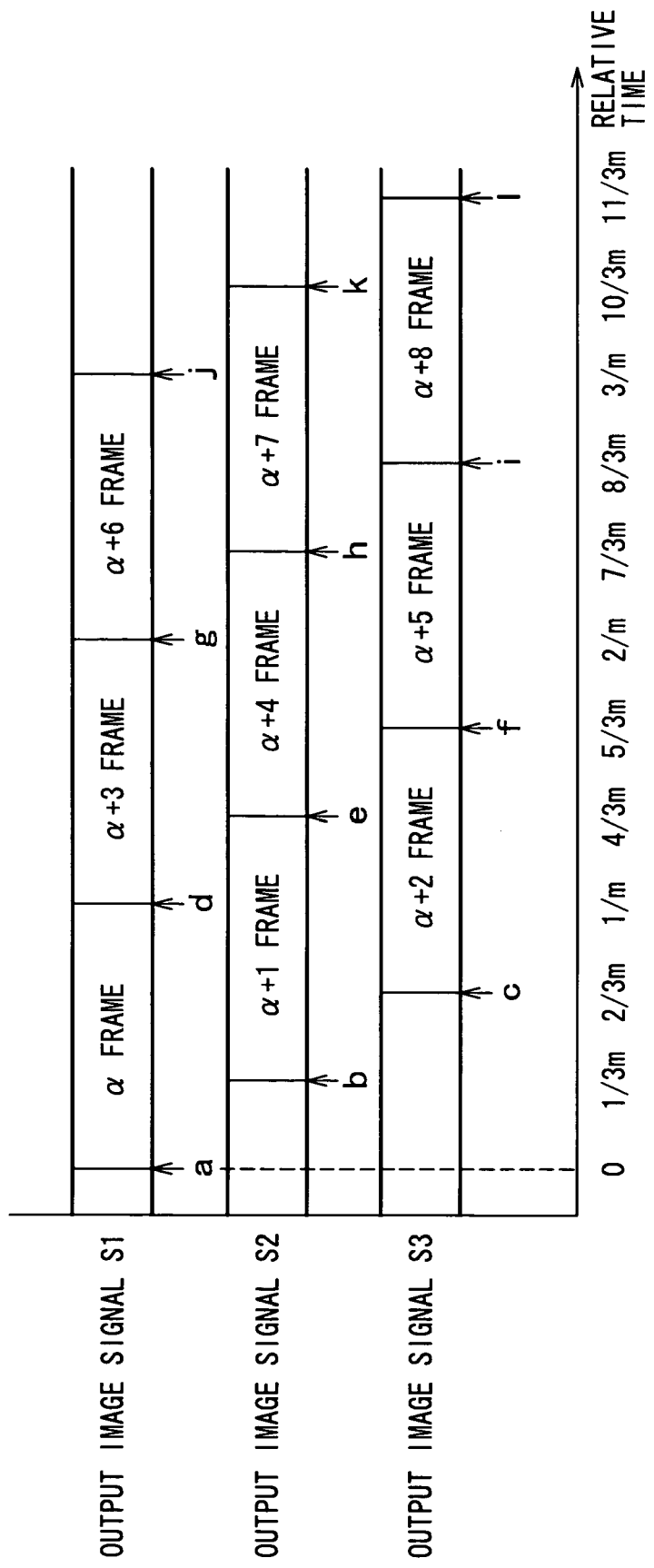
FIG. 11 is a diagrammatic view illustrating output image signals where n=3.

Now, timings of image data read out from the frame memories 61-1 to **61-*n* where n=3 are described with reference to FIG. 11**.

The controller 62 controls the frame memories 61-1 to 61-3 so that the α frame of the frame rate m is supplied as an output image signal S1 from the frame memory 61-1 to the D/A conversion section 65-1. Then, the α+1 frame of the frame rate m is supplied as an output image signal S2 from the frame memory 61-2 to the D/A conversion section 65-2 at the supply start timing b delayed by $\frac{1}{3}$ m from the supply start timing a of the α frame. Thereafter, the α+2 frame of the frame rate m is supplied as an output image signal S3 from the frame memory 61-3 to a D/A conversion section 65-3 at the supply start timing c delayed by $\frac{1}{3}$ m from the supply start timing b of the α+1 frame.

The time required to supply the α frame to the D/A conversion section 65-1 is 1/m, and the supply end timing d is later by $\frac{2}{3}$ m than the supply start timing b of the α+1 frame to the D/A conversion section 65-2. Then, from the timing d, the α+3 frame is supplied from the frame memory 61-1 to the D/A conversion section 65-1 in a time period 1/m. Thus, the supply end timing g of the α+3 frame is 2/m. Further, the time required to supply the α+1 frame to the D/A conversion section 65-2 is 1/m, and the supply end timing e is later by $\frac{2}{3}$ m than the supply start timing c of the α+2 frame to the D/A conversion section 65-3. Then, from the timing d, the α+4 frame is supplied from the frame memory 61-2 to the D/A conversion section 65-2 in a time period 1/m. Thus, the supply end timing f of the α+4 frame is $\frac{7}{3}$ m. Further, the time required to supply the α+2 frame to the D/A conversion section 65-3 is 1/m, and the supply end timing f is later by $\frac{2}{3}$ m than the supply end timing d of the α+3 frame to the D/A conversion section 65-1. Then, from the timing f, the α+5 frame is supplied from the frame memory 61-3 to the D/A conversion section 65-3 in a time period 1/m. Thus, the supply end timing f of the α+5 frame is $\frac{8}{3}$ m.

Figure 12:
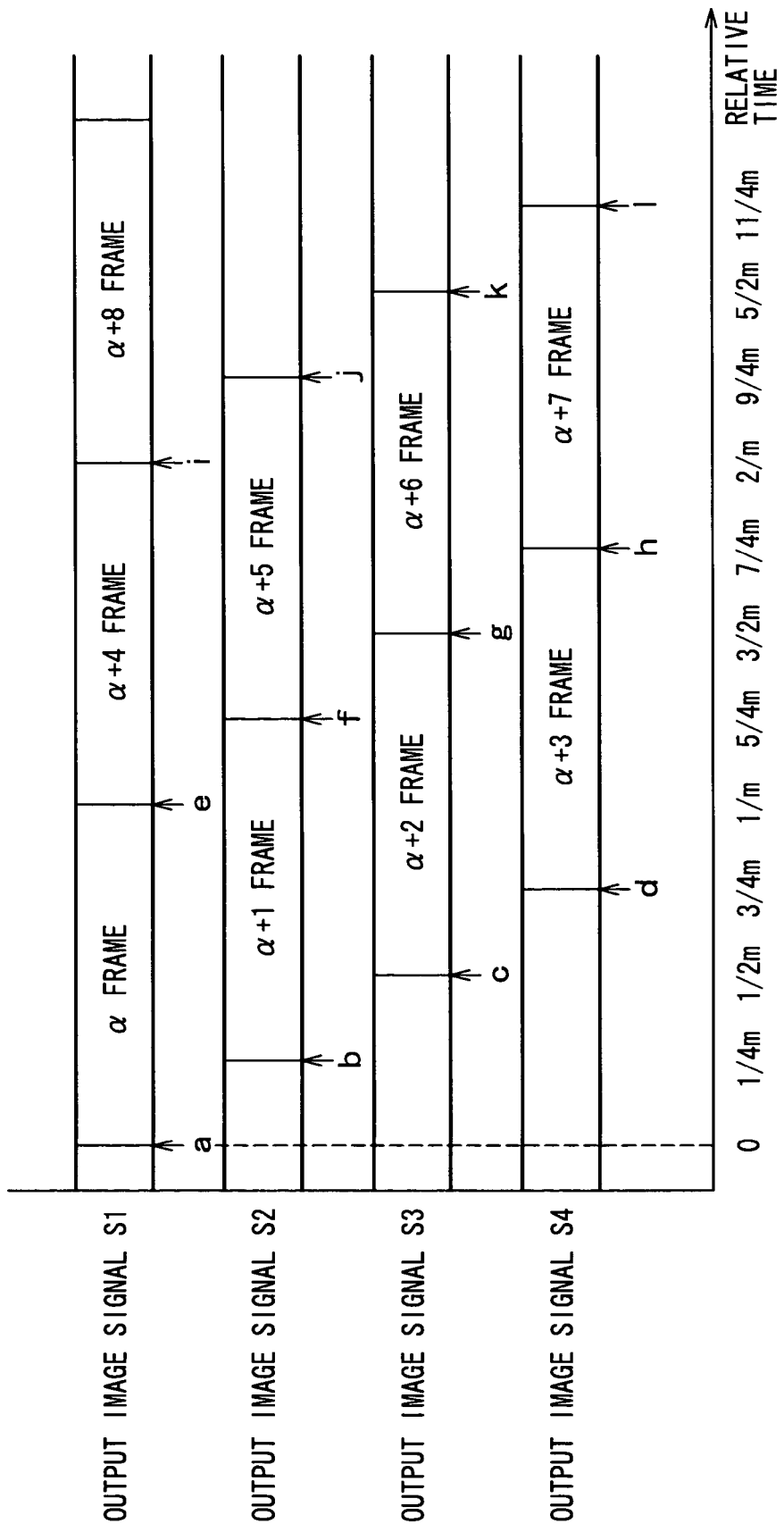
FIG. 12 is a diagrammatic view illustrating output image signals where n=4.

Now, timings of image data read out from the frame memories 61-1 to **61-*n* where n=4 are described with reference to FIG. 12**.

The controller 62 controls the frame memories 61-1 to 61-4 so that the α frame of the frame rate m is supplied as an output image signal S1 from the frame memory 61-1 to the D/A conversion section 65-1. Then, the α+1 frame of the frame rate m is supplied as an output image signal S2 from the frame memory 61-2 to the D/A conversion section 65-2 at a supply start timing b delayed by $\frac{1}{4}$ m from the supply start timing a of the a frame. Thereafter, the α+2 frame of the frame rate m is supplied as an output image signal S3 from the frame memory 61-3 to the D/A conversion section 65-3 at a supply start timing c delayed by $\frac{1}{4}$ m from the supply start timing b of the α+1 frame. Further, the α+3 frame of the frame rate m is supplied as an output image signal S4 from the frame memory 61-4 to a D/A conversion section 65-4 at a supply start timing d delayed by $\frac{1}{4}$ m from the supply start timing c of the α+2 frame.

The time required to supply the α frame to the D/A conversion section 65-1 is 1/m, and the supply end timing e is later by $\frac{3}{4}$ m than the supply start timing b of the α+1 frame to the D/A conversion section 65-2. Then, from the timing e, the α+4 frame is supplied from the frame memory 61-1 to the D/A conversion section 65-1 in a time period 1/m. Thus, the supply end timing i of the α+4 frame is 2/m. Further, the time required to supply the α+1 frame to the D/A conversion section 65-2 is 1/m, and the supply end timing f is later by $\frac{3}{4}$ m than the supply start timing c of the α+2 frame to the D/A conversion section 65-3. Then, from the timing f, the α+5 frame is supplied from the frame memory 61-2 to the D/A conversion section 65-2 in a time period 1/m. Thus, the supply end timing j of the α+5 frame is $\frac{9}{4}$ m.

Further, the time required to supply the α+2 frame to the D/A conversion section 65-3 is 1/m, and the supply end timing g is later by $\frac{3}{4}$ m than the supply start timing d of the α+3 frame to the D/A conversion section 65-4. Then, from the timing f, the α+6 frame is supplied from the frame memory 61-3 to the D/A conversion section 65-3 in a time period 1/m. Thus, the supply end timing i of the α+6 frame is $\frac{5}{2}$ m. Then, the time required to supply the α+3 frame to the D/A conversion section 65-4 is 1/m, and the supply end timing h is later by $\frac{3}{4}$ m than the supply start timing e of the α+4 frame to the D/A conversion section 65-1. Then, from the timing h, the α+7 frame is supplied from the frame memory 61-4 to the D/A conversion section 65-4 in a time period 1/m. Thus, the supply end timing 1 of the α+7 frame is $\frac{11}{4}$ m.

Figure 13:
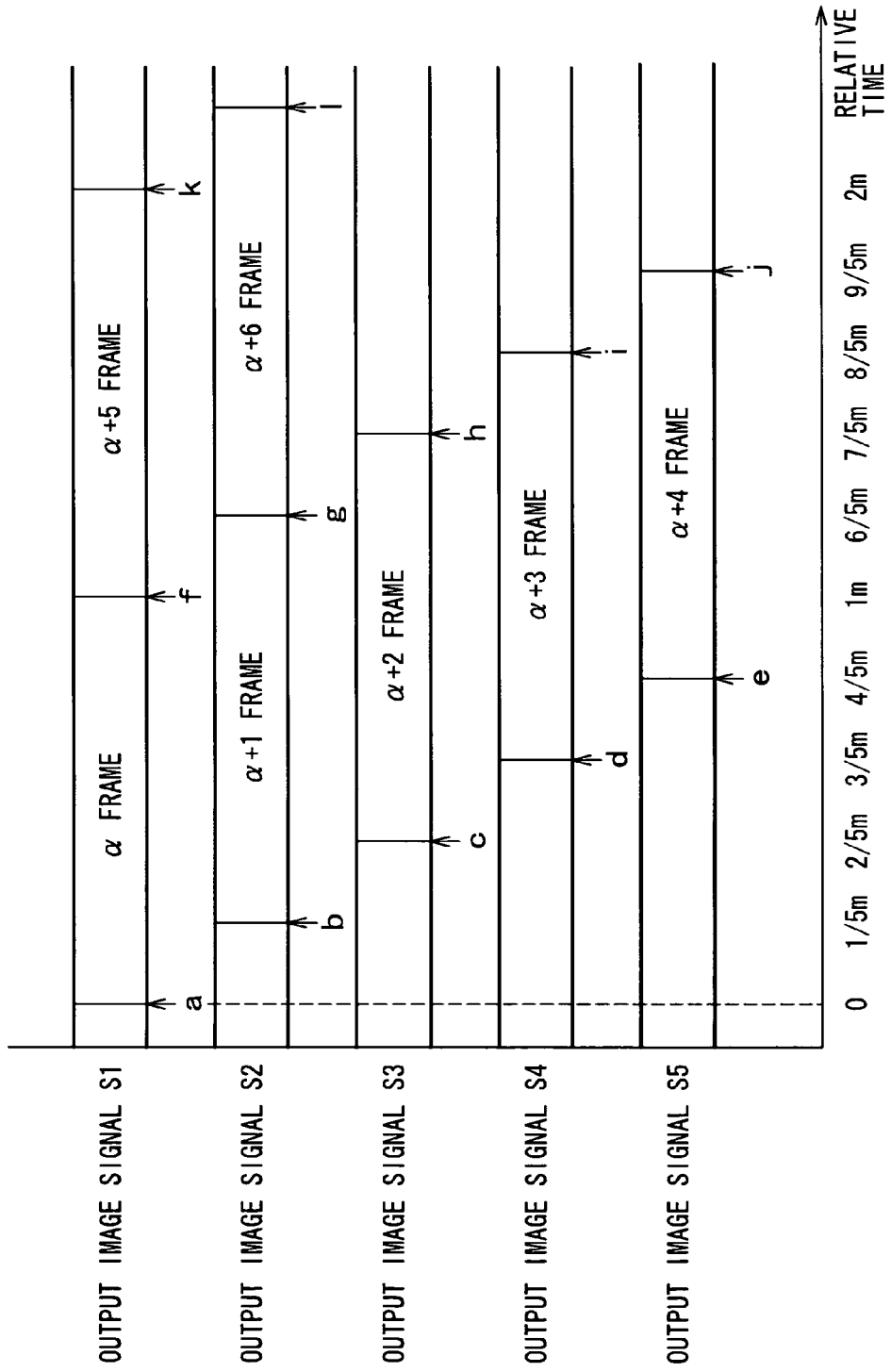
FIG. 13 is a diagrammatic view illustrating output image signals where n=5.

Now, timings of image data read out from the frame memories 61-1 to **61-*n* where n=5 are described with reference to FIG. 13**.

The controller 62 controls the frame memories 61-1 to 61-5 so that the α frame of the frame rate m is supplied as an output image signal S1 from the frame memory 61-1 to the D/A conversion section 65-1. Then, the α+1 frame of the frame rate m is supplied as an output image signal S2 from the frame memory 61-2 to the D/A conversion section 65-2 at a supply start timing b delayed by $\frac{1}{5}$ m from the supply start timing a of the a frame. Thereafter, the α+2 frame of the frame rate m is supplied as an output image signal S3 from the frame memory 61-3 to the D/A conversion section 65-3 at a supply start timing c delayed by 1/5 m from the supply start timing b of the α+1 frame. Then, the α+3 frame of the frame rate m is supplied as an output image signal S4 from the frame memory 61-4 to the D/A conversion section 65-4 at a supply start timing d delayed by 1/5 m from the supply start timing c of the α+2 frame. Thereafter, the α+4 frame of the frame rate m is supplied as an output image signal S5 from the frame memory 61-5 to the D/A conversion section 65-5 at a supply start timing e delayed by 1/5 m from the supply end timing d of the α+3 frame.

The time required to supply the α frame to the D/A conversion section 65-1 is 1/m, and the supply end timing f is later by 4/5 m than the supply start timing b of the α+1 frame to the D/A conversion section 65-2. Then, from the timing f, the α+5 frame is supplied from the frame memory 61-1 to the D/A conversion section 65-1 in a time period 1/m. Thus, the supply end timing f of the α+5 frame is 2/m. Further, the time required to supply the α+1 frame to the D/A conversion section 65-2 is 1/m, and the supply end timing g is later by 4/5 m than the supply start timing c of the α+2 frame to the D/A conversion section 65-3. Then, from the timing g, the α+6 frame is supplied from the frame memory 61-2 to the D/A conversion section 65-2 in a time period 1/m. Thus, the supply end timing l of the α+6 frame is 11/5 m.

Further, the time required to supply the α+2 frame to the D/A conversion section 65-3 is 1/m, and the supply end timing h is later by 4/5 m than the supply start timing d of the α+3 frame to the D/A conversion section 65-4. Then, from the timing h, a next frame (though not shown, the α+7 frame) is supplied from the frame memory 61-3 to the D/A conversion section 65-3 in a time period 1/m. Then, the time required to supply the α+3 frame to the D/A conversion section 65-4 is 1/m, and the supply end timing i is later by 4/5 m than the supply start timing e of the α+4 frame to the D/A conversion section 65-5. Then, from the timing i, a next frame (though not shown, the α+8 frame) is supplied from the frame memory 61-4 to the D/A conversion section 65-4 in a time period 1/m. Then, the time required to supply the α+4 frame to the D/A conversion section 65-5 is 1/m, and the supply end timing j is later by 4/5 m than the supply start timing f of the α+5 frame to the D/A conversion section 65-1. Then, from the timing j, a next frame (though not shown, the α+9 frame) is supplied from the frame memory 61-5 to the D/A conversion section 65-5 in a time period 1/m.

The image display apparatus 52 is described with reference back to FIG. 9.

The image display apparatus 52 receives supply of n series of analog image signals from the image signal processing apparatus 51 and displays moving pictures of m×n Hz on a display section 82 using scanning control sections 81-1 to 81-n under the control of the display control section 66.

The scanning control sections 81-1 to 81-n receive supply of analog image signals and cause the display section 82 to display the received analog image signals by a dot sequential or line sequential scanning method. At this time, the scanning control sections 81-1 to 81-n alternately scan successive frames displacing the frames 1/n by 1/n frame. Consequently, an image can be displayed on the display section 82 at a frame rate equal to n times the frame rate when an image is drawn solely by the scanning control sections 81-1 to 81-n.

The image display apparatus 52 may not be formed as a single apparatus but may be formed as an image display system including a plurality of apparatus. Where the image display apparatus 52 is formed as an image display system, it can be formed from, for example, projectors 91-1 to 91-n and a screen 92 as seen in FIG. 14.

Figure 14:
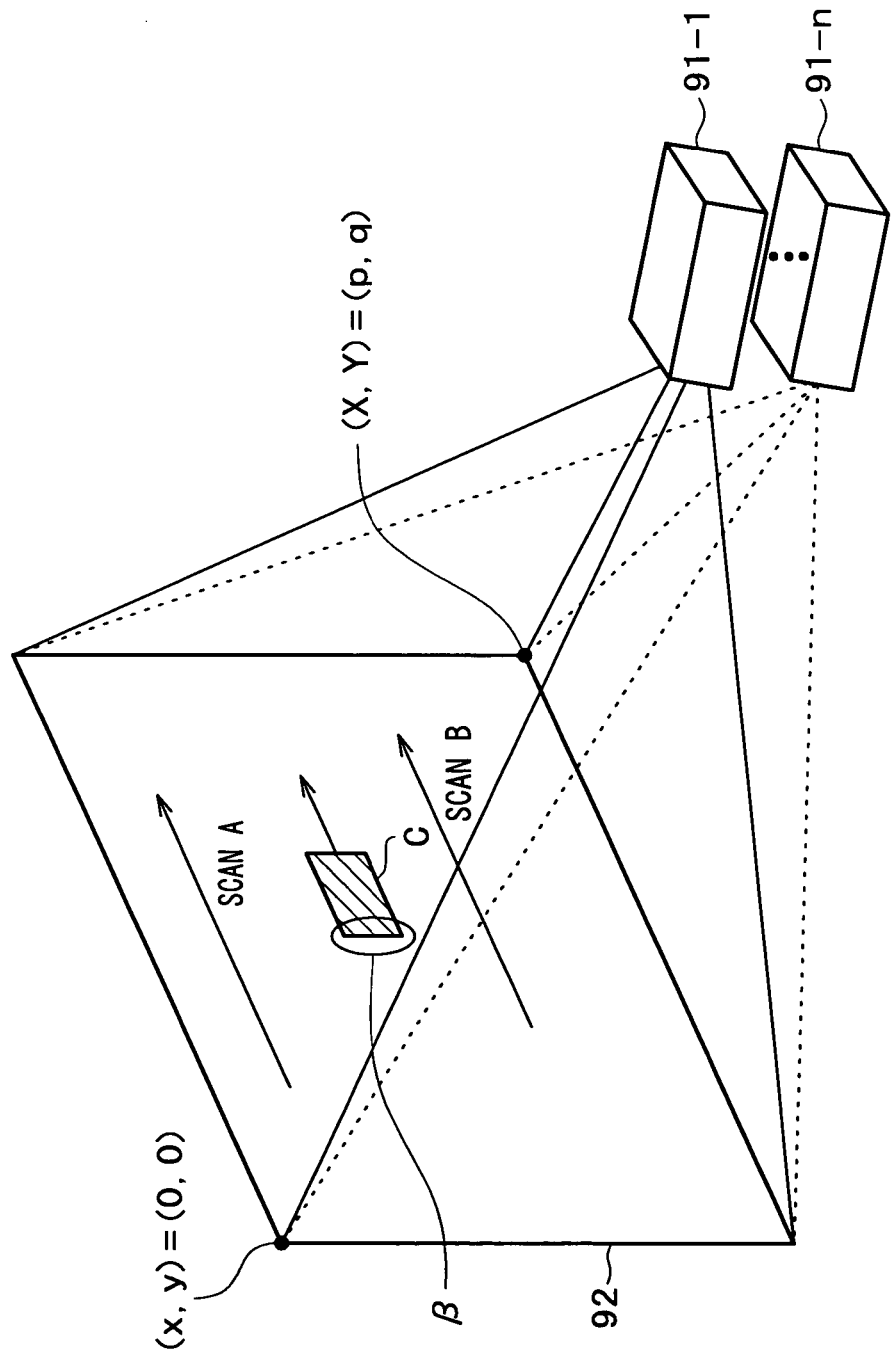
FIG. 14 is a schematic view illustrating operation of the image display apparatus of FIG. 9.

Particular operation of the image display apparatus 52 is described below taking operation where the projectors 91-1 to 91-n and the screen 92 shown in FIG. 14 are used as an example. The projector 91-1 corresponds to the scanning control section 81-1 of FIG. 9 while the projector 91-n corresponds to the scanning control section 81-n of FIG. 9, and the screen 92 corresponds to the display section 82 of FIG. 9.

For example, the projectors 91-1 to 91-n receive supply of analog image signals corresponding to the output image signals S1 to Sn read from the frame memories 61-1 to 61-n at timings described hereinabove with reference to FIGS. 10 to 13 and converted into analog signals by the D/A conversion sections 65-1 to 65-n.

Each of the projectors 91-1 to 91-n scans pixels from a pixel (X, Y)=(0, 0) to another pixel (X, Y)=(p, q) which form a display image to be displayed in a horizontal direction on the screen 92 individually at timings controlled by the display control section 66 to display a frame image corresponding to the image signal supplied thereto. The frame rate of frame images displayed on the screen 92 from each of the projectors 91-1 to 91-n is m Hz, and the frame rate of moving pictures displayed by the projectors 91-1 to 91-n is m×n Hz. Further, the scanning start timings of the frames displayed by the projectors 91-1 to 91-n are displaced by a 1/n phase, that is, by 1/m×n with respect to the individual displays of one frame by the projectors 91-1 to 91-n similarly as in the case of the output image signals S1 to Sn described hereinabove with reference to FIGS. 10 to 13.

For example, when the projector 91-2 scans a line of the α+1 frame corresponding to a line indicated by scanning B on the screen 92, the projector 91-3 scans a line of the α+2 frame corresponding to a line indicated by scan A on the screen 92. The line indicated by scan B is displaced by 1/n the number of lines of one frame from the line indicated by scan A. In other words, a moving picture displayed on the screen 92 is successively rewritten by a plurality of scans including the scan A and the scan B after every time interval of 1/m×n.

For example, where n=2 and the frame rates of display images outputted from the projectors 91-1 and 91-2 are 120 Hz, the frame rate of moving pictures displayed on the screen 92 is substantially equal to 240 Hz. Further, for example, where n=3 and the frame rates of display images outputted from the projectors 91-1 to 91-3 are 80 Hz, the frame rate of moving pictures displayed on the screen 92 is substantially equal to 240 Hz. For example, where n=4 and the frame rates of display images outputted from the projectors 91-1 to 91-4 are 60 Hz, the frame rate of moving pictures displayed on the screen 92 is substantially equal to 240 Hz. Furthermore, where n=5 and the frame rates of display images outputted from the projectors 91-1 to 91-5 are 50 Hz, the frame rate of moving pictures displayed on the screen 92 is substantially equal to 250 Hz.

It is to be noted that, in order to prevent appearance of displacement between scanning lines at the same position among a plurality of scanning lines such as the scan A and the scan B shown in FIG. 14, it is possible to use a technique similar to position correction of an optical image used in a conventional twin stack technique to correct the scanning position of pixels. The twin stack technique is a technique which can display a bright image using two projectors such that same images are displayed at the same position at the same time. Where the twin stack technique is used to display an image, the luminance of the image is doubled, and consequently, clear projection can be obtained also where the surrounding environment is bright or where the projection distance is long.

Where the twin stack technique is used, it is a problem that a blur is produced on an image by displacement of pixel positions of two images projected. In order to solve this problem, a picture shifting function of finely adjusting the pixel positions of pixels projected optically is used widely, and can adjust the positions of images projected from two projectors severely. This technique can be applied also where more than two projectors are used.

It is to be noted that a technique for correcting displacement of pixel positions of two projected images is disclosed, for example, in Japanese Patent Application No. Hei 10-058291.

In the image display apparatus 52, the displacement of pixel positions of two projected images is adjusted so that the displacement of scanning lines by a plurality of scans may be within one pixel (one dot) thereby to allow moving pictures to be displayed while preventing any image from being blurred by overlapping thereof with another image displaced by one frame.

As described hereinabove, where frame images are drawn in order one by one frame in a successively displaced relationship by 1/n frame by the projectors 91-1 to 91-n, before one frame is scanned and drawn completely by a certain projector, scanning for drawing of an image for a next frame is started by another projector. At this time, where an object C displayed on the screen 92 of FIG. 14 is displayed, for example, so as to move from the left to the right on the display screen, to the user who observes the moving pictures, the smoothness of movement of an edge portion is felt as the smoothness of the moving pictures displayed.

Figure 15:
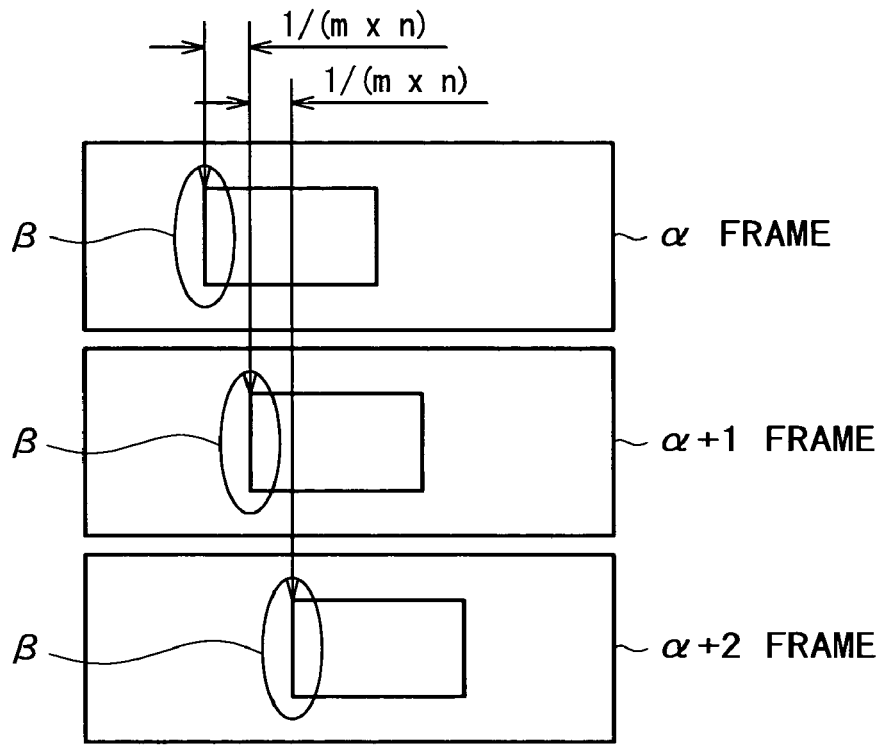
FIG. 15 is a schematic view illustrating an updating rate of an edge portion of a moving picture displayed on the image display apparatus of FIG. 9.

Display of an edge portion β of the object C displayed on the screen 92 is described with reference to FIG. 15.

The object C of the α frame is displayed by the projector 91-1, and the object C of the α+1 frame is displayed by the projector 91-2 after a time interval 1/m×n. The position of the edge portion β of the object C at this time is rewritten in a time period 1/m×n after the display of the α frame. Then, the object C of the α+2 frame is displayed after a time interval 1/m×n by the projector 91-3 (where n=2, the projector 91-2). The edge portion β of the object C at this time is rewritten in a time period 1/m×n after the display of the α+1 frame.

For example, where the frame rates of display images outputted from the projectors 91-1 to 91-n are m Hz, in moving pictures displayed solely by one of the projectors 91-1 to 91-n, a frame is rewritten after every time interval of 1/m second. In contrast, the edge portion β of the object C displayed on the screen 92 by displaying frame images in order one by one frame using the projectors 91-1 to 91-n is refreshed in a time period of 1/m×n second. Accordingly, the movement of the edge portion β of the object C observed by the user is very smooth.

While it is described here that the image display apparatus 52 controls display of an image under the control of the display control section 66, it is possible to configure the image display apparatus 52 in a different manner. For example, the image display apparatus 52 may include the display control section 66 in the inside thereof (or in other words, a single apparatus is formed from the image display apparatus 52 and the display control section 66) and receive supply of a control signal necessary for image display from the controller 62. Or, the image display apparatus 52 may include a control section different from the display control section 66 in the inside thereof and receive supply of a synchronizing signal, a dot clock signal and so forth from the display control section 66 and then control, for example, operation of the projectors 91-1 to 91-n described hereinabove with reference to FIG. 14.

Further, while operation of the image display apparatus 52 is described here taking the projection display system formed from the projectors 91-1 to 91-n and the screen 92 as an example, the image display apparatus 52 may be any display system which draws an image by a dot sequential or line sequential scanning system only if consecutive frames are successively scanned in a displaced relationship by 1/n frame using a plurality of display devices such that moving pictures can be displayed at a frame rate equal to n times the frame rate of m Hz by the display devices where they are used solely.

For the image display apparatus 52, for example, a direct-view type display unit such as a CRT (Cathode Ray Tube), an LCD (Liquid Crystal Display) unit, a GLV (Grating Light Valve) display unit, an LED (Light Emitting Diode) display unit or an FED (Field Emission Display) unit or a projector by which an image is drawn by a dot sequential or line sequential scanning system can be used.

For example, a GLV device is an image display device which uses a micro ribbon array which is a projection device for controlling the direction or color of light making use of a diffraction effect of light. The micro ribbon array is an array of very small light diffraction elements, and a GLV device projects an image by illuminating a laser beam on the micro ribbon array. The ribbons can be driven independently of each other using an electric signal, and the diffraction amount of light is changed by adjusting the driving amount of each ribbon. Thus, light and darkness of an image can be produced by differences among the ribbons, and consequently, a smooth gradation representation and a high contrast can be achieved.

An LED is a device formed from two different semiconductors joined together and can emit light with electric current supplied thereto.

An FED device can produce an image utilizing a principle of light emission similar to that of a CRT that electrons are generated from a cathode and brought into collision with a fluorescent substance applied to an anode to emit light. However, as a structure of the cathode, the FED device uses a planar electron source while the CRT uses a point electron source.

Incidentally, moving pictures involve picture quality degradation unique thereto which does no occur with still pictures. With a display unit for 50 Hz (PAL: Phase Alternating Line) or 60 Hz (NTSC: National Television System Committee or HD (High Definitions) image signal) used most widely at present, regeneration in the time direction is incomplete, and under particular conditions, incompleteness in the time direction is converted into incompleteness in a spatial direction. Therefore, deterioration in moving picture quality is caused, for example, by shutter time upon acquisition of moving picture data, a period of time of light emission of display elements upon display of moving picture data and a condition of a line of sight of the observer.

Figure 16:
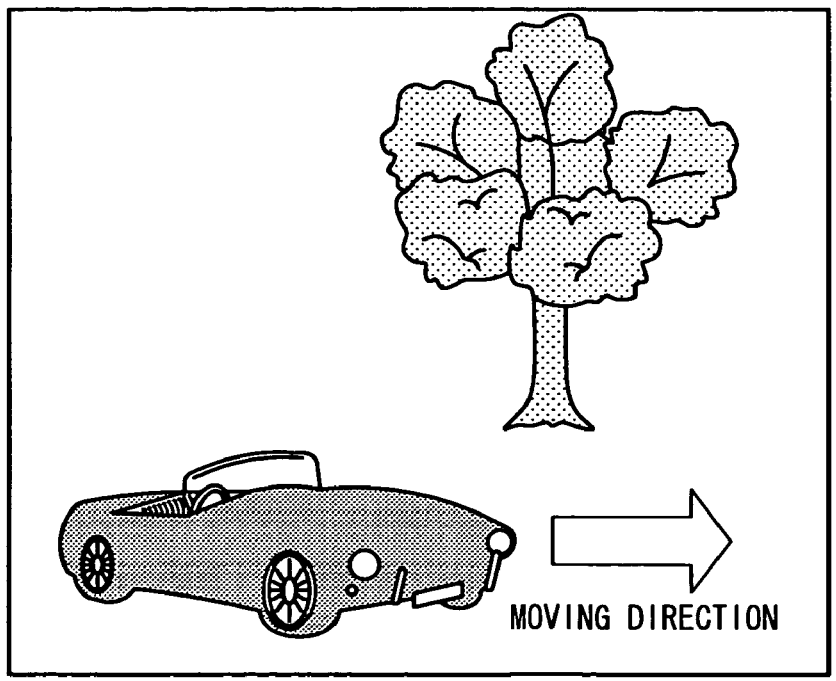
FIG. 16 is a view showing an example of an actual scene which includes a moving object and a fixed object.

FIG. 16 shows an example of an actual scene which includes both of a moving object and a fixed object. The scene of FIG. 16 assumes that an automobile moves in the rightward direction while a tree is fixed on the earth. Sights to the observer when the scene of FIG. 16 is observed are shown in FIGS. 17 and 18.

Figure 17:
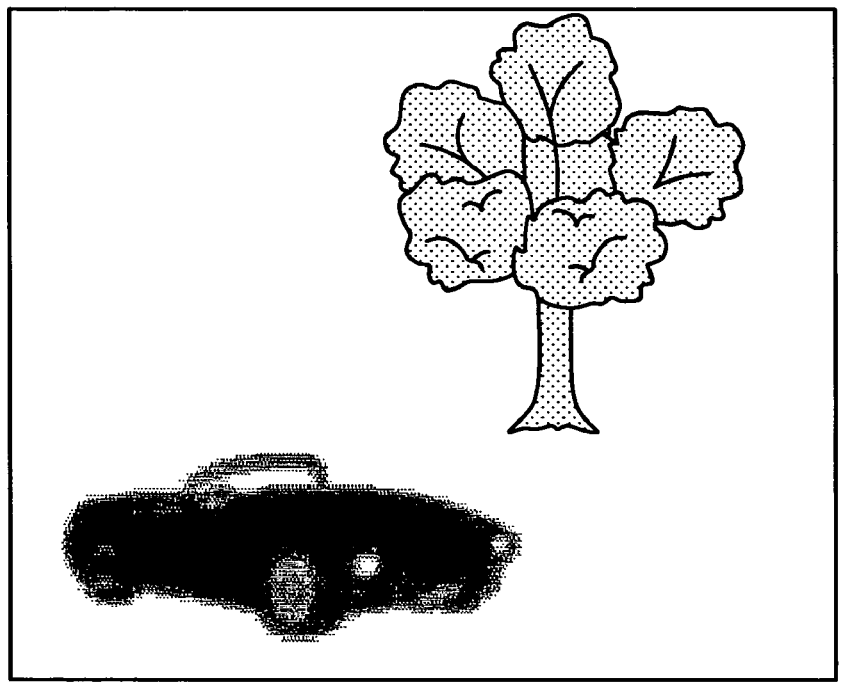
FIG. 17 is a view illustrating a fixed view condition.
Figure 18:
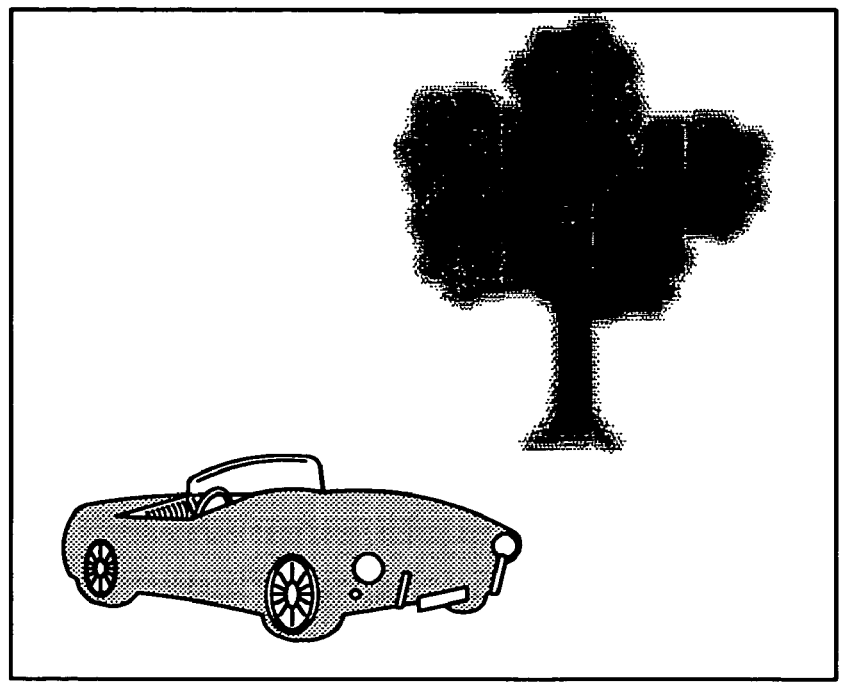
FIG. 18 is a view illustrating a follow-up view condition.

FIG. 17 shows a sight of an image to an observer where the observer gazes at a tree. In this instance, the automobile moving in the rightward direction looks in blur to the observer. Meanwhile, FIG. 18 shows a sight of the image to the observer where the observer gazes at the automobile. In this instance, the fixed tree looks in blur to the observer.

In the following description, a case wherein the line of sight is fixed to a stationary object on the observation plane coordinate system is referred to as a fixed view condition. Meanwhile, another case wherein the line of sight follows up a moving object on the observation coordinate system is referred to as a follow-up view condition. In particular, the case described with reference to FIG. 17 corresponds to the fixed view condition while the case described above with reference to FIG. 18 corresponds to the follow-up view condition. In both of the fixed view condition and the follow-up condition, the object at which the observer gazes looks clear to the observer. On the other hand, the object whose position changes relative to the object at which the observer gazes looks in blur.

The reason is that the human being has, as a characteristic of the visual sense, an action of integrating light incoming to the retina within a certain period of time. Where an object moves on the retina coordinate system of the eyes, since the position variation of the object is integrated in the time direction, the object is perceived as a blur image. This blur increases in proportion to the speed of movement of the object on the retina coordinate system. The speed of movement on the retina coordinate system is not an actual speed of the object but corresponds to an angular velocity (deg/sec) of the object.

As described above, an object stationary on the retina coordinate system looks clear while another object moving on the retina coordinate system looks in blur. In order to display moving pictures full of reality, that is, moving pictures of a high picture quality from which an object looks moving smoothly, it is significant to reproduce an image which coincides with such an actual sight to the observer as just described.

A difference between the sights to the observer described above with reference to FIGS. 17 and 18 is described with reference to FIG. 19. An upper part of FIG. 19 illustrates actual movements in the external world, and here, the axis of ordinate is the time axis and the axis of abscissa is the horizontal direction. Particularly, the upper part of FIG. 19 illustrates positions at different points of time of a fixed dot (which corresponds to the tree in FIGS. 16 to 18 and is denoted by x in FIG. 19) and another dot moving at a fixed speed (which corresponds to the automobile in FIGS. 16 to 18 and is denoted by y in FIG. 19) on a scene on which the two dots exist in the external world. A lower part of FIG. 19 illustrates the sights to the observer in the fixed view and the follow-up view when the movement of the external world is observed. A broken line arrow mark indicates a movement of the eye point of the observer, that is, the integration direction of an image on the retina. The axis in the vertical direction represents the integration direction in the fixed view while the axis in an oblique direction is the integration direction in the follow-up view. In particular, where the observer observes in the follow-up view, the fixed dot (tree) looks in blur while the moving dot (automobile) looks clear. On the other hand, where the observer observes in the fixed view, the fixed dot (tree) looks clear while the moving dot (automobile) looks in blur.

Now, a sight to the observer when images of the movement of the external world illustrated in FIG. 16 are picked up by fixed image pickup and then reproduced and displayed as moving pictures is described for different image pickup conditions, display conditions and observation conditions with reference to FIGS. 20A to 20D. Upper parts of FIG. 20A to 20D illustrate variations of a moving picture display with respect to time. Lower parts of FIG. 20 illustrate results of integration of light displayed as moving pictures along the direction of movement of the line of sight, that is, in the direction of the integration axis in the fixed view and the follow-up view as sights to the observer.

FIG. 20A illustrates sights to the observer where the image pickup condition is the open shutter system and the display is of the pulse type. FIG. 20B illustrates sights to the observer where the image pickup condition is the open shutter system and the display is of the hold type. FIG. 20C illustrates sights to the observer where the image pickup condition is the high speed shutter system and the display is of the pulse type. FIG. 20D illustrates sights to the observer where the image pickup condition is the high speed shutter system and the display is of the hold type.

It can be seen from FIGS. 20A to 20D that degradation of the picture quality which occurs with moving pictures differs depending upon the conditions. For example, that the moving object in the follow-up views of FIGS. 20B and 20D looks in blur when compared with the sights of the moving object in the follow-up views of FIGS. 20A and 20C is a phenomenon called "movement blur" unique to a display apparatus whose light emission condition is of the hold type. The "movement blur" is degradation intelligible to the observer because an obstacle at which the observer gazes looks in blur.

Figure 21:
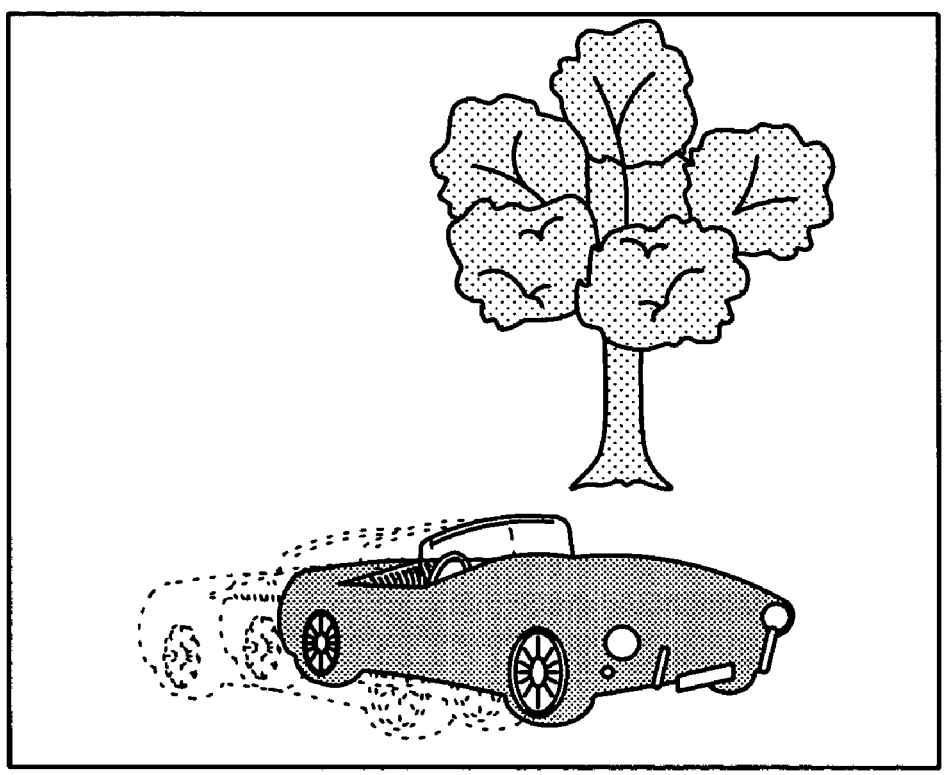
FIG. 21 is a schematic view illustrating a fault by strobe light.

In addition, such degradations as a strobe light fault in the fixed view of FIG. 20D and strobe light faults in the follow-up views of FIGS. 20A and 20C are exhibited. A strobe light fault is such degradation in moving picture quality that, when a fixed object (for example, a tree) on a display apparatus is observed in the fixed view as seen in FIG. 21, a moving object (for example, an automobile) looks in multiple images or discrete movements which are not smooth are observed. A strobe light fault which occurs with a moving object on the fixed view and with a fixed object on the follow-up view is in most cases a degradation which occurs with a portion at which the observer does not gaze and in most cases does not attract attention very much when compared with the "movement blur". However, when the follow-up of the line of sight is not carried out completely, the relationship between an object at which the observer wants to gaze and the line of sight of the observer is equivalent to the relationship of a moving object in the fixed view or of a fixed object in the follow-up view. Since the strobe light fault in this instance occurs with an object at which the observer gazes, the fault is a very conspicuous degradation. This phenomenon is conspicuous with an image source on which the movement is fast and a next movement cannot be forecast readily such as, for example, an image in relay broadcasting of a sports program or an action cinema. In order to prevent such degradation in moving picture quality in pickup of moving pictures for a cinema or the like, such a technique is used that, for example, when images of a moving object are to be picked up, the moving object is followed up by a camera to pick up images of the moving object whereas the moving object is placed in a fixed state on the display screen or a blur called motion blur is applied in order to suppress the strobe light fault. However, the limitations by the techniques result in restriction to the representation measure. Further, for the sports or the like, the measures cannot be applied because a movement of an image pickup subject to which attention should be paid cannot be forecast.

Such moving picture quality degradation increases in response to the angular velocity of the moving object. Accordingly, even with a same image scene, where moving pictures are displayed on a display apparatus having a greater angular field of view, the moving picture quality exhibits significant degradation. Further, even if the resolution is improved, such moving picture quality degradation is little improved. Rather, since the still picture quality is improved by the improvement in resolution, the moving picture quality degradation becomes conspicuous. It is estimated that, as the increase in size of the screen and in resolution of display apparatus proceeds in the future, such moving picture quality degradations as described above become significant problems.

The cause of the moving picture quality degradations is lack of the time reproducibility. Accordingly, improvement of the time reproducibility provides a fundamental solution. In other words, for the solution, it is effective to raise the frame rate in both of image pickup and display.

Improvement against the moving picture quality degradation where the moving picture data described hereinabove with reference to FIGS. 20A to 20D are picked up at a doubled frame rate and displayed at a doubled frame rate is illustrated in FIGS. 22A to 22D.

FIGS. 22A to 22D illustrate sights to the observer of moving pictures displayed at a frame rate as high as twice that described hereinabove with reference to FIGS. 20A to 20D. In particular, FIG. 22A illustrates sights to the observer where the image pickup condition is the open shutter system and the display is of the pulse type. FIG. 22B illustrates sights to the observer where the image pickup condition is the open shutter system and the display is of the hold type. FIG. 22C illustrates sights to the observer where the image pickup condition is the high speed shutter system and the display is of the pulse type. FIG. 22D illustrates sights to the observer where the image pickup condition is the high speed shutter system and the display is of the hold type.

As seen from FIGS. 22A to 22D, with regard to the blur fault of the sights of the display images, the blur amount is reduced to one half in the image pickup and display methods. Also with regard to the strobe light fault, since the discrete number by intermittent strobe light is doubled, the image degradation is improved. In other words, it is exhibited that the blur fault and the strobe light fault are improved linearly with respect to the increase of the frame rate. Further, where the frame rate increases, also the difference in the quality of the moving picture quality degradation by the shutter time and the light emission time exhibits a decrease. In other words, in order to improve the moving picture quality, increase of the frame rate is a very effective measure.

Evaluation of the moving picture quality in display of moving pictures picked up in the open shutter condition wherein attention is paid to the jerkiness and the movement blur in the follow-up view condition was examined through a visual sense psychological physical experiment.

Figure 23:
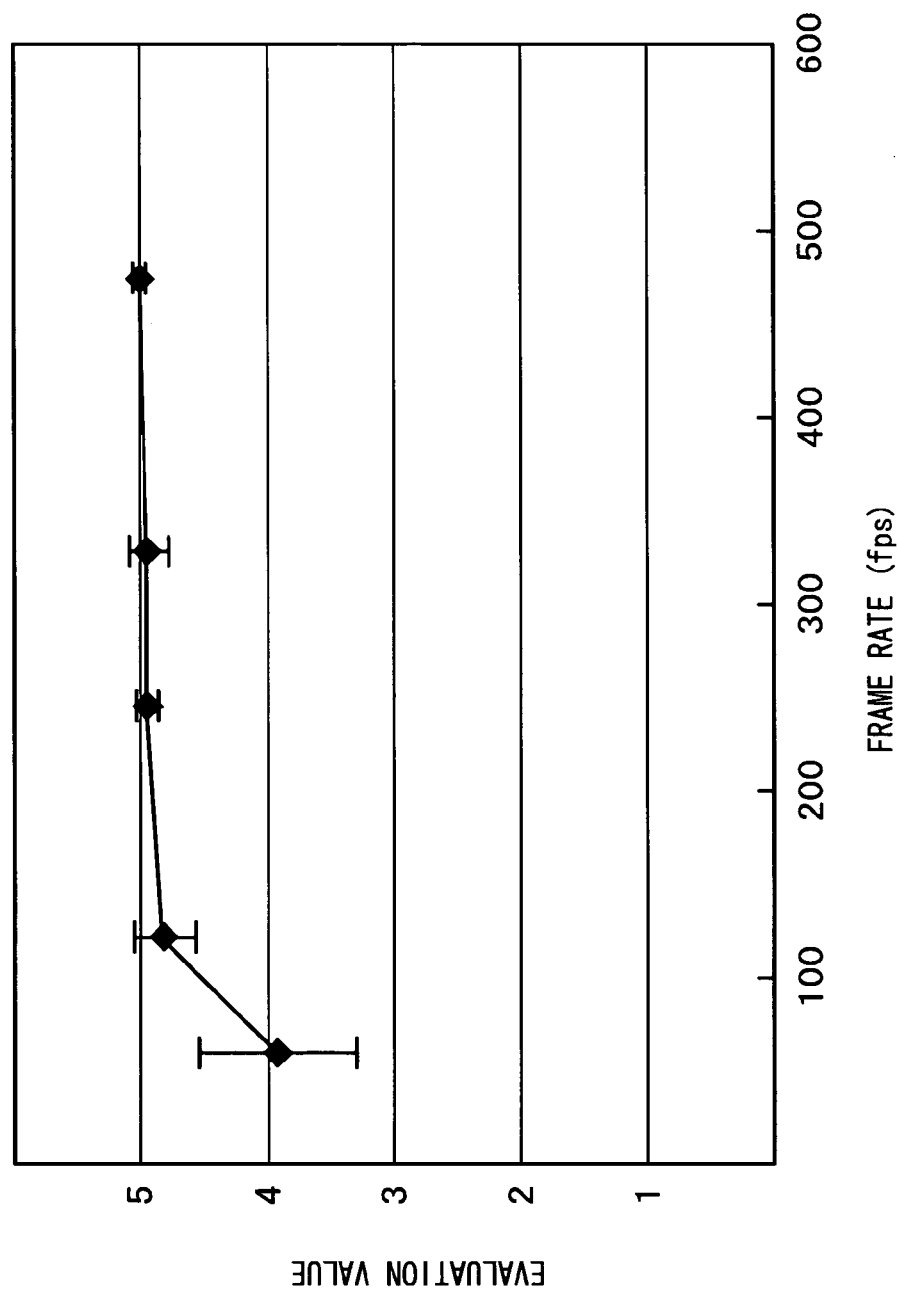
FIG. 23 is a diagram illustrating a result of evaluation of the moving picture quality where attention is paid to the jerkiness.
Figure 24:
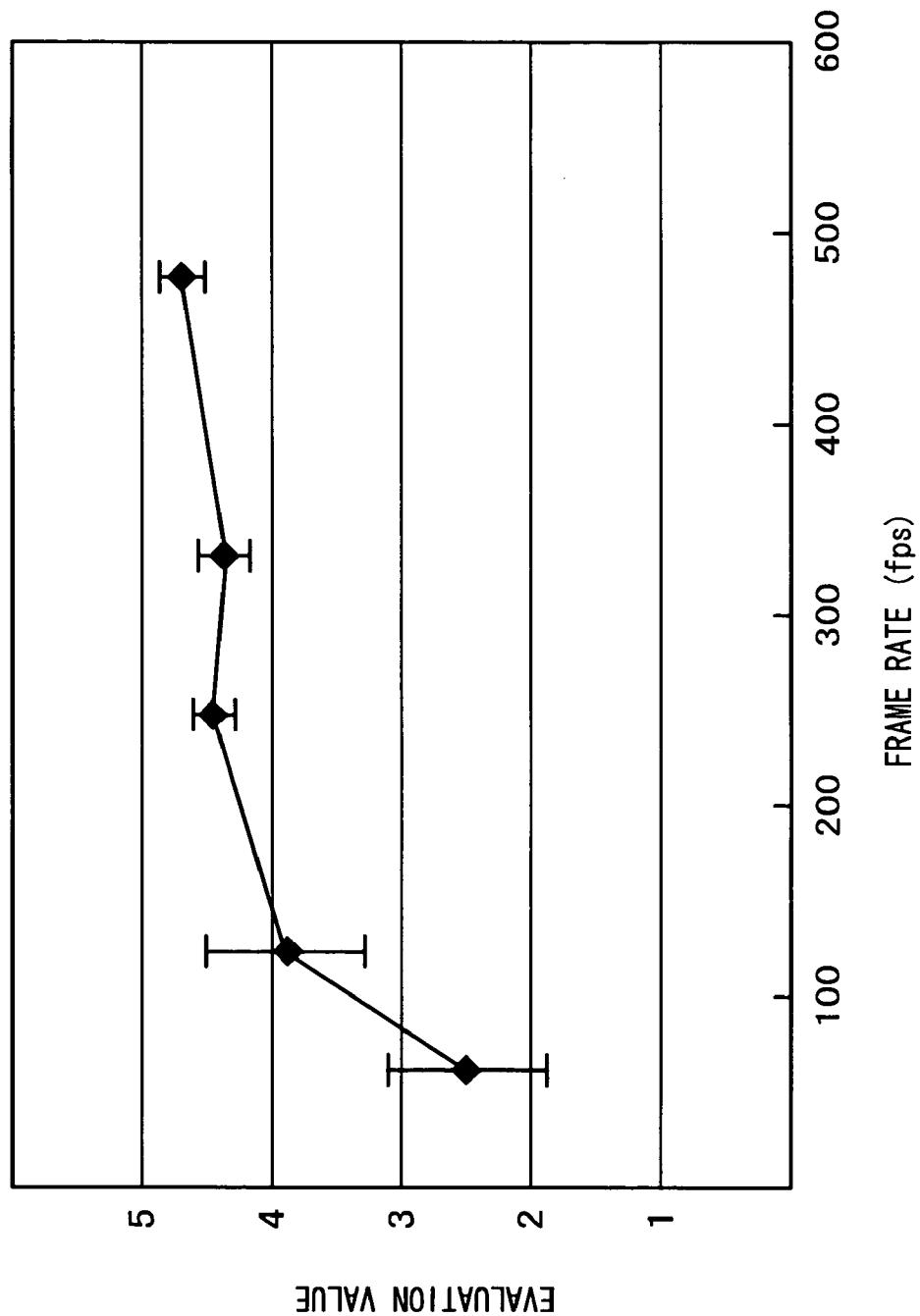
FIG. 24 is a diagram illustrating a result of evaluation of the moving picture quality where attention is paid to the motion blur.

An evaluation result wherein attention is paid to the jerkiness is illustrated in FIG. 23 while another evaluation result wherein attention is paid to the movement blur is illustrated in FIG. 24. For the evaluation, various moving pictures such as, for example, natural moving pictures, CG moving pictures and images picked up with the shutter kept open were prepared. Further, as evaluation points, the degradation scale is set such that the evaluation point 5 is for "no degradation is found"; 4 for "some degradation is found but is not conspicuous"; 3 for "some degradation is found but is not disturbing"; 2 for "degradation is disturbing"; and 1 for "degradation is much disturbing". Meanwhile, the evaluation scale is set such that the evaluation point 5 is for "very good"; 4 for "good"; 3 for "normal"; 2 for "bad"; and 1 for "very bad". In the experiment, evaluation was executed by a number of testees sufficient for investigation of general evaluation of moving pictures. Thus, in FIGS. 23 and 24, an average and a standard deviation of all scenes and all testees are plotted.

When compared with the jerkiness illustrated in FIG. 23, the evaluation values of the movement blur illustrated in FIG. 24 exhibit a great variation, and commonly to the evaluation values illustrated in FIGS. 23 and 24, a tendency is found that, as the frame rate increases, the evaluation value of the moving picture quality increases. Particularly with regard to the movement blur, the evaluation value exhibits a tendency of the flexing type wherein it comes close to the value 4.5, which is a limit to the perception, around 250 fps, and at higher frame rates, the evaluation value exhibits a flat value higher than 4.5. Also with regard to the jerkiness, the evaluation value exhibits a tendency of the flexing type wherein it comes close to the value 4.5, which is a limit to the perception, around 250 fps, and at higher frame rates, the evaluation value exhibits a substantially flat value higher than 4.5.

This suggests that the movement blur in the follow-up view which exhibits particularly remarkable moving picture quality degradation is solved sufficiently with a frame rate around 250 fps, that is, a frequency around 250 fps is ideal where the effectiveness of image resources used widely at present is taken into consideration. More particularly, since most of image resources used widely at present use 50 Hz or 60 Hz, it is suggested that 240 Hz or 250 Hz which is a frequency equal to an integral number of times the frequency of 50 Hz or 60 Hz is an ideal frequency where the effectiveness of image resources is taken into consideration.

Figure 25:
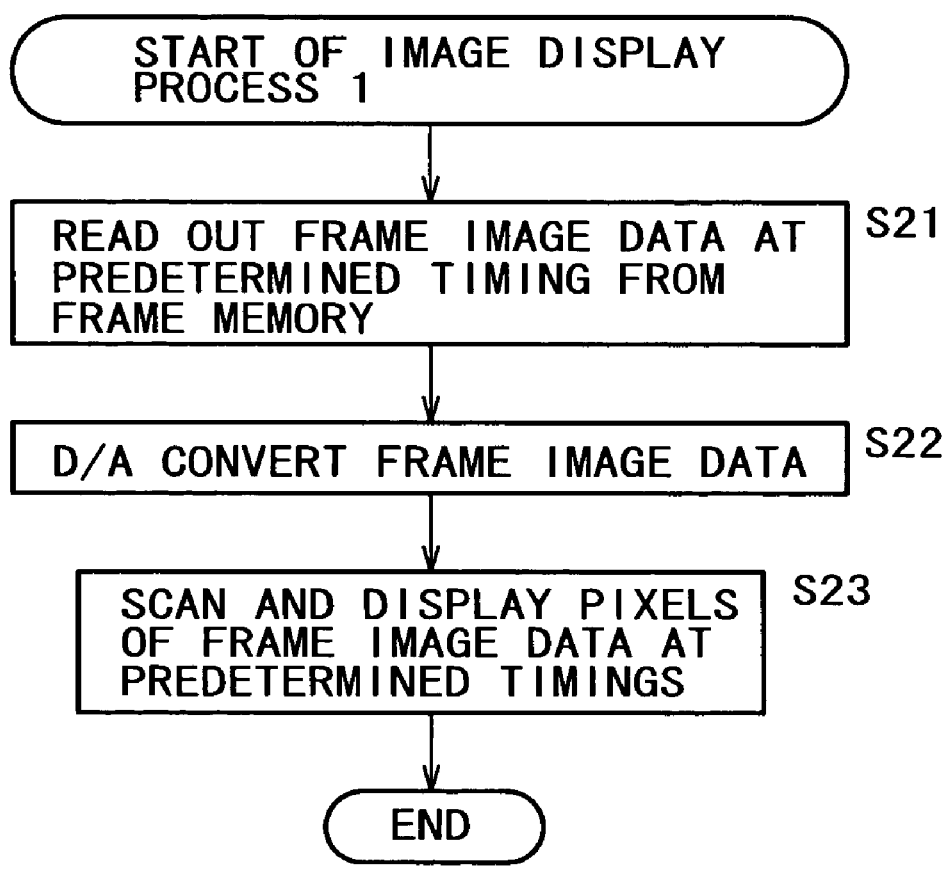
FIG. 25 is a flow chart illustrating an image display process 1.

Now, an image display process 1 where the image signal processing apparatus 51 and the image display apparatus 52 shown in FIG. 9 are used is described with reference to a flow chart of FIG. 25.

At step S21, the controller 62 reads out frame image data at predetermined timings described hereinabove with reference to FIG. 10, 11, 12 or 13 from the frame memories 61-1 to 61-n of the memory 61 and supplies the frame image data to the D/A conversion sections 65-1 to 65-n, respectively.

At step S22, the D/A conversion sections 65-1 to 65-n perform D/A conversion of the frame image data supplied thereto and supply resulting data to the scanning control sections 81-1 to 81-n, respectively.

At step S23, the scanning control sections 81-1 to 81-n scan pixels of the frame image data at predetermined timings, for example, corresponding to the image signals described hereinabove with reference to FIG. 10, 11, 12 or 13 under the control of the display control section 66 so that the pixels may be displayed. Thereafter, the processing is ended.

By the process described above, moving picture data divided into n series of data and each having m Hz are displayed as moving picture data of n×m Hz by the n scanning control sections 81-1 to 81-n.

In the foregoing description, frame image data divided into n series of data and each having m Hz are scanned in a successively displaced relationship by 1/n the number of scanning lines of the display screen so that a moving picture of n×m Hz is displayed. However, it is otherwise possible to combine frame image data of n×m Hz divided into n series image data to form a number of frame image data smaller than n and display the smaller number of frame image data.

In particular, where the period of time within which the shutter is open upon image pickup of frame image data is shorter than 1/s×m, the frame image data of m Hz divided into n series image data are converted-into n/s series of frame image data, and the n/s series of image data are displayed using n/s operation control sections 81. Also in this instance, moving picture data do not suffer from a blur.

Figure 26:
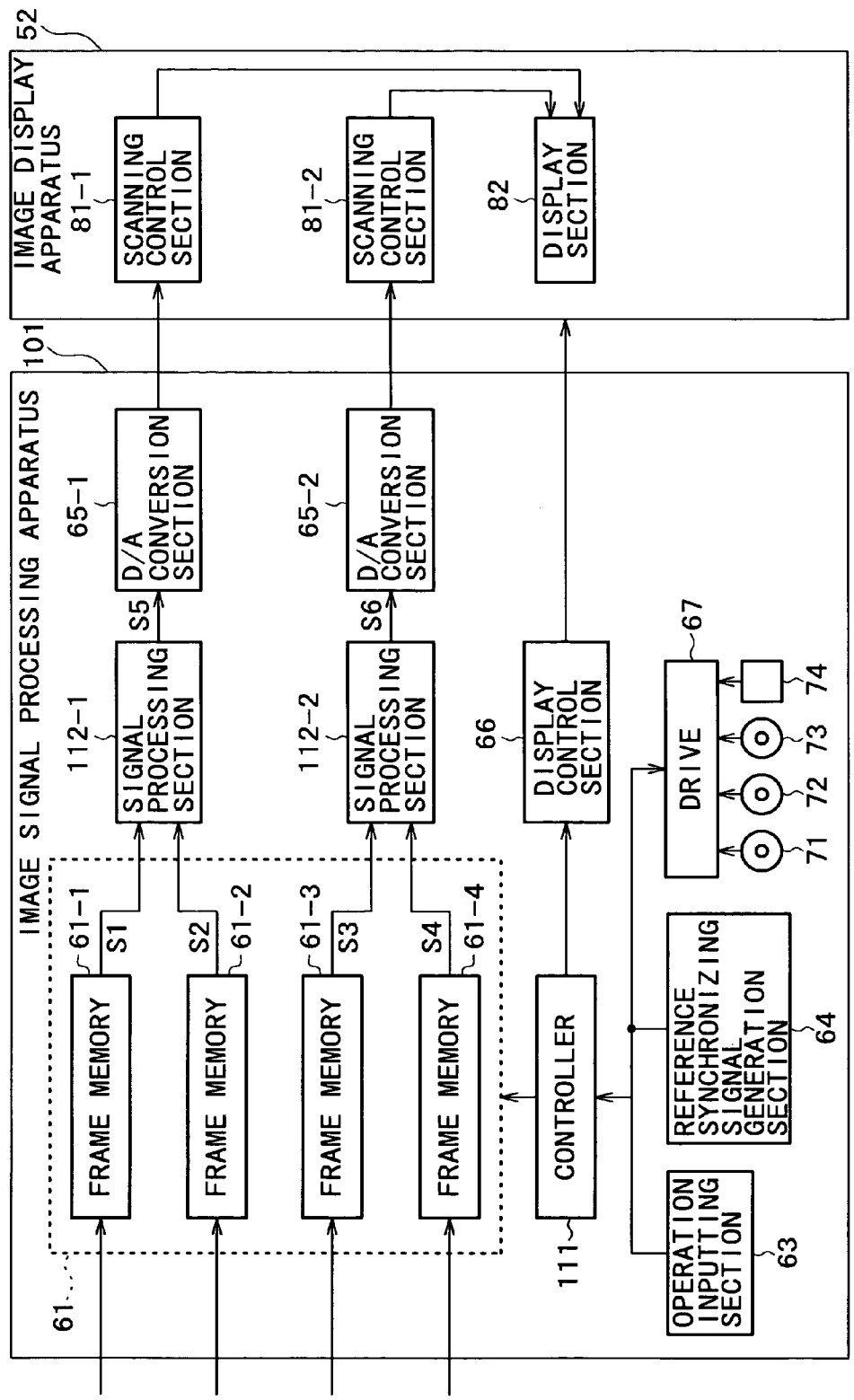
FIG. 26 is a block diagram showing another configuration of the image signal processing apparatus and the image display apparatus to which the present invention is applied.

FIG. 26 shows a configuration of an image signal processing apparatus 101 and an image display apparatus 52 to which the present invention is applied. In the configuration shown in FIG. 26, n=4 and s=2.

To the image signal processing apparatus 101, four series of moving picture data of m Hz having phases successively displaced by 1/n and forming image data of a frame rate of m×n Hz are supplied individually. The four series of moving picture data are supplied to and stored into frame memories 61-1 to 61-4 of a memory 61.

A controller 111 controls outputs of image signals from the frame memories 61-1 to 61-4 based on a reference synchronizing signal of m Hz supplied thereto from a reference synchronizing signal generation section 64 in accordance with an operation input of a user inputted from an operation inputting section 63. Further, the controller 111 supplies information relating to the outputs of image signals from the frame memories 61-1 to 61-4 to a display control section 66. The operation inputting section 63 typically includes a jog dial, keys, levers, buttons including a button for issuing an instruction to display a moving picture, a touch panel and so forth, and receives and supplies an operation input by the user to the controller 111. The reference synchronizing signal generation section 64 generates a synchronizing signal to be used as a reference for control of the frame memories 61-1 to 61-4 of the memory 61 and supplies the synchronizing signal to the controller 111.

The frame memories 61-1 and 61-2 of the memory 61 supplies digital image signals S1 and S2 supplied thereto to a signal processing section 112-1 under the control of the controller 111. The frame memories 61-3 and 61-4 of the memory 61 supply digital image signals S3 and S4 supplied thereto to another signal processing section 112-2 under the control of the controller 111. The signal processing sections 112-1 and 112-2 individually combine the image signals supplied thereto and output the composite image signals S5 and S6 to D/A conversion sections 65-1 and 65-2, respectively. Details of combination of signals executed by the signal processing sections 112-1 and 112-2 are hereinafter described with reference to FIG. 27.

The D/A conversion sections 65-1 and 65-2 convert the digital image signals supplied thereto from the signal processing sections 112-1 and 112-2 into analog image signals and supply the analog image signals to scanning control sections 81-1 and 81-2 of the image display apparatus 52, respectively. The display control section 66 controls the display of moving pictures by the image display apparatus 52 based on information supplied thereto from the controller 111 to display a frame image of the frame rate of m×n Hz on a display section 52.

The frame rates of the moving picture data supplied to the scanning control sections 81-1 and 81-2 are both 2 m Hz. If the scanning control sections 81-1 and 81-2 do not have a function (a function of a data process or a scanning speed) for displaying moving picture data of the frame rate of 2 m Hz with a number of pixels which the frame image data supplied thereto have, the signal processing sections 112-1 and 112-2 perform suitable image processes such as, for example, reduction of the number of pixels or sampling out of scanning lines for the image signals S5 and S6 combined by and to be outputted from the signal processing sections 112-1 and 112-2 so that the image signals S5 and S6 can be displayed through the scanning control sections 81-1 and 81-2, respectively.

A drive 67 is connected to the controller 111 as occasion demands. A magnetic disk 71, an optical disk 72, a magneto-optical disk 73, a semiconductor memory 74 or the like is suitably loaded into the drive 67 such that a computer program read from the thus loaded medium is executed by the controller 111 as occasion demands.

Timings of image data read out from the frame memories 61-1 to 61-n where n=4 and S=2 and combination of signals executed by the signal processing sections 112-1 and 112-2 are described with reference to FIG. 27.

The controller 111 controls the frame memory 61-1 so that the α frame of a shutter speed equal to or lower than ½ m is supplied as an output image signal S1 at the frame rate m from the frame memory 61-1 to the signal processing section 112-1. Further, the controller 111 controls the frame memory 61-2 so that the α+2 frame of a shutter speed equal to or lower than ½ m is supplied as an output image signal S2 at the frame rate m from the frame memory 61-2 to the signal processing section 112-1 at a supply start timing b delayed by ½ m from the supply start timing a of the α frame. The controller 111 thereafter reads out the image signals S1 and S2 alternately from the frame memories 61-1 and 61-2 with the phases displaced successively by ½ m so as to be supplied to the signal processing section 112-1.

The signal processing section 112-1 combines the signals supplied thereto to form a composite signal S5 wherein the α+2 frame follows the α frame after ½ m and the α+4 frame follows the α+2 frame after ½ m, and supplies the composite signal S5 to the D/A conversion section 65-1.

Further, the controller 111 controls the frame memory 61-3 so that the α+1 frame of a shutter speed equal to or lower than ½ m is supplied as an output image signal S3 at the frame rate m from the frame memory 61-3 to the signal processing section 112-2. Further, the controller 111 controls the frame memory 61-4 so that the α+3 frame of a shutter speed equal to or lower than ½ m is supplied as an output image signal S4 at the frame rate m from the frame memory 61-4 to the signal processing section 112-2 at a supply start timing b delayed by ½ m from the supply start timing a of the a frame. The controller 111 thereafter reads out the image signals S3 and S4 alternately from the frame memories 61-1 and 61-2 with the phases displaced successively by ½ m so as to be supplied to the signal processing section 112-2.

The signal processing section 112-2 combines the signals supplied thereto to form a composite signal S6 wherein the α+3 frame follows the α+1 frame after ½ m and the α+5 frame follows the α+3 frame after ½ m, and supplies the composite signal S6 to the D/A conversion section 65-2.

The D/A conversion sections 65-1 and 65-2 supply the composite signals S5 and S6 to the scanning control sections 81-1 and 81-2 at timings successively displaced by ½ similarly to the output image signals S1 and S2 described hereinabove with reference to FIG. 10, respectively. The scanning control sections 81-1 and 81-2 scan the frame image signals displaced from each other by ½ the number of lines of 1 frame so that the moving picture data are displayed on the display section 82.

For example, where the output signals S1 to S4 are 60 Hz signals, the image signals S5 and S6 are 120 Hz signals. Accordingly, where the scanning control sections 81-1 and 81-2 have a function of displaying moving picture data of 120 Hz, moving picture data of 240 Hz can be displayed on the display section 82.

Figure 27:
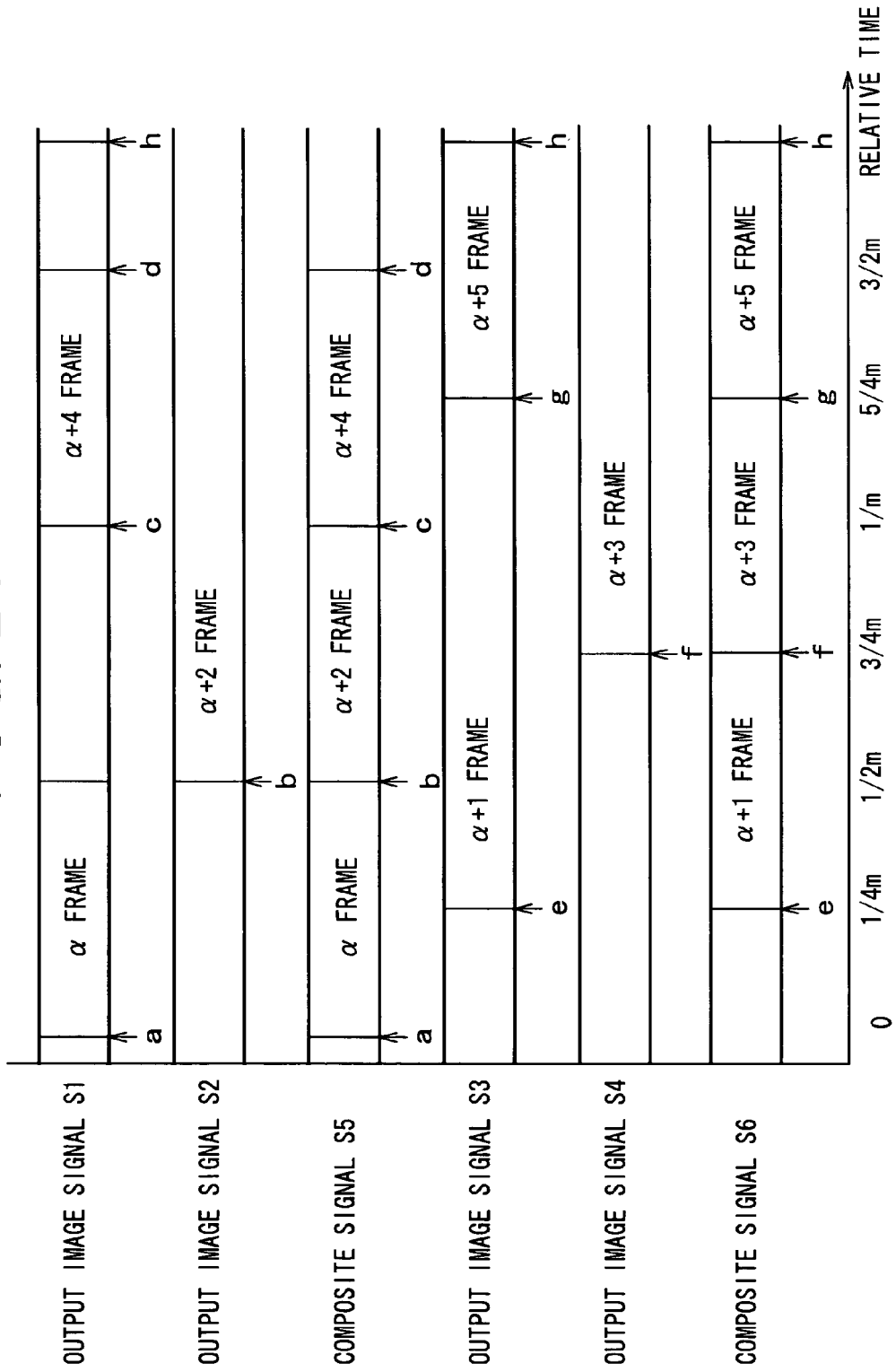
FIG. 27 is a diagram illustrating an output signal and a composite signal in the image processing apparatus of FIG. 26.

It is to be noted that, although n=4 and s=2 in FIGS. 26 and 27, the present invention can naturally be applied also where n and s have different values than 4 and 2, respectively.

For example, another case wherein n=4 and s=4 is described with reference to FIGS. 28 and 29.

Figure 28:
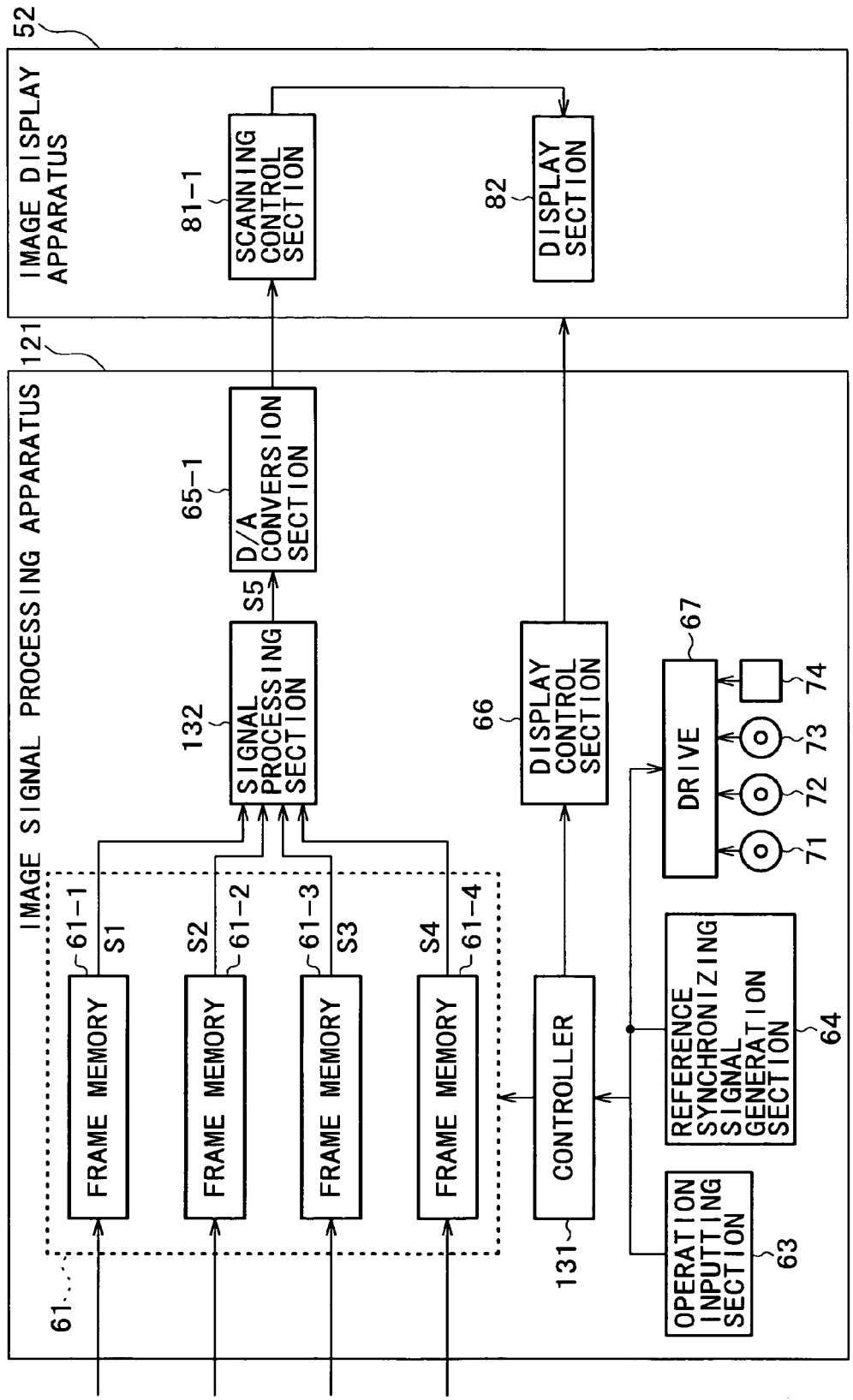
FIG. 28 is a block diagram showing a further configuration of the image signal processing apparatus and the image display apparatus to which the present invention is applied.
Figure 29:
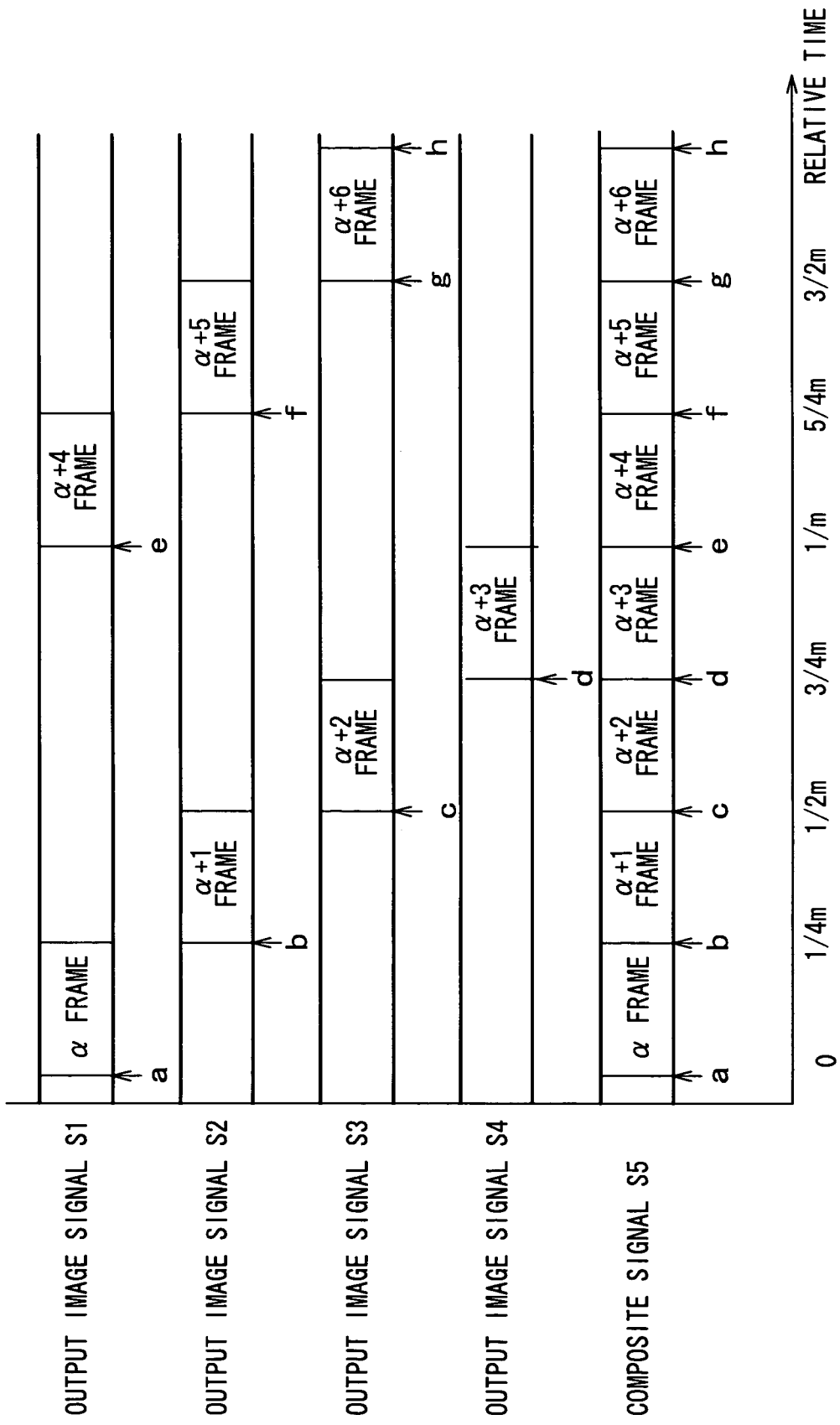
FIG. 29 is a diagram illustrating output signals and a composite signal in the image processing apparatus of FIG. 28.

FIG. 28 shows a configuration of an image signal processing apparatus 121 and an image display apparatus 52 to which the present invention is applied.

The image signal processing apparatus 121 receives four series of moving picture data of m Hz having phases successively displaced by 1/n and forming image data of a frame rate of m×n Hz. The four series of moving picture data are supplied to and stored into frame memories 61-1 to 61-4 of the memory 61.

A controller 131 controls outputs of image signals from the frame memories 61-1 to 61-4 based on a reference synchronizing signal of m Hz supplied thereto from a reference synchronizing signal generation section 64 in accordance with an operation input of a user inputted from an operation inputting section 63. Further, the controller 131 supplies information relating to the outputs of image signals from the frame memories 61-1 to 61-4 to a display control section 66. The operation inputting section 63 typically includes a jog dial, keys, buttons including a button for issuing an instruction to display a moving picture, a touch panel and so forth, and receives and supplies an operation input by the user to the controller 131. The reference synchronizing signal generation section 64 generates a synchronizing signal to be used as a reference for control of the frame memories 61-1 to 61-4 of the memory 61 and supplies the synchronizing signal to the controller 131.

The frame memories 61-1 to 61-4 of the memory 61 supply digital image signals S1 to S4 supplied thereto to a signal processing section 132 under the control of the controller 131. The signal processing section 132 combines the image signals supplied thereto and outputs the composite image signal S5 to a D/A conversion section 65-1. Details of combination of signals executed by the signal processing section 132 are hereinafter described with reference to FIG. 29.

The D/A conversion section 65-1 converts the digital image signal supplied thereto from the signal processing section 132 into an analog image signal and supplies the analog image signal to a display control section 81-1 of the image display apparatus 52. The display control section 66 controls the display of moving pictures by the image display apparatus 52 based on information supplied thereto from the controller 131 to display a frame image of the frame rate of m×n Hz on a display section 82.

The frame rate of the moving picture data supplied to the scanning control section 81-1 are each 4 m Hz. If the scanning control section 81-1 does not have a function (a function of a data process or a scanning speed) for allowing moving picture data of the frame rate of 4 m Hz to be displayed with a number of pixels which the frame image data supplied thereto have, then the signal processing section 132 performs suitable image processes such as, for example, reduction of the number of pixels or discrete reduction of scanning lines for the image signal S5 combined by and to be outputted from the signal processing section 132 so that the image signal S5 can be displayed through the scanning control section 81-1.

A drive 67 is connected to the controller 131 as occasion demands. A magnetic disk 71, an optical disk 72, a magneto-optical disk 73, a semiconductor memory 74 or the like is suitably loaded into the drive 67 such that a computer program read from the thus loaded medium is executed by the controller 131 as occasion demands.

Timings of image data read out from the frame memories 61-1 to 61-4 where n=4 and S=4 and combination of signals executed by the signal processing section 132 are described with reference to FIG. 29.

The controller 131 controls the frame memory 61-1 so that the α frame of a shutter speed equal to or lower than ¼ m is supplied as an output image signal S1 at the frame rate m from the frame memory 61-1 to the signal processing section 132. Further, the controller 131 controls the frame memory 61-2 so that the α+1 frame of a shutter speed equal to or lower than ¼ m is supplied as an output image signal S2 at the frame rate m from the frame memory 61-2 to the signal processing section 132 at a supply start timing b delayed by ¼ m from the supply start timing a of the α frame. Further, the controller 131 controls the frame memory 61-3 so that the α+2 frame of a shutter speed equal to or lower than ¼ m is supplied as an output image signal S3 at the frame rate m from the frame memory 61-3 to the signal processing section 132 at a supply start timing c delayed by ¼ m from the supply start timing b of the α+1 frame. Furthermore, the controller 131 controls the frame memory 61-4 so that the α+3 frame of a shutter speed equal to or lower than ¼ m is supplied as an output image signal S4 at the frame rate m from the frame memory 61-4 to the signal processing section 132 at a supply start timing d delayed by ¼ m from the supply start timing c of the α+2 frame.

The controller 131 thereafter reads out the output signals S1 to S4 successively from the frame memories 61-1 to 61-4 with the phases displaced successively by ¼ m so as to be supplied to the signal processing section 132.

The signal processing section 132 combines the signals supplied thereto to form a composite signal S5 wherein the α+1 frame follows the α frame after ¼ m and the α+2 frame follows the α+1 frame after ¼ m, and supplies the composite signal S5 to the D/A conversion section 65-1.

The D/A conversion section 65-1 supplies the composite signal S5 to the scanning control section 81-1. The scanning control section 81-1 scans the frame image signals so that the moving picture data are displayed on the display section 82.

For example, where the output signals S1 to S4 are 60 Hz signals, the composite signal S5 is a 240 Hz signal. Accordingly, where the scanning control section 81-1 does not have a function of displaying moving picture data of 240 Hz with a number of pixels or a number of scanning lines of frame image data supplied thereto, the signal processing section 132 performs a suitable discrete reduction process or pixel number conversion (reduction) process for the composite signal S5 so that moving picture data of 240 Hz can be displayed through the scanning control section 81-1.

On the other hand, for example, where n=5 and the output signals S1 to S5 are 50 Hz signals, the composite signal of them is a 250 Hz signal. Accordingly, where the scanning control section 81-1 does not have a function of displaying moving picture data of 250 Hz with a number of pixels or a number of scanning lines of frame image data supplied thereto, the signal processing section 132 performs a suitable discrete reduction process or pixel number conversion (reduction) process for the composite signal S5 so that moving picture data of 250 Hz can be displayed through the scanning control section 81-1.

Figure 30:
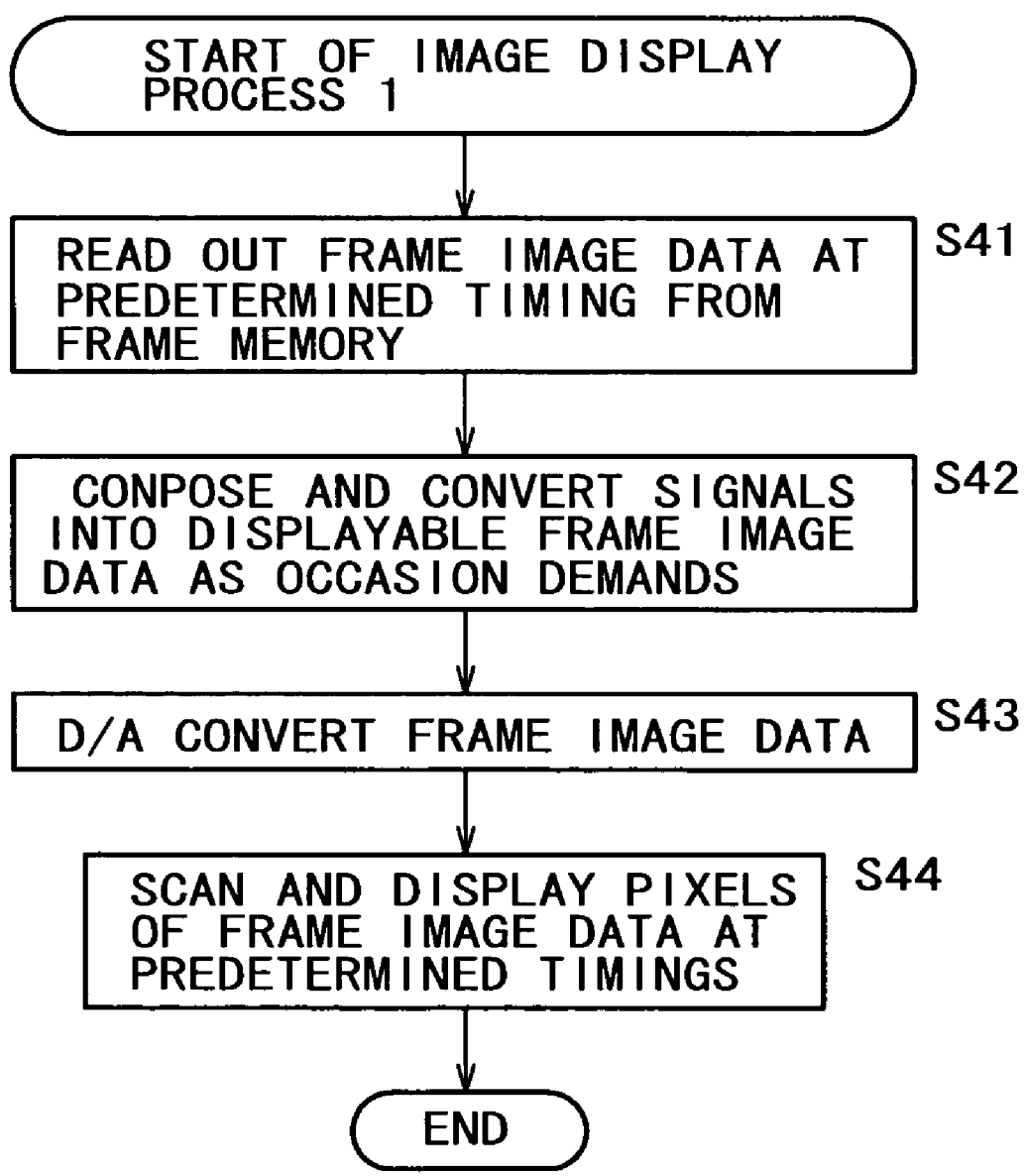
FIG. 30 is a flow chart illustrating an image display process 2.

Now, an image display process 2 where the image signal processing apparatus 101 and the image display apparatus 52 described hereinabove with reference to FIG. 26 or the image signal processing apparatus 121 and the image display apparatus 52 described hereinabove with reference to FIG. 28 are used is described with reference to a flow chart of FIG. 30.

At step S41, the controller 111 or 131 reads out frame image data at predetermined timings described hereinabove, for example, with reference to FIG. 27 or 29 from the frame memories 61-1 to 61-n (although n is 4 in the description given hereinabove with reference to FIG. 26 or 28, n may naturally be a different value other than 4) of the memory 61 and supplies the frame image data to the signal processing sections 112-1 to 112-t (here, t=n/s) or the signal processing section 132.

At step S42, the signal processing sections 112-1 to 112-t or the signal processing section 132 combines the output signals in such a manner as described hereinabove with reference to FIG. 27 or 29 and performs a process (such as, for example, reduction of the pixel number or sampling out of scanning lines) for converting the resulting composite signal into image data which can be displayed through the scanning control sections 81-1 to 81-*t* (here, t=n/s) as occasion demands. The resulting image data are supplied to the D/A conversion sections 65-1 to 65-*t* (here, t=n/s).

At step S43, the D/A conversion sections 65-1 to 65-*t* perform D/A conversion of the frame image data supplied thereto and supply resulting data to the scanning control sections 81-1 to 81-*t*, respectively.

At step S44, the scanning control sections 81-1 to 81-*t* scan pixels of the frame image data at predetermined timings under the control of the display control section 66 so that the pixels may be displayed. Thereafter, the processing is ended.

By the process described above, moving picture data divided into n series of data are combined into n/s series of moving picture data and displayed as moving picture data of n×m Hz through the n/s scanning control sections 81-1 to 81-*t* (here, t=n/s).

The image signal processing apparatus 101 and the image display apparatus 52 or the image signal processing apparatus 121 and the image display apparatus 52 may be configured such that they receive an input of an image signal combined by an external apparatus and display the image signal.

Figure 31:
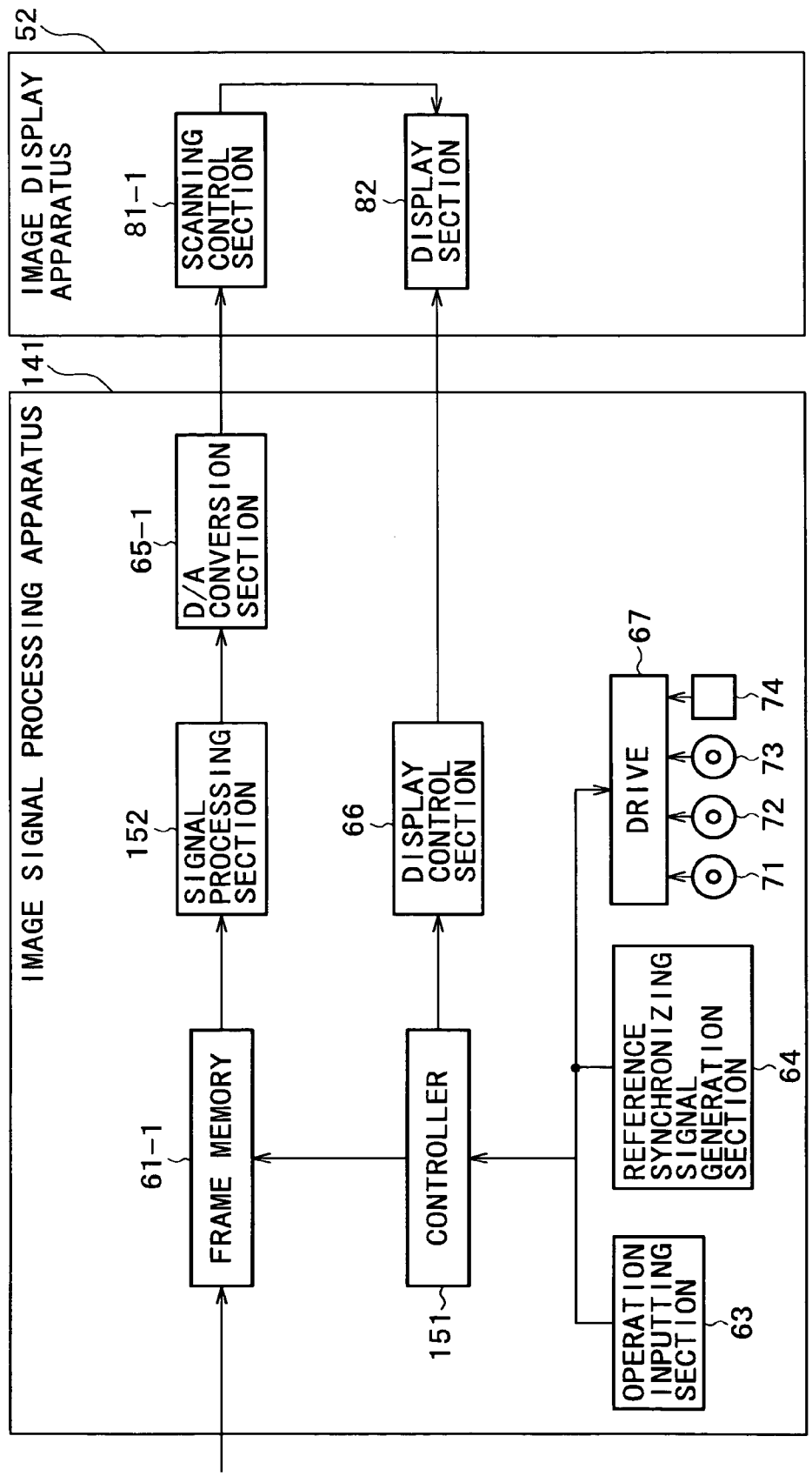
FIG. 31 is a block diagram showing a still further configuration of the image signal processing apparatus and the image display apparatus to which the present invention is applied.

FIG. 31 shows a configuration of an image signal processing apparatus 141 and an image display apparatus 52 which can receive supply of and display an image signal which by itself includes all frame images, for example, like the composite signal S5 combined by the process of the signal processing section 132 of FIG. 28.

Moving picture data which form image data of a frame rate of m×n Hz are supplied to the image signal processing apparatus 141 and stored into a frame memory 61-1.

A controller 151 controls an output of an image signal from the frame memory 61-1 based on a reference synchronizing signal of m Hz supplied thereto from a reference synchronizing signal generation section 64 in accordance with an operation input of a user inputted from an operation inputting section 63. Further, the controller 151 supplies information relating to the output of an image signal from the frame memory 61-1 to a display control section 66. The operation inputting section 63 typically includes a jog dial, keys, levers, buttons including a button for issuing an instruction to display a moving picture, a touch panel and so forth, and receives and supplies an operation input by the user to the controller 151. The reference synchronizing signal generation section 64 generates a synchronizing signal to be used as a reference for control of the frame memory 61-1 of the memory 61 and supplies the synchronizing signal to the controller 151.

The frame memory 61-1 supplies the digital image signal supplied thereto to a signal processing section 152 under the control of the controller 151. The signal processing section 152 performs a signal process for the image signal supplied thereto and outputs a resulting image signal to a D/A conversion section 65-1. In particular, where the frame rate of moving picture data supplied to the scanning control section 81-1 is n×m Hz, if the scanning control section 81-1 does not have a function of displaying moving picture data of the frame rate of n×m Hz with a number of pixels which the frame image data supplied has, the signal processing section 152 performs a suitable image process such as, for example, reduction of the pixel number or discrete reduction of scanning lines for the image signal to be outputted so that the image signal can be displayed through the scanning control section 81-1.

The D/A conversion section 65-1 converts the digital image signal supplied thereto from the signal processing section 152 into an analog image signal and supplies the analog image signal to a scanning control section 81-1 of the image display apparatus 52. The display control section 66 controls the display of moving pictures by the image display apparatus 52 based on information supplied thereto from the controller 151 to display a frame image of the frame rate of m×n Hz on a display section 82.

A drive 67 is connected to the controller 151 as occasion demands. A magnetic disk 71, an optical disk 72, a magneto-optical disk 73, a semiconductor memory 74 or the like is suitably loaded into the drive 67 such that a computer program read from the thus loaded medium is executed by the controller 151 as occasion demands.

Figure 32:
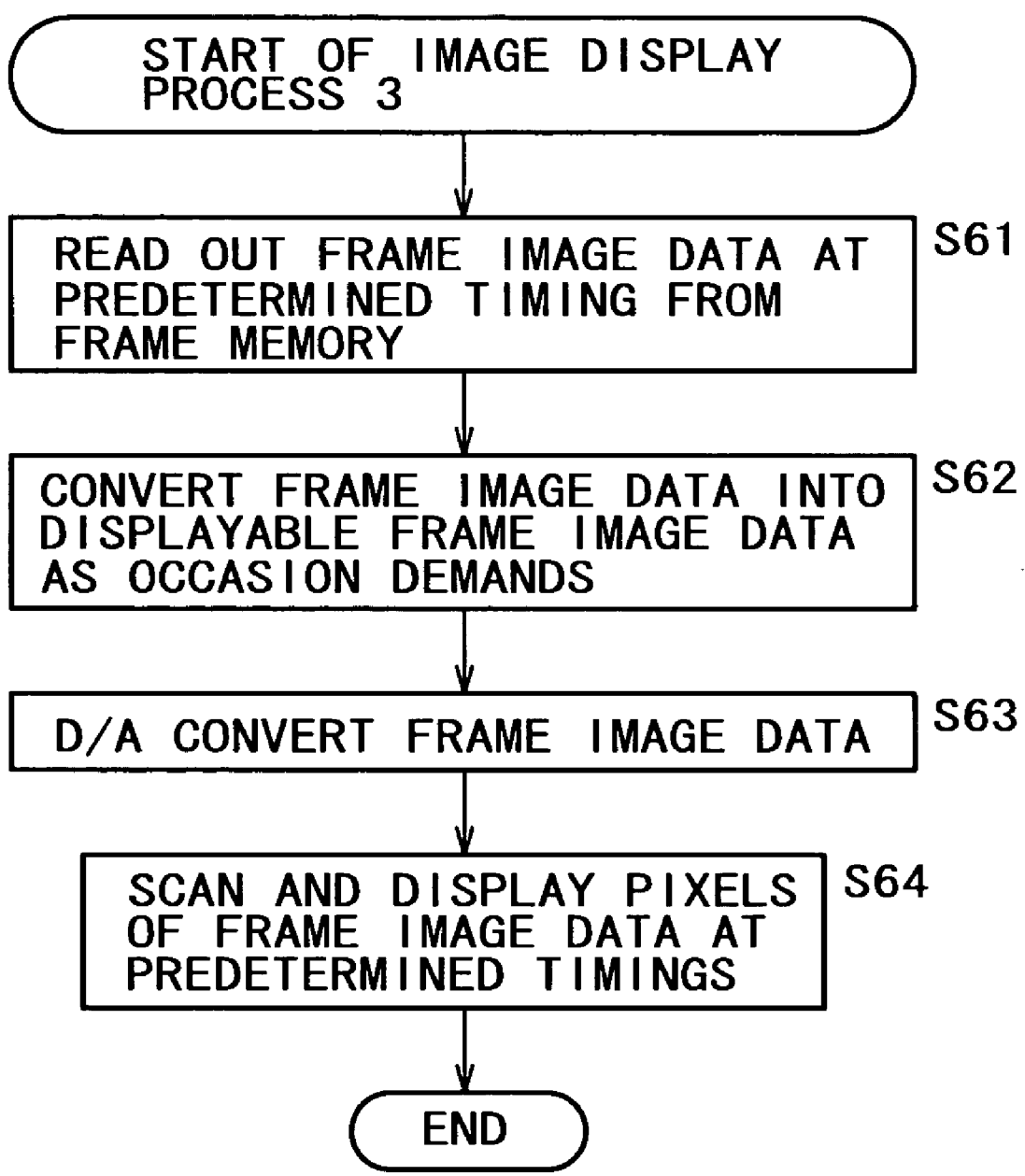
FIG. 32 is a flow chart illustrating an image display process 3.

Now, an image display process 3 where the image signal processing apparatus 141 and the image display apparatus 52 described hereinabove with reference to FIG. 31 are used is described with reference to a flow chart of FIG. 32.

At step S61, the controller 151 reads out frame image data at a predetermined timing from the frame memory 61-1 and supplies the frame image data to the signal processing section 152.

At step S62, the signal processing section 152 performs a process (such as, for example, reduction of the pixel number or discrete reduction of scanning lines) for converting the frame image data into image data which can be displayed through the scanning control section 81-1 as occasion demands. The resulting image data are supplied to the D/A conversion section 65-1.

At step S63, the D/A conversion section 65-1 performs D/A conversion of the frame image data supplied thereto and supplies resulting data to the scanning control section 81-1.

At step S64, the scanning control section 81-1 scans pixels of the frame image data at a predetermined timing under the control of the display control section 66 so that the pixels may be displayed. Thereafter, the processing is ended.

By the process described above, moving picture data combined by an external apparatus can be displayed smoothly.

In the foregoing description, in order to display moving picture data of a frame rate of n×m Hz, n series of moving picture data of the frame rate m are acquired, and the n series of moving picture data or n/s series of moving picture data obtained by combination of the n series of moving picture data are scanned and outputted in a successively displaced relationship from each other by a predetermined timing so that moving picture data of the frame rate of n×m Hz are displayed. Now, a method of picking up pixels in a successively spatially displaced relationship by 1/n the pixel pitch to expand the display image to a display image in a space expanded to n times thereby to acquire moving picture data of the frame rate of n×m Hz is described.

Figure 33:
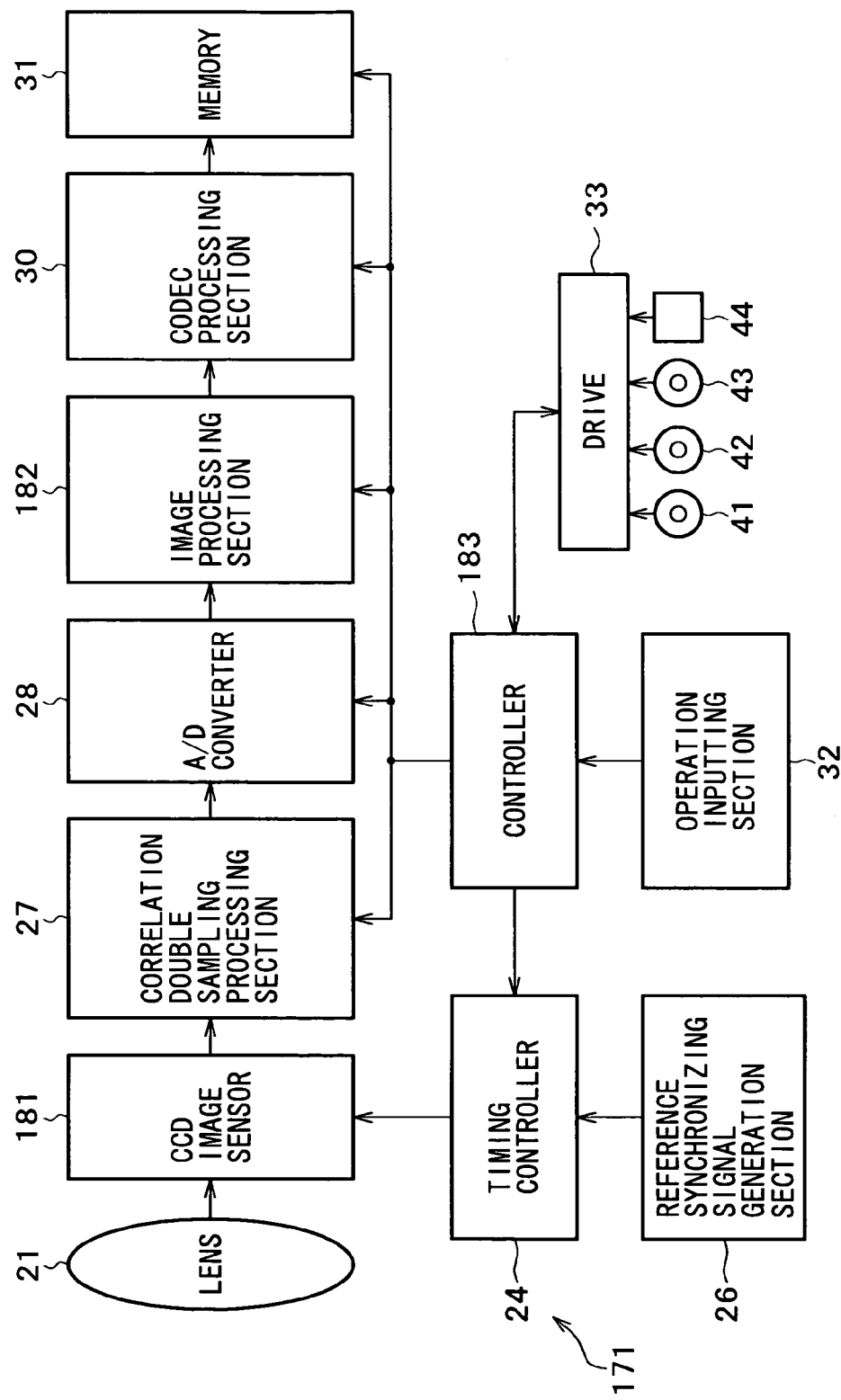
FIG. 33 is a block diagram showing another configuration of the image pickup apparatus to which the present invention is applied.

FIG. 33 shows a configuration of an image pickup apparatus 171 to which the present invention is applied.

Referring to FIG. 33, the image pickup apparatus 171 includes a lens 21, a CCD image sensor 181, a timing controller 24, a controller 183, and a reference synchronizing signal generation section 26. The image pickup apparatus 171 further includes a correlated double sampling processing section 27, an A/D converter 28, an image processing section 182, a codec processing section 30, a memory 31, an operation inputting section 32 and a drive 33.

A CCD is of the general single plate type which includes a (photoelectrically converting) semiconductor element for converting light information into an electric signal, and the CCD image sensor 181 includes a single image pickup element which includes a plurality of light receiving elements (pixels) arrayed for converting light into electricity such that a variation of light is converted into an electric signal independently for each pixel. Further, the CCD image sensor 181 includes a color filter of the Bayer array wherein color filters of, for example, the primary colors of R, G and B are arranged in a mosaic fashion. The color filters of the image pickup element of the CCD image sensor 181 may have an array different from the Bayer array.

Figure 34:
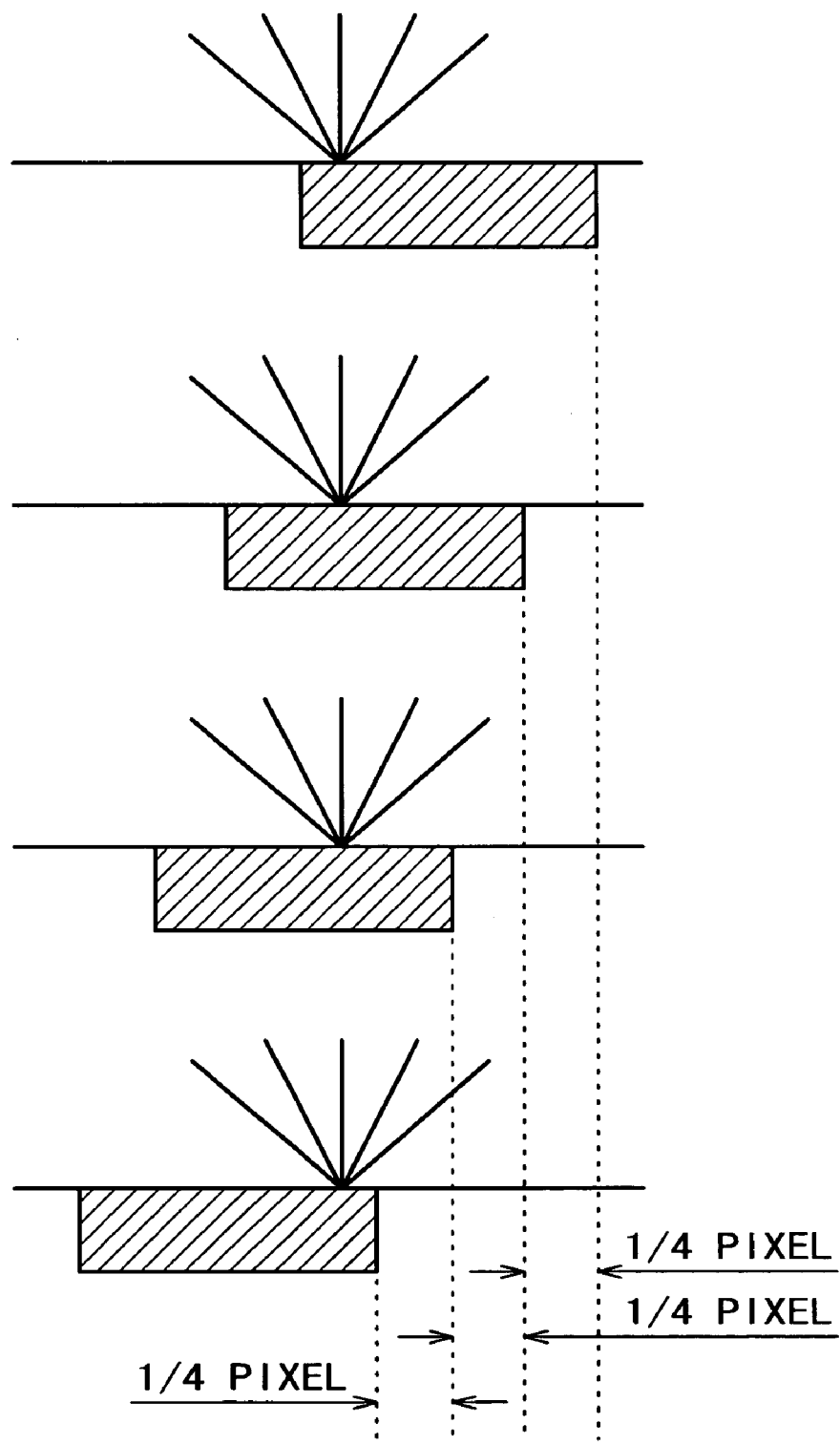
FIG. 34 is a diagrammatic view illustrating pixel shifting.

The image pickup element of the CCD image sensor 181 is successively displaced by 1/n the pixel pitch as seen in FIG. 34 to successively displace the timing by 1/m×n to acquire image information under the control of the timing controller 24. It is to be noted that, while, in FIG. 34, n is set to n=4 so that the image pickup element is successively displaced by ¼ the pixel pitch to pick up images, n may be any numerical value other than 4. The timing controller 24 successively delays a reference synchronizing signal of m Hz supplied thereto from the reference synchronizing signal generation section 26 by 1/m×n to produce a trigger signal under the control of the controller 183 and supplies the trigger signal to the image pickup element of the CCD image sensor 181.

It is described here that the image pickup element is displaced or shifted successively by 1/n the pixel pitch based on the timing signal generated by the timing controller 24. However, alternatively the position of the optical system may be successively moved by 1/n the pixel pitch based on the timing signal generated by the timing controller 24.

Accordingly, the frame rate of frame image data picked up by the CCD image sensor 181 is m×n Hz.

Although a technique of pixel shifting is usually used in order to compensate for an invalid portion of a light receiving section in a CCD camera or the like, the technique is used by those cameras which pick up images at the same time using multiple image pickup elements or by those cameras wherein images at different timings are picked up by oscillating a single image pickup element or an optical system (refer to "An Introduction to the CCD Camera Technique", Corona, 1997, pp. 109-111 mentioned hereinabove).

However, an example wherein a technique corresponding to the pixel shifting is applied as a configuration for picking up images at different timings is not known as yet. By picking up images at different timings, the time resolution can be improved. Further, since one of the image pickup element and the optical system is stationary, a stabilized high resolution image can be obtained.

The controller 183 controls the timing controller 24, correlated double sampling processing section 27, A/D converter 28, image processing section 182, codec processing section 30, memory 31 and operation inputting section 32 based on an operation input of a user inputted from the operation inputting section 32.

The image processing section 182 is a block including a signal processing processor and an image RAM. The signal processing processor performs an image process programmed in advance or an image process configured as an arithmetic operation process by hardware for image data stored in the image RAM. More particularly, the signal processing processor receives supply of stream data of pixels at a fixed rate and temporarily stores the stream data into the image RAM. Then, the signal processing processor executes various image processes such as, for example, white balance adjustment, a demosaic process, a matrix process, gamma correction and YC conversion for the temporarily stored image data and executes an interpolation process as occasion demands.

An interpolation process after pixel shifting image pickup is described with reference to FIGS. 35 and 36.

Figure 35:
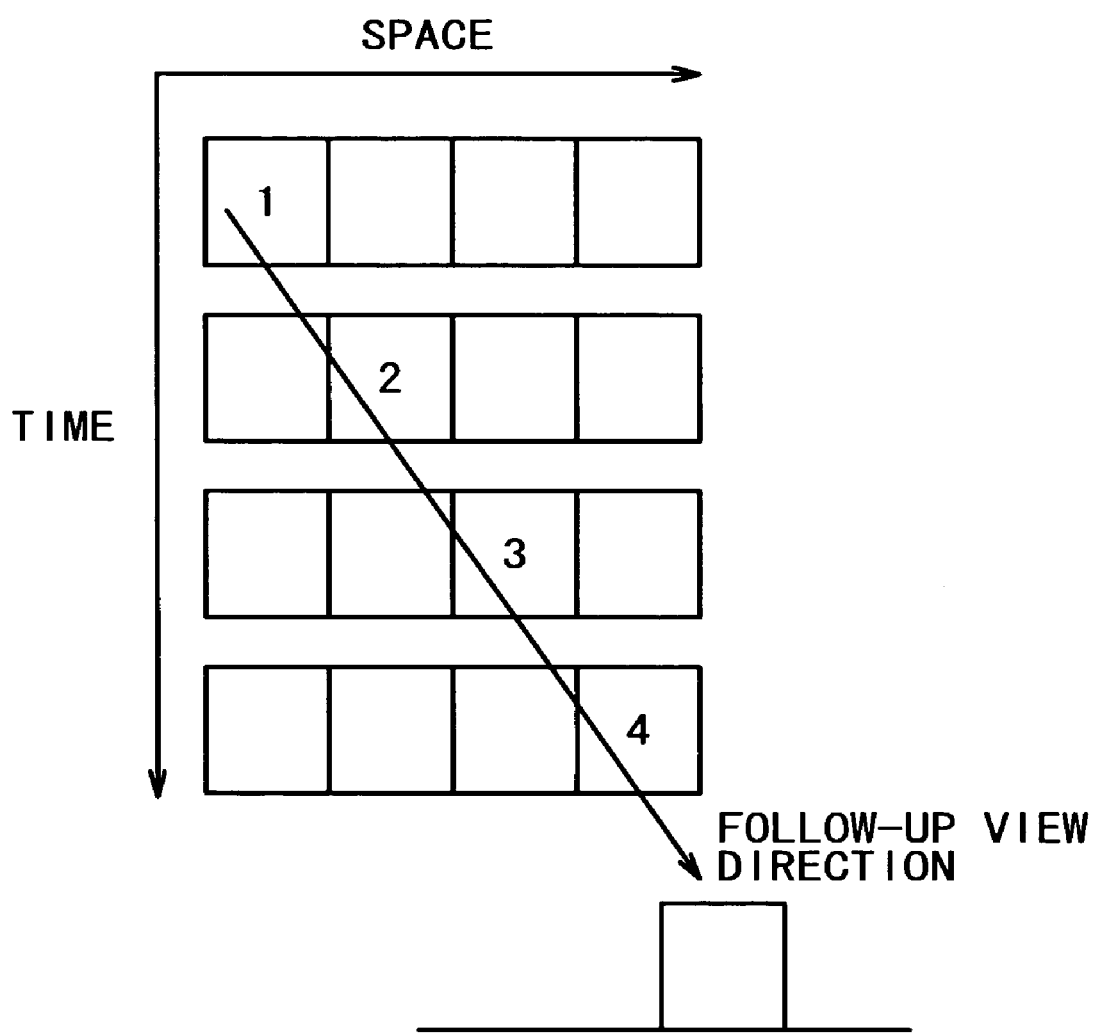
FIG. 35 is a diagrammatic view of image data picked up by the image pickup apparatus of FIG. 33 when no interpolation process is applied.

Referring first to FIG. 35, each ¼ pixel to which a numeral is applied is a portion which is picked up at a turn in order represented by the numeral, and any other ¼ pixel to which no numeral is applied signifies that it has no data. Where the image data are such as just described, if the observer moves its line of sight at a speed substantially equal to the speed of pixel shifting in the pixel displaying direction, that is, in the case of the follow-up view, images look discretely. In order to prevent this degradation in moving picture quality, it is necessary to produce non-acquired information of pixels by linear or non-linear interpolation from information of spatially near pixels.

Figure 36:
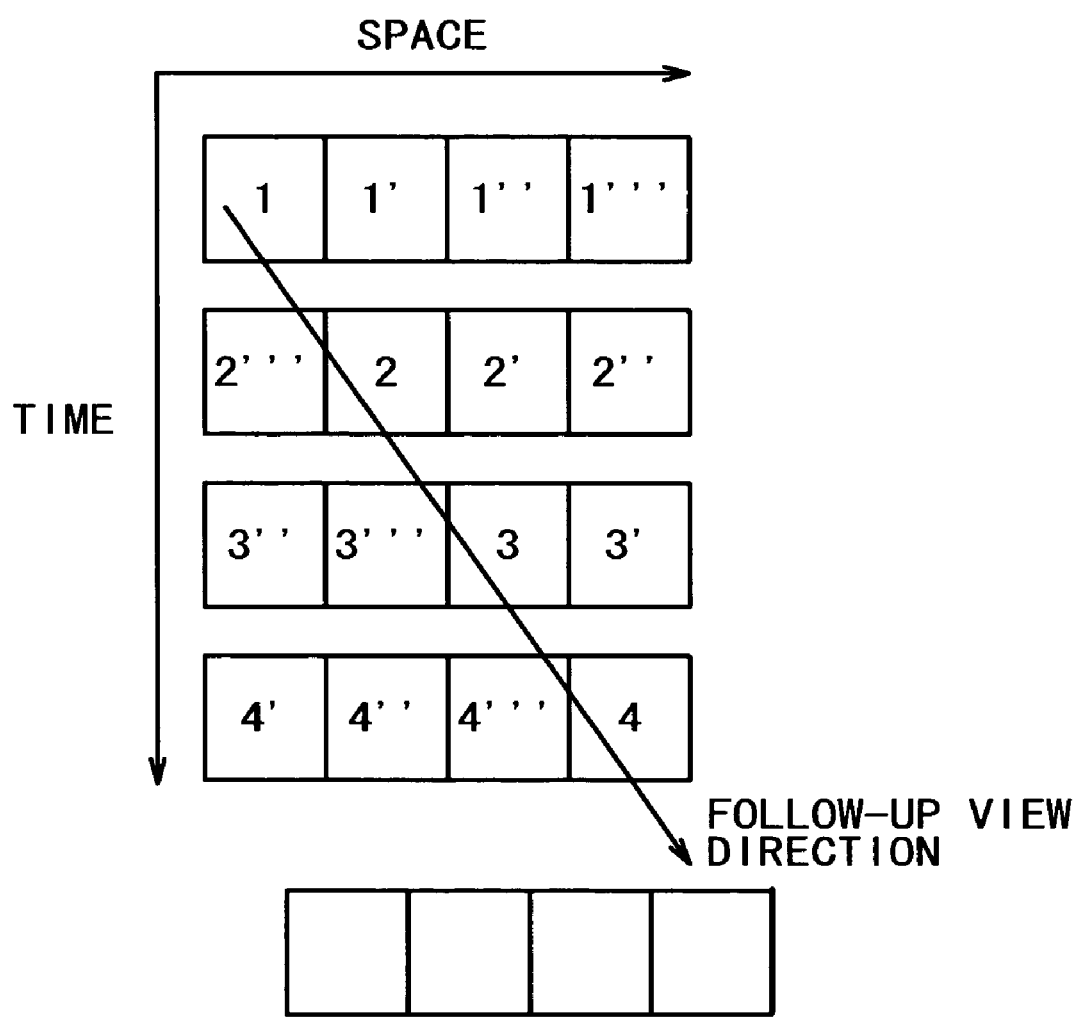
FIG. 36 is a diagrammatic view of image data picked up by the image pickup apparatus of FIG. 33 when an interpolation process is applied.

FIG. 36 illustrate data obtained by performing a spatial interpolation process for each ¼ pixel having no numeral applied thereto in FIG. 35 so that all ¼ pixels may have data. If the data are observed in the fixed view, that is, with the line of sight fixed to one place of the screen, then if the time frequency is sufficiently high, then the data look as a spatially continuous dense image due to an integration effect of the eyes.

Accordingly, by performing pixel shifting to pick up images and spatially interpolating the images to perform display, the image quality can be improved while the resolution in the time direction is maintained.

Figure 37:
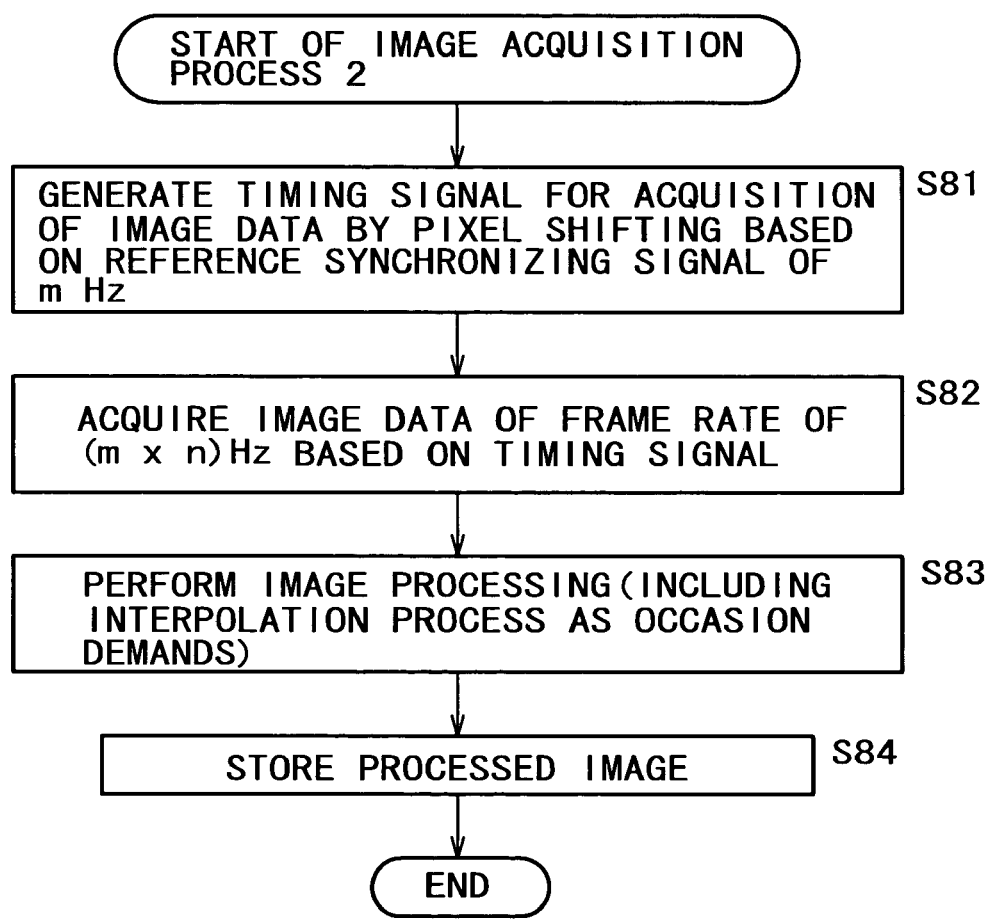
FIG. 37 is a flow chart illustrating an image acquisition process 2.

Now, an image acquisition process executed by the image pickup apparatus 171 of FIG. 33 is described with reference to a flow chart of FIG. 37.

At step S81, the timing controller 24 generates a timing signal for acquisition of image data by pixel shifting based on a reference synchronizing signal of m Hz generated by the reference synchronizing signal generation section 26 and supplies the timing signal to the CCD image sensor 181.

At step S82, the CCD image sensor 181 acquires image data of the frame rate of m×n Hz by pixel shifting described hereinabove with reference to FIG. 34 based on the timing signal supplied thereto from the timing controller 24.

At step S83, the correlated double sampling processing section 27, A/D converter 28, image processing section 182 and codec processing section 30 individually perform image processes for the image data of the frame rate of m×n Hz acquired by the CCD image sensor 181. At this time, the image processing section 182 performs an image process including an interpolation process as occasion demands.

At step S84, the memory 31 receives supply of and stores the processed image, and the processing is ended.

By such a process as described above, image data of the frame rate of m×n Hz is acquired using the technique of pixel shifting and stored.

In order to obtain high frame rate images of a high resolution, it is possible to perform acquisition of a luminance and a color for each pixel separately for different frames and perform a combination process using inter-frame interpolation.

Figure 38:
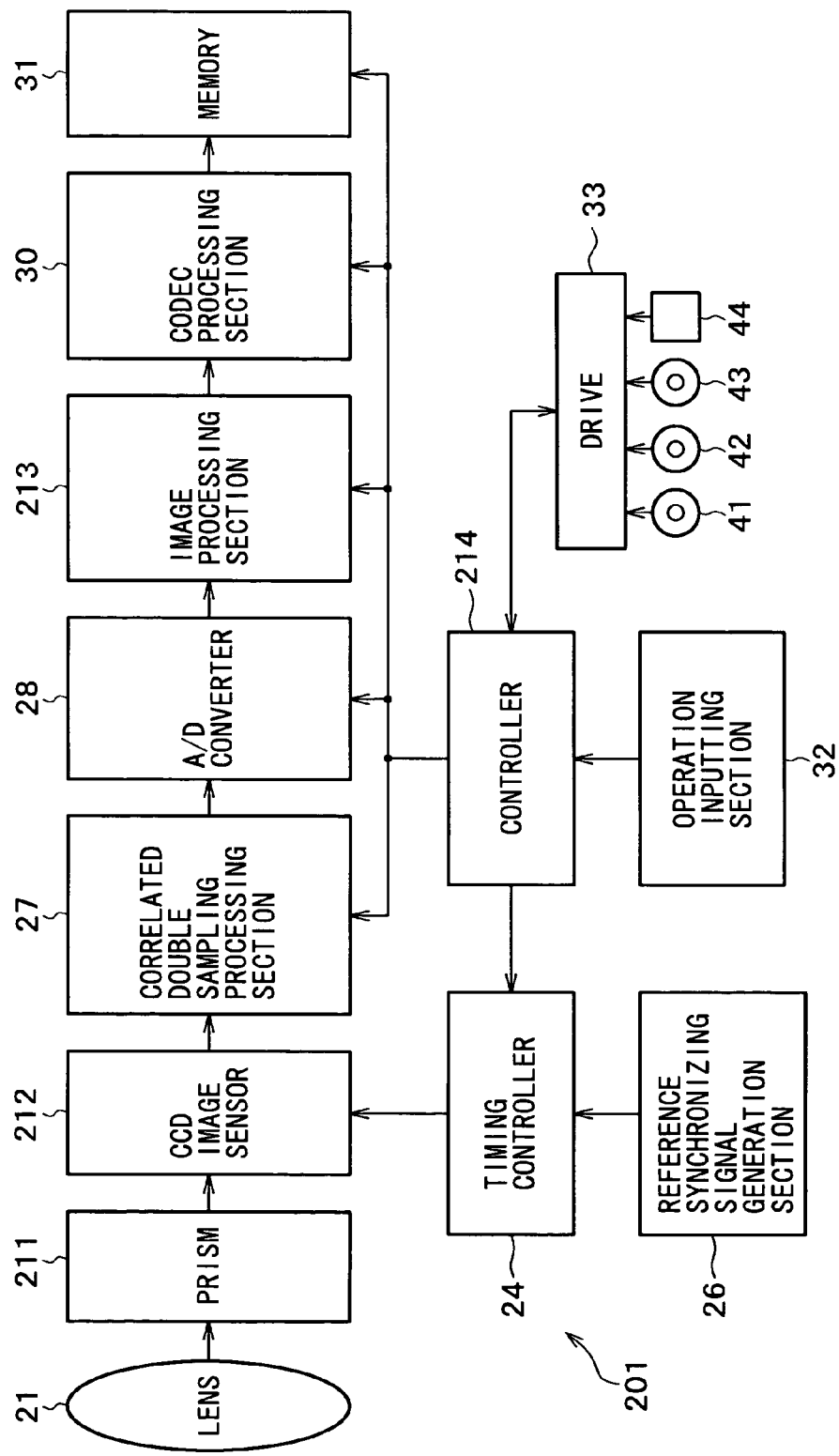
FIG. 38 is a block diagram showing a further configuration of the image pickup apparatus to which the present invention is applied.

FIG. 38 shows a configuration of an image pickup apparatus 201 to which the present invention is applied.

Referring to FIG. 38, the image pickup apparatus 201 includes a lens 21, a prism 211, a CCD image sensor 212, a timing controller 24, a controller 214, and a reference synchronizing signal generation section 26. The image pickup apparatus 201 further includes a correlated double sampling processing section 27, an A/D converter 28, an image processing section 213, a codec processing section 30, a memory 31, an operation inputting section 32, and a drive 33.

Figure 39:
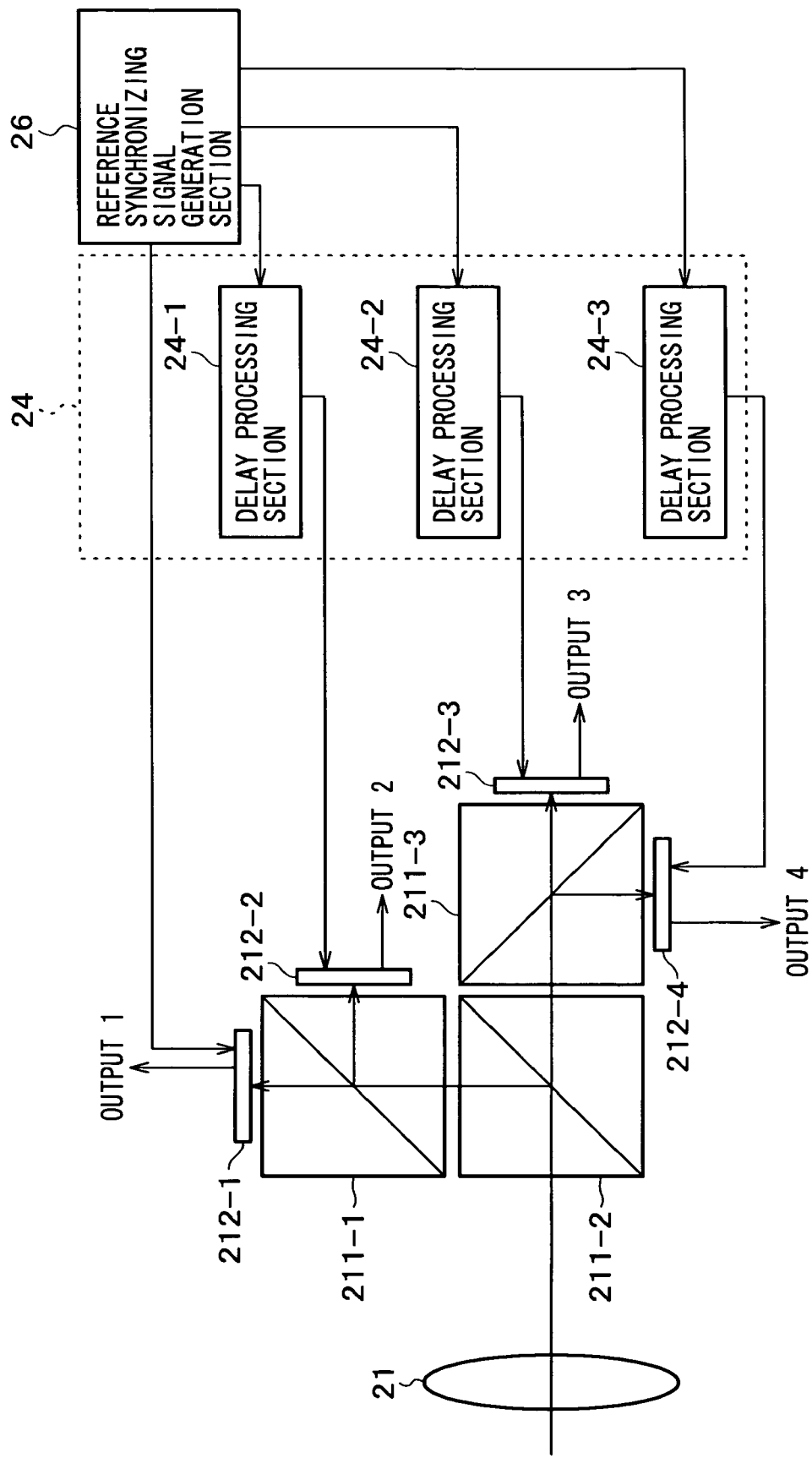
FIG. 39 is a schematic view showing a configuration of a prism and a CCD image sensor shown in FIG. 38.

Referring to FIG. 39, the prism 211 is formed from prism beam splitters which have a reflection factor of 1/n (here, n=4) with respect to light incoming through the lens 21. The prism 211 splits the light incoming through the lens 21 into n lights and supplies the n lights to n image pickup elements 212-1 to 212-*n* of the CCD image sensor 212.

Referring back to FIG. 28, the CCD image sensor 212 includes n image pickup elements each of which includes a plurality of light receiving elements (pixels) arrayed for converting light into electricity such that a variation of light is converted into an electric signal independently for each pixel. It is to be noted that, while the CCD image sensor 212 includes n image pickup elements, each of the image pickup elements is formed from a CCD image sensor not of the double plate type but of the common single plate type. In the image pickup elements of the single plate type, a color filter of the Bayer array wherein color filters of, for example, the primary colors of R, G and B are arranged in a mosaic fashion is formed for each light receiving element. The CCD image sensor 212 further includes a number of light receiving elements equal to the number of the CCD image sensors for acquiring only luminance information without using a color filter. The color filters of the image pickup elements of the CCD image sensor 212 may have an array different from the Bayer array.

The image pickup elements of the CCD image sensor 212 acquire image information at timings successively displaced by 1/m×n second under the control of the timing controller 24. The timing controller 24 successively delays a reference synchronizing signal supplied thereto from the reference synchronizing signal generation section 26 by 1/m×n to produce trigger signals under the control of the controller 214 and supplies the trigger signals to the image pickup elements 212-1 to 212-*n* of the CCD image sensor 212.

The controller 214 controls the timing controller 24, correlated double sampling processing section 27, A/D converter 28, image processing section 213, codec processing section 30 and memory 31 based on an operation input of a user inputted from the operation inputting section 32. The reference synchronizing signal generation section 26 generates a synchronizing signal for a reference for control of the image pickup elements of the CCD image sensor 212 and supplies the synchronizing signal to the timing controller 24.

Figure 40:
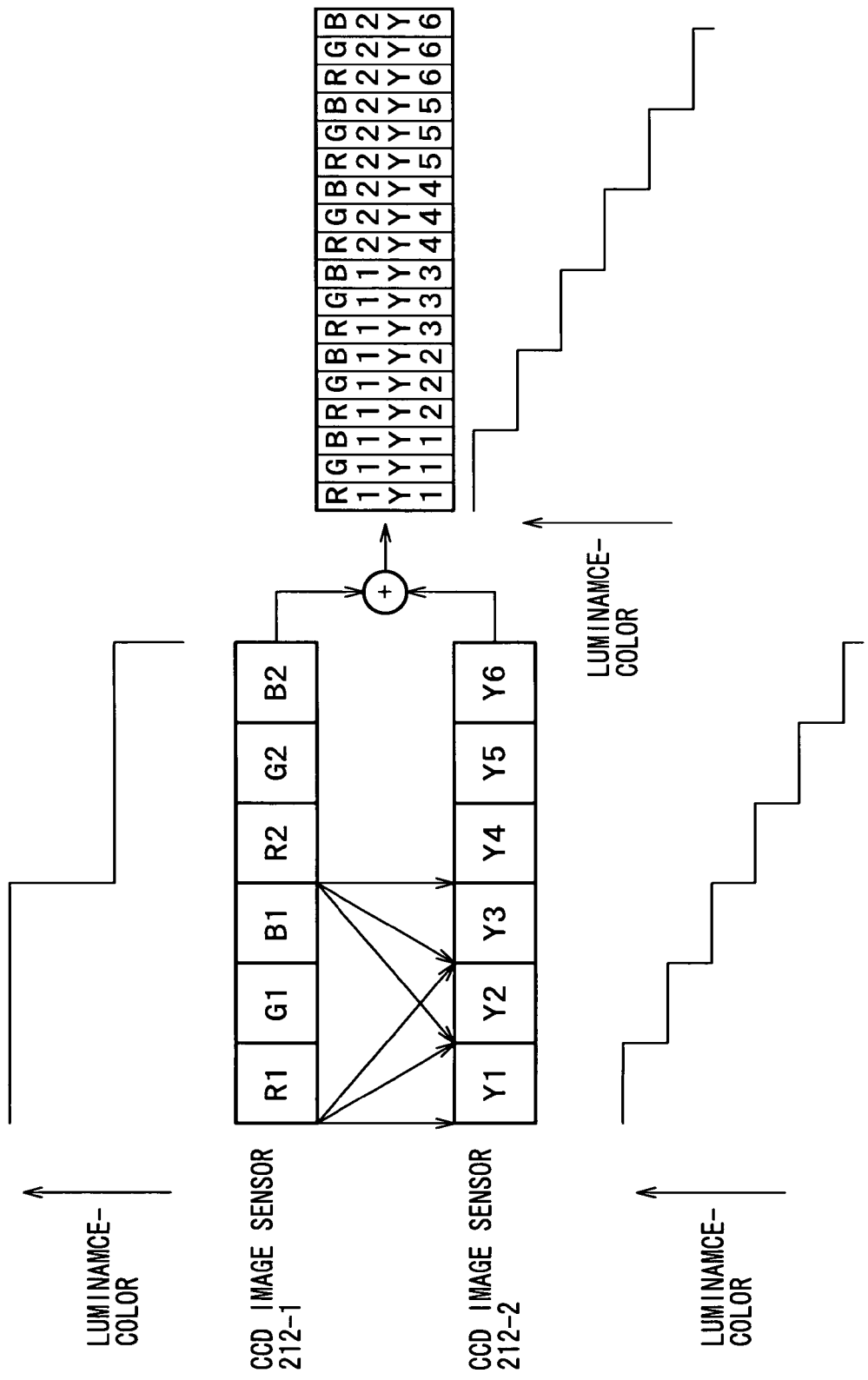
FIG. 40 is a schematic view illustrating composition of luminance information and color information.

A mechanism for performing acquisition of a luminance and a color for each pixel separately for each frame and using inter-frame interpolation to obtain high frame rate images of a high resolution by means of the image processing section 213 is described with reference to FIG. 40.

As an example, a configuration is considered wherein the color filters of the n/2 image pickup elements of the CCD image sensor 212 have 640 color pixels of an RGB horizontal array (one pixel includes three color elements of R, G and B) while the remaining n/2 image pickup elements acquire only luminance information (horizontally arranged 1,920 monochromatic pixels). Each image pickup element having a color filter is equivalent, in regard to the scale, to horizontally arranged 640×3=1,920 monochromatic pixels. As regards the picture quality, 1,920 color pixels are ideal. However, it is assumed that only such image pickup elements as described above can be used.

Where, for example, four image pickup elements (n=4) are involved, an image pickup element for acquiring horizontally arranged 640 color pixels is allocated to the first and third ones of the image pickup elements in order of image pickup, and another image pickup element for acquiring horizontally arranged 1,920 monochromatic pixels is allocated to the second and forth image pickup elements. The image processing section 213 produces a frame interpolated image by an interpolation process from the acquired image signals corresponding to the second and fourth monochromatic images. Then, the image processing section 213 produces a monochromatic image of horizontally arranged 640 pixels by extracting the luminance by an arithmetic operation process of (R+G+R)/3 from the subsequently acquired image signal corresponding to the third color image. Then, the image processing section 213 normalizes the values of 3 pixels corresponding to the frame interpolated image and multiplies the value of each one pixel of the monochromatic image by the normalized values to produce a monochromatic image of horizontally arranged 1,920 pixels.

This process corresponds to expansion of the resolution of the gradient of luminance to three times without changing the value of each pixel of the images picked up using color filters. By repeating a similar process, a monochromatic image of continuous horizontally arranged 1,920 pixels can be obtained. Then, color information is applied to the pixels. Since the color information is obtained by the image pickup process of the first and third image pickup elements, the color information is applied to the first and third monochromatic images of horizontally arranged 1,920 pixels.

In particular, where the value of a monochromatic image is represented by Ymono and color information is represented by Rorg, Gorg, Borg while the values of RGB of a new high resolution after the combination process are represented by Rnew, Gnew, Bnew, respectively, the values Rnew, Gnew, Bnew of RGB of the high resolution are determined in accordance with the following expressions (1) to (3):

$$Rnew = Ymono * Rorg/(Rorg + Borg + Borg) \quad (1)$$

$$Gnew = Ymono * Gorg/(Rorg + Borg + Borg) \quad (2)$$

$$Bnew = Ymono * Gorg/(Rorg + Borg + Borg) \quad (3)$$

An image signal obtained in this manner represents an image on which a resolution for a tripled luminance is reflected without changing the balance of the three colors. Further, color information may be applied similarly also to the second and fourth images of horizontally arranged 1,920 monochromatic pixels.

Figure 41:
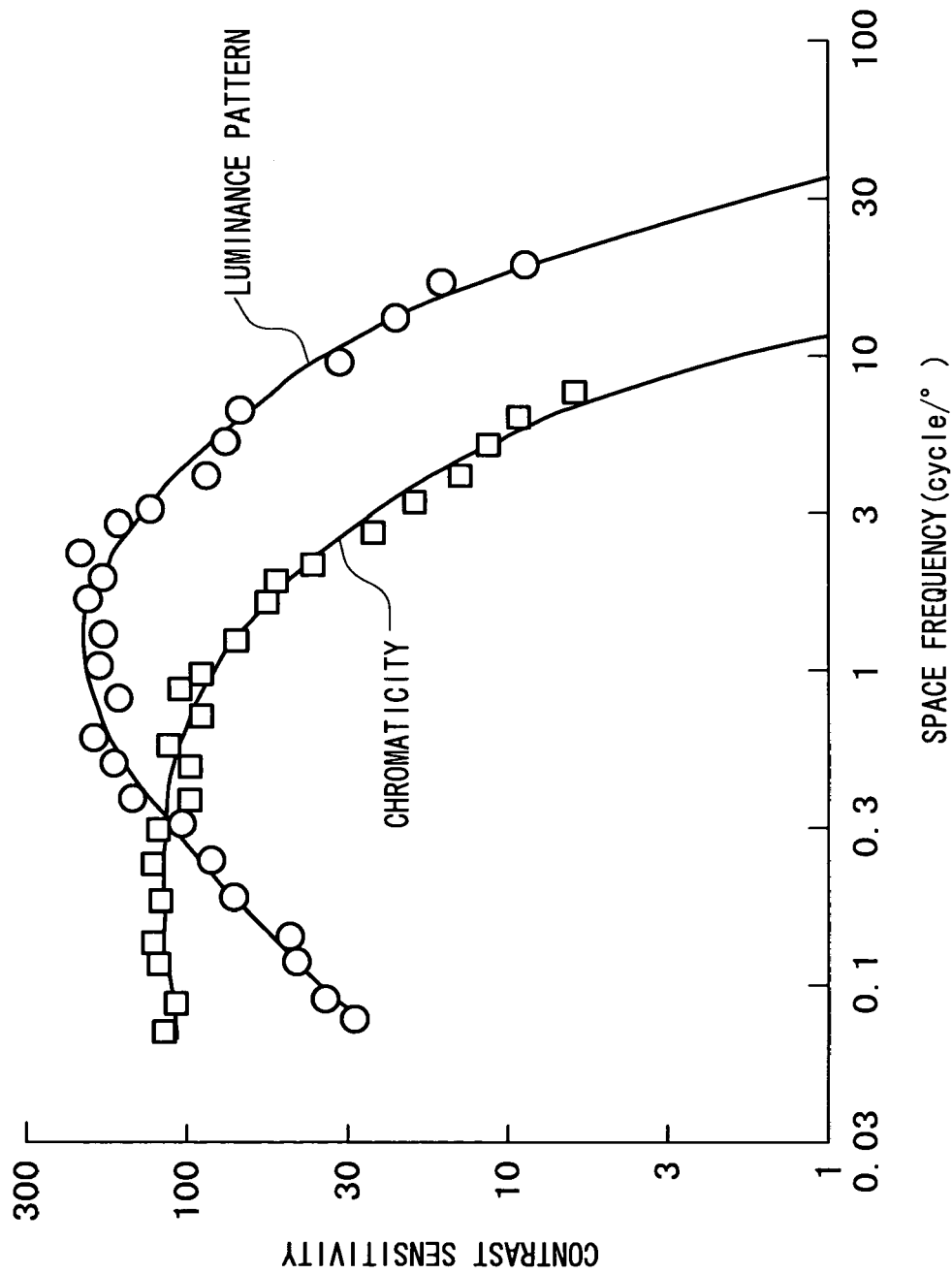
FIG. 41 is a diagram illustrating a contrast sensitivity of a luminance pattern and a chromatic pattern.

In order to determine the image data with a high degree of accuracy, it is possible to produce frame interpolated images from interpolation images of color images and use the method described above to produce a color image having a tripled density from color information of the frame interpolated images. However, taking an increase of the arithmetic operation cost into consideration, the color information of the first and three images may be utilized as they are.

Where the first and third color information is used as it is, the time frequency only of the color information in the time direction decreases to ½, and the color information upon the follow-up view as moving pictures decreases to one half. However, as seen from FIG. 41, to the visual sense of a human being, the color information is lower in contrast sensitivity function than the luminance information. In other words, to the visual sense of a human being, the color information has a characteristic that the blur thereof can be less likely to be perceived. Therefore, if the time frequency of the luminance information is raised, then degradation of moving pictures can be suppressed low.

A high moving picture quality can be achieved by an image resource obtained in this manner.

It is to be noted that the present invention can naturally be applied also where the array of color filters is any other array (for example, a Bayer array, a primary four color array, a complementary three color array or a complementary four color array) than the RGB horizontal array described hereinabove.

Figure 42:
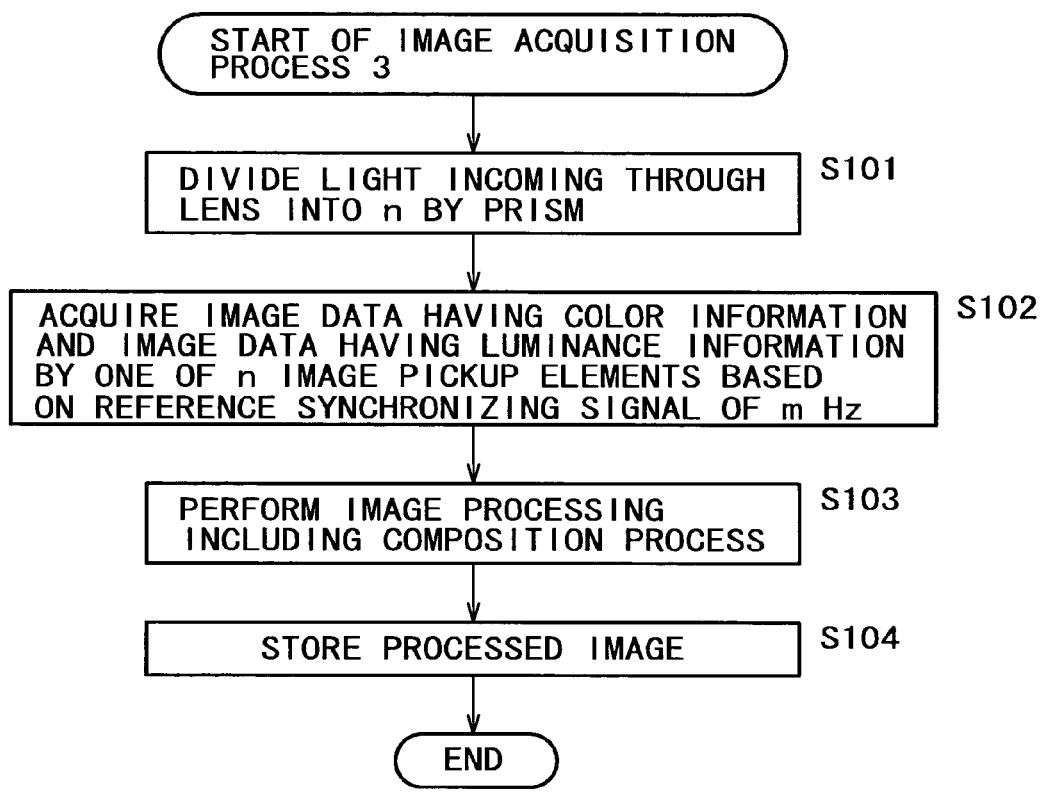
FIG. 42 is a flow chart illustrating an image acquisition process 3.

Now, an image acquisition process 3 executed by the image pickup apparatus 171 is described with reference to a flow chart of FIG. 42.

At step S101, the prism 211 splits light incoming through the lens 21 into n lights and supplies the n lights to the image pickup elements 212-1 to 212-n of the CCD image sensor 212, respectively.

At step S102, the timing controller 24 supplies the reference synchronizing signal of m Hz supplied thereto from the reference synchronizing signal generation section 26 to the CCD image sensor 212. The CCD image sensor 212 acquires image data having color information and image data having luminance information from the n image pickup elements 212-1 to 212-n based on the reference synchronizing signal of m Hz.

At step S103, the correlated double sampling processing section 27, A/D converter 28, image processing section 213 and codec processing section 30 perform image processes for the image data of the frame rate of m Hz acquired by the CCD image sensor 212. At this time, the image processing section 213 executes an image process including the combination process described hereinabove with reference to FIG. 40.

At step S104, the memory 31 receives supply of and stores the process image, and then the processing is ended.

By such a process as described above, a high moving picture quality can be achieved by an image resource obtained in this manner.

The series of processes described above can be executed also by software. Where the series of processes is executed by software, a program which constructs the software is installed from a recording medium into a computer incorporated in hardware for exclusive use or, for example, a personal computer for universal use which can execute various functions by installing various programs.

The recording medium may be formed as a package medium such as, as shown in FIG. 1, 9, 26, 28, 31, 33 or 38, a magnetic disk 41 or 71 (including a flexible disk), an optical disk 42 or 72 (including a CD-ROM (Compact Disc-Read Only Memory) and a DVD (Digital Versatile Disk)), a magneto-optical disk 43 or 73 (including an MD (Mini-Disk) (trademark)), or a semiconductor memory 44 or 74 which has the program recorded thereon or therein and is distributed in order to provide the program to a user separately from a computer.

Further, in the present specification, the steps which describe the program recorded in or on a recording medium may be but need not necessarily be processed in a time series in the order as described, and include processes which are executed parallelly or individually without being processed in a time series.

Further, in the present specification, the term "system" is used to represent an entire apparatus composed of a plurality of apparatus.

While preferred embodiments of the present invention have been described using specific terms, such description is for illustrative purpose only, and it is to be understood that changes and variations may be made without departing from the spirit or scope of the following claims.

What is claimed is:

1. An image pickup apparatus for picking up moving pictures, the image pickup apparatus comprising:
   at least one beam splitter for splitting light incoming through an optical lens into a first number of beams, the at least one beam splitter reflecting a portion of the light to produce at least one of the first number of beams;
   a second number of image pickup elements for receiving the first number of beams and converting the first number of beams into signals, at time intervals of 1/m seconds, to pick up images where m is a first frame rate, wherein each of the second number of image pickup elements receives a respective beam of the first number of beams, the first number and the second number being equivalent, and converts the respective beam into a signal, wherein the light reaches the second number of pickup elements through light paths of equal length through the at least one beam splitter; and
   a control section for controlling timings at which the light is to be converted into the signals by said image pickup elements; wherein
   said control section controls said second number of image pickup elements to convert the light into the signals at timings successively displaced by 1/m×n seconds, n being a number equal to the first number and the second number, wherein m and n are integer numbers.

2. The image pickup apparatus according to claim 1, wherein the second number of said image pickup elements is four, and the four image pickup elements convert the light into the signals successively displaced by an interval of time of 1/60 seconds.

3. The image pickup apparatus according to claim 1, wherein the second number of said image pickup elements is two, and the two image pickup elements convert the light into the signals successively displaced by an interval of time of 1/120 seconds.

4. The image pickup apparatus according to claim 1, wherein the second number of said image pickup elements is five, and the five image pickup elements convert the light into the signals successively displaced by an interval of time of 1/50 seconds.

5. An image pickup method for an image pickup apparatus for picking up moving pictures using a first number of image pickup elements, the method comprising:
   a distribution step of splitting light incoming through an optical lens into a second number of beams using at least one beam splitter that reflects a portion of the light to produce at least one of the second number of beams;
   a timing signal generation step of generating a timing signal to be used to control timings at which said first number of image pickup elements pick up images; and
   an image pickup step of picking up the light from the second number of beams based on the timing signal using the first number of image pickup elements, wherein each of the first number of image pickup elements receives a respective beam of the second number of beams and converts the respective beam into a signal, the first number and the second number being equivalent, wherein the light reaches the first number of pickup elements through light paths of equal length through the at least one beam splitter; wherein
   said image pickup elements are capable of converting the light into signals at time intervals of 1/m seconds, wherein m is a first frame rate; and wherein
   the timing signal is used to control said first number of image pickup elements so as to convert the light into signals to pick up images at timings successively displaced by 1/m×n seconds, n being a number equal to the first number and the second number, wherein m and n are integer numbers.

* * * * *